(12) United States Patent
Nishimaki

(10) Patent No.: US 11,693,824 B2
(45) Date of Patent: Jul. 4, 2023

(54) COMPUTER-READABLE RECORDING MEDIUM RECORDING COMMUNICATION PROGRAM, COMMUNICATION METHOD, AND COMMUNICATION DEVICE

(71) Applicant: FUJITSU LIMITED, Kawasaki (JP)

(72) Inventor: Satoru Nishimaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 185 days.

(21) Appl. No.: 17/074,685

(22) Filed: Oct. 20, 2020

(65) Prior Publication Data

US 2021/0141765 A1    May 13, 2021

(30) Foreign Application Priority Data

Nov. 12, 2019   (JP) ................................ 2019-204858

(51) Int. Cl.
  *G06F 16/13*   (2019.01)
  *G06F 16/16*   (2019.01)
  *G06F 16/14*   (2019.01)

(52) U.S. Cl.
  CPC .......... *G06F 16/164* (2019.01); *G06F 16/134* (2019.01); *G06F 16/137* (2019.01); *G06F 16/14* (2019.01)

(58) Field of Classification Search
  CPC ...... G06F 16/134; G06F 16/137; G06F 16/14; G06F 16/164
  See application file for complete search history.

(56) References Cited

U.S. PATENT DOCUMENTS

| | | | |
|---|---|---|---|
| 8,086,585 B1* | 12/2011 | Brashers | G06F 16/137 707/705 |
| 2006/0248038 A1* | 11/2006 | Kaplan | G06F 16/164 |
| 2020/0021439 A1 | 1/2020 | Sato | |
| 2020/0160466 A1 | 5/2020 | Hori | |
| 2020/0374106 A1* | 11/2020 | Padmanabhan | G06F 16/162 |

FOREIGN PATENT DOCUMENTS

| | | |
|---|---|---|
| JP | 2018-124924 A | 8/2018 |
| JP | 2018-128723 A | 8/2018 |
| WO | 2019/004118 A1 | 1/2019 |

* cited by examiner

*Primary Examiner* — Robert W Beausoliel, Jr.
*Assistant Examiner* — Nirav K Khakhar
(74) *Attorney, Agent, or Firm* — Fujitsu Patent Center

(57) ABSTRACT

A recording medium stores a communication program executed by communication devices and causing: a first computer of a first communication device, on a side of providing data, to register first metadata including the data and attribute information; a second computer of a second communication device, on a side of using the data, to register second metadata including a processing service when processing and using the data and attribute information; the first computer to determine whether or not to approve the processing service based on the first and second metadata; and when the determination of whether or not to approve is to approve, a third computer of a third communication device, on a side of processing the data, to execute data processing based on the processing service in a data processing environment that disapproves access from the first and second communication devices to the data and the processing service.

7 Claims, 70 Drawing Sheets

| RequestURL | method | SendTo |
|---|---|---|
| /transaction | POST | /GW1/smartConrtact |
| /block | POST | /GW1/smartContract |

T3

| RequestURL | method | SendTo |
|---|---|---|
| /transaction | POST | /GW2/smartContract |
| /block | POST | /GW2/smartContract |

T4

| RequestURL | method | SendTo |
|---|---|---|
| /transaction | POST | /GW3/smartContract |
| /block | POST | /GW3/smartContract |

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /GW1/product | /GW1/test | xxxxx | — | — |

| RequestURL | method | SendTo |
|---|---|---|
| /dataId1/test | GET | /GW1/test |
| /transaction | POST | /GW1/smartContract |
| /block | POST | /GW1/smartContract |

T3a

| RequestURL | method | SendTo |
|---|---|---|
| /dataId1/test | GET | /GW1/test |
| /transaction | POST | /GW2/smartContract |
| /block | POST | /GW2/smartContract |

T4a

| RequestURL | method | SendTo |
|---|---|---|
| /dataId1/test | GET | /GW1/test |
| /transaction | POST | /GW3/smartContract |
| /block | POST | /GW3/smartContract |

FIG. 18

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /GW1/product | /GW1/test | xxxxx | — | — |
| serviceId1 | userB | PROCESSING SERVICE | /GW2/service | — | yyyyy | dataId1 | — |

| RequestURL | method | SendTo |
|---|---|---|
| /dataId1/test | GET | /GW1/test |
| /serviceId1 | POST | /GW2/service |
| /transaction | POST | /GW1/smartContract |
| /block | POST | /GW1/smartContract |

T3b

| RequestURL | method | SendTo |
|---|---|---|
| /dataId1/test | GET | /GW1/test |
| /serviceId1 | POST | /GW2/service |
| /transaction | POST | /GW2/smartContract |
| /block | POST | /GW2/smartConrtact |

T4b

| RequestURL | method | SendTo |
|---|---|---|
| /dataId1/test | GET | /GW1/test |
| /transaction | POST | /GW3/smartContract |
| /block | POST | /GW3/smartContract |

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /GW1/product | /GW1/test | xxxxx | serviceId1 | — |
| serviceId1 | userB | PROCESSING SERVICE | /GW2/service | — | yyyyy | dataId1 | — |

| RequestURL | method | SendTo |
|---|---|---|
| /dataId1/test | GET | /GW1/test |
| /serviceId1 | POST | /GW2/service |
| /dataId1 | GET | /GW1/product |
| /safe-env-X | POST | /safe-env-X/userA |
| /transaction | POST | /GW1/smartContract |
| /block | POST | /GW1/smartContract |

T3c

| RequestURL | method | SendTo |
|---|---|---|
| /dataId1/test | GET | /GW1/test |
| /serviceId1 | POST | /GW2/service |
| /serviceId1 | GET | /GW2/service |
| /safe-env-X | POST | /safe-env-X/userB |
| /transaction | POST | /GW2/smartContract |
| /block | POST | /GW2/smartContract |

T4c

| RequestURL | method | SendTo |
|---|---|---|
| /dataId1/test | GET | /GW1/test |
| /transaction | POST | /GW3/smartContract |
| /block | POST | /GW3/smartConrtact |

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /GW1/product | /GW1/test | xxxxx | serviceId1 | — |
| serviceId1 | userB | PROCESSING SERVICE | /GW2/service | — | yyyyy | dataId1 | — |
| processDataId1 | userB | PROCESSED DATA | /safe-env/processDataId1 | — | zzzzz | userB | dataId1→serviceId1 |

| RequestURL | method | SendTo |
|---|---|---|
| /dataId1/test | GET | /GW1/test |
| /serviceId1 | POST | /GW2/service |
| /transaction | POST | /GW1/smartContract |
| /block | POST | /GW1/smartContract |

T3d

| RequestURL | method | SendTo |
|---|---|---|
| /dataId1/test | GET | /GW1/test |
| /serviceId1 | POST | /GW2/service |
| /processDataId1 | GET | /safe-env-X/processDataId1 |
| /transaction | POST | /GW2/smartContract |
| /block | POST | /GW2/smartContract |

T4d

| RequestURL | method | SendTo |
|---|---|---|
| /dataId1/test | GET | /GW1/test |
| /transaction | POST | /GW3/smartContract |
| /block | POST | /GW3/smartContract |

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /safe-env-X/userA/product | /safe-env-X/userA/test | xxxx | — | — |

| RequestURL | method | SendTo |
|---|---|---|
| /dataId1/test | GET | /GW1/test |
| /dataId1 | GET | /GW1/product |
| /safe-env-X | POST | /safe-env-X/userA |
| /transaction | POST | /GW1/smartContract |
| /block | POST | /GW1/smartConrtact |

T3a1

| RequestURL | method | SendTo |
|---|---|---|
| /transaction | POST | /GW2/smartContract |
| /block | POST | /GW2/smartContract |

T4a1

| RequestURL | method | SendTo |
|---|---|---|
| /transaction | POST | /GW3/smartContact |
| /block | POST | /GW3/smartContact |

| RequestURL | method | SendTo |
|---|---|---|
| /dataId1/test | GET | /safe-env-X/userA/dataId1/test |
| /transaction | POST | /GW1/smartContract |
| /block | POST | /GW1/smartContract |

T3a11

| RequestURL | method | SendTo |
|---|---|---|
| /dataId1/test | GET | /safe-env-X/userA/dataId1/test |
| /transaction | POST | /GW2/smartContract |
| /block | POST | /GW2/smartContract |

T4a11

| RequestURL | method | SendTo |
|---|---|---|
| /dataId1/test | GET | /safe-env-X/userA/dataId1/test |
| /transaction | POST | /GW3/smartContact |
| /block | POST | /GW3/smartContact |

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /safe-env-X /userA/product | /safe-env-X /userA/test | xxxxx | — | — |
| serviceId1 | userB | PROCESSING SERVICE | /safe-env-X /userB/service | — | yyyyy | dataId1 | — |

| RequestURL | method | SendTo |
|---|---|---|
| /dataId1/test | GET | /safe-env-X/userA/dataId1/test |
| /transaction | POST | /GW1/smartContract |
| /block | POST | /GW1/smartContract |

T3b1

| RequestURL | method | SendTo |
|---|---|---|
| /dataId1/test | GET | /safe-env-X/userA/dataId1/test |
| /serviceId1 | GET | /GW2/service |
| /safe-env-X | POST | /safe-env-X/userB |
| /transaction | POST | /GW2/smartContract |
| /block | POST | /GW2/smartContract |

T4b1

| RequestURL | method | SendTo |
|---|---|---|
| /dataId1/test | GET | /safe-env-X/userA/dataId1/test |
| /transaction | POST | /GW3/smartContract |
| /block | POST | /GW3/smartContract |

| RequestURL | method | SendTo |
|---|---|---|
| /dataId1/test | GET | /safe-env-X/userA/dataId1/test |
| /serviceId1 | POST | /safe-env-X/userB/serviceId1 |
| /transaction | POST | /GW1/smartContract |
| /block | POST | /GW1/smartContract |

T3b11

| RequestURL | method | SendTo |
|---|---|---|
| /dataId1/test | GET | /safe-env-X/userA/dataId1/test |
| /transaction | POST | /GW2/smartContract |
| /block | POST | /GW2/smartContract |

T4b11

| RequestURL | method | SendTo |
|---|---|---|
| /dataId1/test | GET | /safe-env-X/userA/dataId1/test |
| /transaction | POST | /GW3/smartContact |
| /block | POST | /GW3/smartContact |

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /safe-env-X /userA/product | /safe-env-X /userA/test | xxxxx | serviceId1 | — |
| serviceId1 | userB | PROCESSING SERVICE | /safe-env-X /userB/service | — | yyyyy | dataId1 | — |

| RequestURL | method | SendTo |
|---|---|---|
| /dataId1/test | GET | /safe-env-X/userA/dataId1/test |
| /transaction | POST | /GW1/smartContact |
| /block | POST | /GW1/smartContact |

T3c1

| RequestURL | method | SendTo |
|---|---|---|
| /dataId1/test | GET | /safe-env-X/userA/dataId1/test |
| /transaction | POST | /GW2/smartContract |
| /block | POST | /GW2/smartContract |

T4c1

| RequestURL | method | SendTo |
|---|---|---|
| /dataId1/test | GET | /safe-env-X/userA/dataId1/test |
| /transaction | POST | /GW3/smartContract |
| /block | POST | /GW3/smartContract |

| ID | OWNER | ATTRIBUTE | PROVIDED DATA URL OR SERVICE URL | TEST DATA URL | HASH VALUE | PUBLISHING DESTINATION | PROCESSING FLOW |
|---|---|---|---|---|---|---|---|
| dataId1 | userA | PROVIDED DATA | /safe-env-X /userA/product | /safe-env-X /userA/test | xxxx | serviceId1 | — |
| serviceId1 | userB | PROCESSING SERVICE | /safe-env-X /userB/service | — | yyyy | dataId1 | — |
| process DataId1 | userB | PROCESSED DATA | /safe-env /processDataId1 | — | zzzz | userB | dataId1→serviceId1 |

| RequestURL | method | SendTo |
|---|---|---|
| /dataId1/test | GET | /safe-env-X/userA/dataId1/test |
| /transaction | POST | /GW1/smartContract |
| /block | POST | /GW1/smartContract |

T3d1

| RequestURL | method | SendTo |
|---|---|---|
| /dataId1/test | GET | /safe-env-X/userA/dataId1/test |
| /prosessDataId1 | GET | /safe-env-X/processDataId1 |
| /transaction | POST | /GW2/smartContract |
| /block | POST | /GW2/smartContract |

T4d1

| RequestURL | method | SendTo |
|---|---|---|
| /dataId1/test | GET | /safe-env-X/userA/dataId1/test |
| /transaction | POST | /GW3/smartContract |
| /block | POST | /GW3/smartContract |

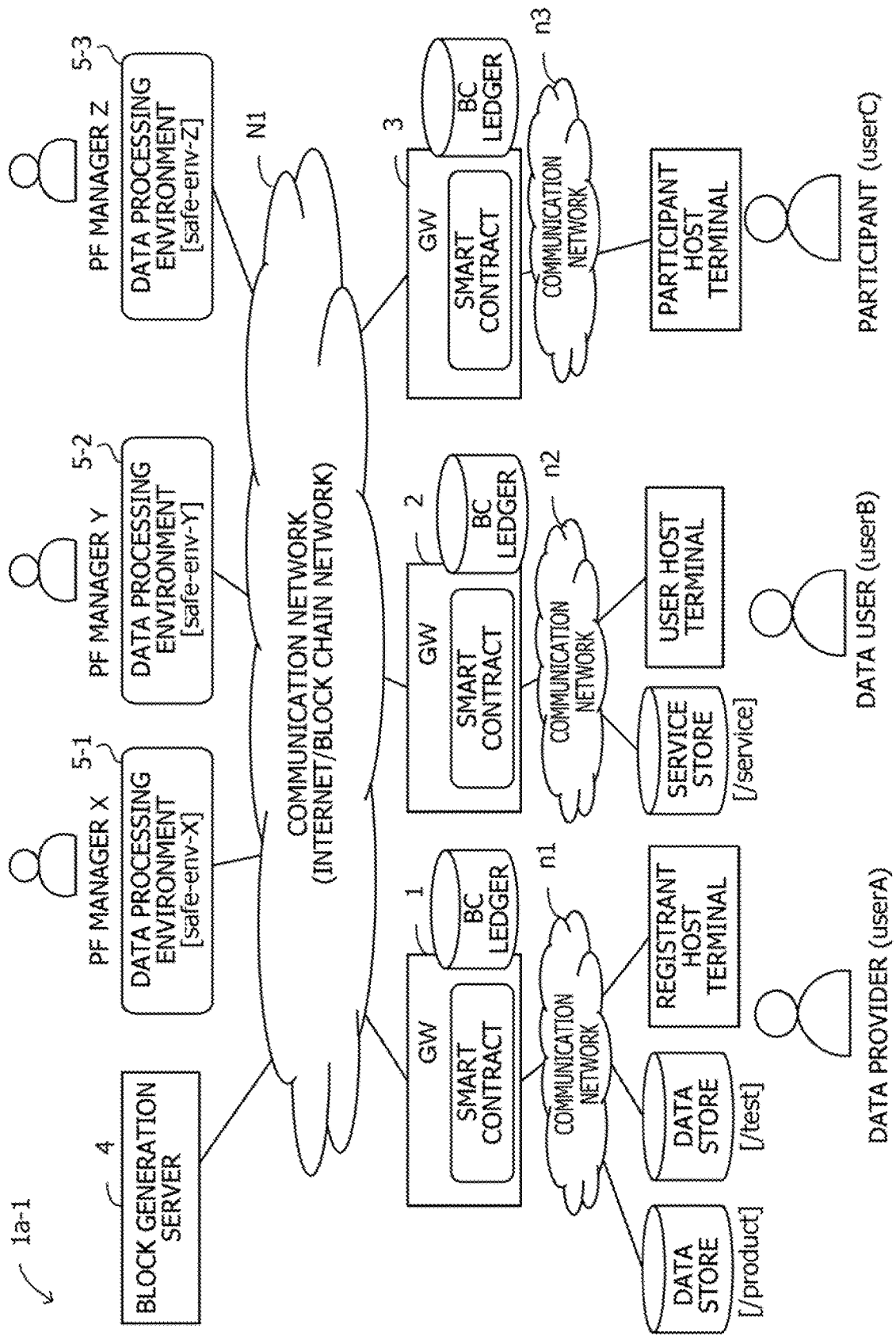

FIG. 62

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| | | | No data | | | | | |

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| dataId1 | userA | PROVIDED DATA | /GW1/product | /GW1/test | xxxxx | — | — | safe-env-X, safe-env-Y |

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| dataId1 | userA | PROVIDED DATA | /GW1/product | /GW1/test | xxxxx | — | — | safe-env-X, safe-env-Y |
| serviceId1 | userB | PROCESSING SERVICE | /GW2/service | — | yyyyy | dataId1 | — | safe-env-X, safe-env-Z |

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| dataId1 | userA | PROVIDED DATA | /GW1/product | /GW1/test | xxxxx | serviceId1 | — | safe-env-X, safe-env-Y |
| serviceId1 | userB | PROCESSING SERVICE | /GW2/service | — | yyyyy | dataId1 | — | safe-env-X, safe-env-Z |

| RequestURL | method | SendTo |
|---|---|---|
| /dataId1/test | GET | /GW1/test |
| /serviceId1 | POST | /GW2/service |
| /dataId1 | GET | /GW1/product |
| /safe-env-X | POST | /safe-env-X/userA |
| /safe-env-Y | POST | /safe-env-Y/userA |
| /transaction | POST | /GW1/smartContract |
| /block | POST | /GW1/smartContract |

T30c

| RequestURL | method | SendTo |
|---|---|---|
| /dataId1/test | GET | /GW1/test |
| /serviceId1 | POST | /GW2/service |
| /serviceId1 | GET | /GW2/service |
| /safe-env-X | POST | /safe-env-X/userB |
| /safe-env-Z | POST | /safe-env-Z/userB |
| /transaction | POST | /GW2/smartContract |
| /block | POST | /GW2/smartContract |

T40c

| RequestURL | method | SendTo |
|---|---|---|
| /dataId1/test | GET | /GW1/test |
| /transaction | POST | /GW3/smartContract |
| /block | POST | /GW3/smartContract |

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| dataId1 | userA | PROVIDED DATA | /GW1/product | /GW1/test | xxxxx | serviceId1 | — | safe-env-X, safe-env-Y |
| serviceId1 | userB | PROCESSING SERVICE | /GW2/service | — | yyyyy | dataId1 | — | safe-env-X, safe-env-Z |
| processDataId1 | userB | PROCESSED DATA | /safe-env /processDataId1 | — | zzzzz | userB | dataId1→ serviceId1 | safe-env-X |

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| dataId1 | userA | PROVIDED DATA | /GW1/product | /GW1/test | xxxxx | serviceId1 | — | safe-env-X, safe-env-Y |
| serviceId1 | userB | PROCESSING SERVICE | /GW2/service | — | yyyyy | dataId1 | — | safe-env-X, safe-env-Y, safe-env-Z |

FIG. 69

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| dataId1 | userA | PROVIDED DATA | /GW1/product | /GW1/test | xxxxx | serviceId1 | — | safe-env-X, safe-env-Y |
| serviceId1 | userB | PROCESSING SERVICE | /GW2/service | — | yyyyy | dataId1 | — | safe-env-X, safe-env-Y, safe-env-Z |
| process DataId1 | userB | PROCESSED DATA | /safe-env /processDataId1 | — | zzzzz | userB | dataId1 → serviceId1 | safe-env-X |

| ID | OWNER | ATTRIBUTE | PROVIDED DATA URL OR SERVICE URL | TEST DATA URL | HASH VALUE | PUBLISHING DESTINATION | PROCESSING FLOW | PROCESSING ENVIRONMENT |
|---|---|---|---|---|---|---|---|---|
| dataId1 | userA | PROVIDED DATA | /GW1/product | /GW1/test | xxxxx | serviceId1 | — | safe-env-X, safe-env-Y |
| serviceId1 | userB | PROCESSING SERVICE | /GW2/service | — | yyyyy | dataId1 | — | safe-env-X, safe-env-Y, safe-env-Z |
| process DataId1 | userB | PROCESSED DATA | /safe-env /processDataId1 | — | zzzzz | userB | dataId1→ serviceId1 | safe-env-Y |

COMPUTER-READABLE RECORDING MEDIUM RECORDING COMMUNICATION PROGRAM, COMMUNICATION METHOD, AND COMMUNICATION DEVICE

CROSS-REFERENCE TO RELATED APPLICATION

This application is based upon and claims the benefit of priority of the prior Japanese Patent Application No. 2019-204858, filed on Nov. 12, 2019, the entire contents of which are incorporated herein by reference.

FIELD

The embodiments discussed herein are related to a communication program, a communication method, and a communication device.

BACKGROUND

In recent years, there has been an active movement to create new businesses by mutually exchanging and utilizing data held by companies (organizations). A data distribution network has been attracting attention as a place for activating such data utilization between companies.

International Publication Pamphlet No. WO 2019/004118, Japanese Laid-open Patent Publication No. 2018-128723, and Japanese Laid-open Patent Publication No. 2018-124924 are disclosed as related art.

SUMMARY

According to an aspect of the embodiments, a non-transitory computer-readable recording medium stores therein a communication program executed by a plurality of communication devices included in a network and causing: a first computer of a first communication device, on a side of providing data, to register first metadata including the data and attribute information of the data; a second computer of a second communication device, on a side of using the data, to register second metadata including a processing service for when processing and using the data and attribute information of the processing service; the first computer to determine whether or not to approve the processing service based on the first metadata and the second metadata; and when a result of the determination of whether or not to approve is to approve, a third computer of a third communication device, on a side of processing the data, to execute data processing based on the processing service in a data processing environment that disapproves access from the first communication device and the second communication device to the data and the processing service.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of proxy setting tables;

FIG. 14 is a diagram illustrating an example of a meta-information table (provided data registration phase);

FIG. 15 is a diagram illustrating an example of proxy setting tables (provided data registration phase);

FIG. 18 is a diagram illustrating an example of a meta-information table (processing service registration phase);

FIG. 19 is a diagram illustrating an example of proxy setting tables (processing service registration phase);

FIG. 22 is a diagram illustrating an example of a meta-information table (meta-information update phase);

FIG. 23 is a diagram illustrating an example of proxy setting tables (meta-information update phase);

FIG. 28 is a diagram illustrating an example of a meta-information table (meta-information matching phase);

FIG. 29 is a diagram illustrating an example of proxy setting tables (meta-information matching phase);

FIG. 40 is a diagram illustrating an example of a meta-information table (provided data registration phase);

FIG. 41 is a diagram illustrating an example of proxy setting tables (provided data registration phase);

FIG. 42 is a diagram illustrating an example of proxy setting tables (provided data registration phase);

FIG. 48 is a diagram illustrating an example of a meta-information table (processing service registration phase);

FIG. 49 is a diagram illustrating an example of proxy setting tables (processing service registration phase);

FIG. 50 is a diagram illustrating an example of proxy setting tables (processing service registration phase);

FIG. 54 is a diagram illustrating an example of a meta-information table (meta-information update phase);

FIG. 55 is a diagram illustrating an example of proxy setting tables (meta-information update phase);

FIG. 59 is a diagram illustrating an example of a meta-information table (meta-information matching phase);

FIG. 60 is a diagram illustrating an example of proxy setting tables (meta-information matching phase);

FIG. 61 is a diagram illustrating an example of a communication system according to a fourth embodiment;

FIG. 62 is a diagram illustrating an example of a meta-information table;

FIG. 63 is a diagram illustrating an example of a meta-information table;

FIG. 64 is a diagram illustrating an example of a meta-information table;

FIG. 65 is a diagram illustrating an example of a meta-information table;

FIG. 66 is a diagram illustrating an example of proxy setting tables;

FIG. 67 is a diagram illustrating an example of a meta-information table;

FIG. 68 is a diagram illustrating an example of a meta-information table;

FIG. 69 is a diagram illustrating an example of a meta-information table; and

FIG. 70 is a diagram illustrating an example of a meta-information table.

DESCRIPTION OF EMBODIMENTS

As a technology related to the data distribution network, for example, a network that distributes data using a distributed ledger technique using block chain has been proposed.

However, in the data distribution network, leakage to other people due to secondary use of data (copying, quoting, and the like) has become a problem. Further, other than the data itself, know-how such as a data processing method and a data analysis method in a data processing service may not be published to others in some cases. In order to smoothly operate the data distribution network, there are demands for a data distribution network that prevents secondary use of data and leakage of processing services.

A communication program, a communication method, and a communication device that prevent secondary use of data and leakage of processing services may be provided. Hereinafter, embodiments will be described with reference to the drawings.

First Embodiment

Figure 1:
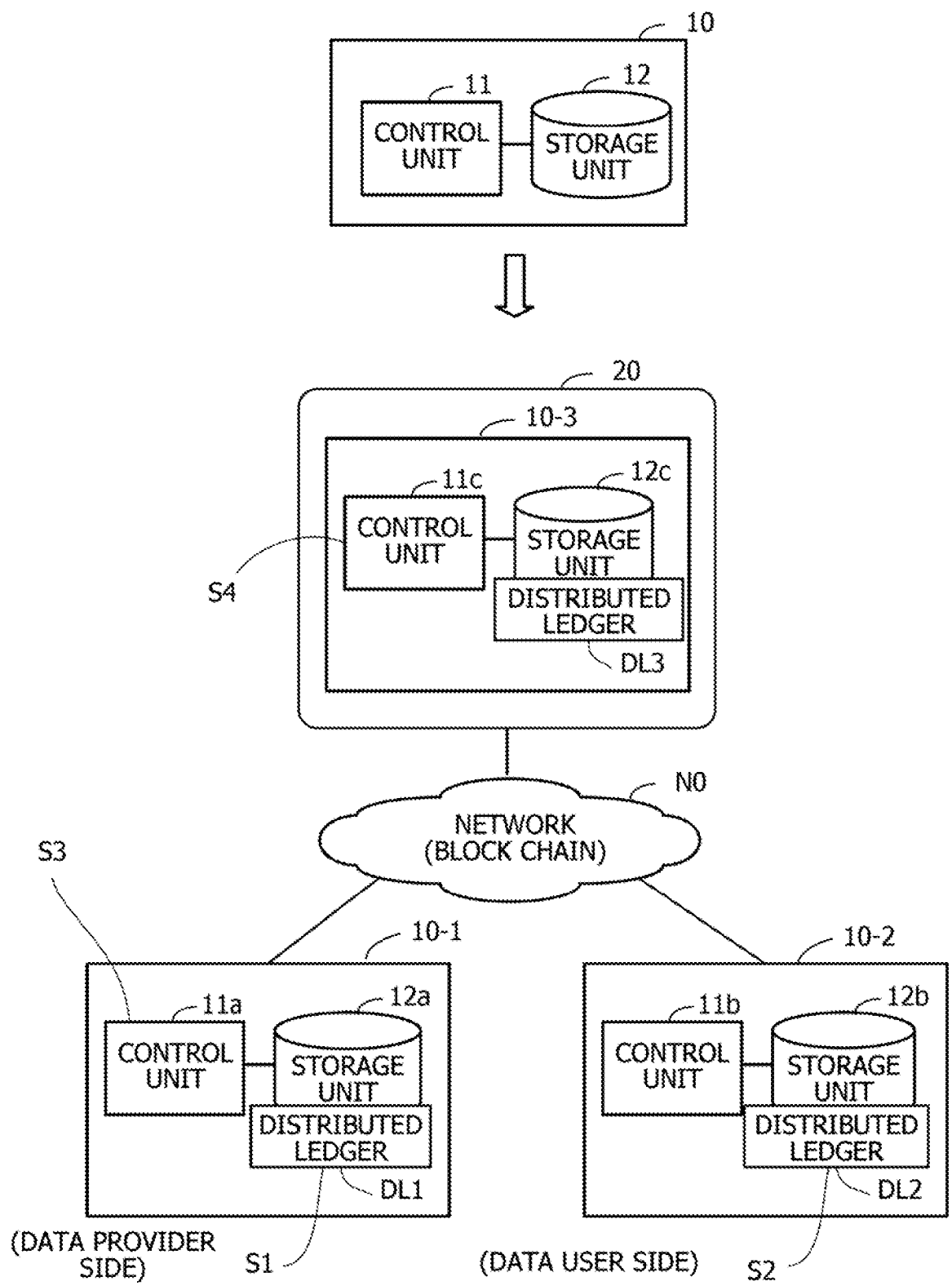
FIG. 1 is a diagram for describing an example of a communication device according to a first embodiment.

First, a first embodiment will be described with reference to FIG. 1. FIG. 1 is a diagram for describing an example of a communication device according to the first embodiment. A communication device 10 is included in a network and includes a control unit 11 and a storage unit 12.

The control unit 11 connects to another device via a network to control communication. The storage unit 12 has a storage area of a distributed ledger using a block chain and stores various data required for communication control. Respective processes of the control unit 11 and the storage unit 12 are implemented by a processor, which is not illustrated, included in the communication device 10 by executing a predetermined program.

Operation will be described using the example illustrated in FIG. 1. Communication devices 10-1, 10-2 and a data processing environment 20 are connected to a network NO, and the data processing environment 20 includes a communication device 10-3. Further, a block chain platform is constructed by the communication devices 10-1, 10-2, 10-3.

The communication device 10-1 includes a control unit 11a and a storage unit 12a, the communication device 10-2 includes a control unit 11b and a storage unit 12b, and the communication device 10-3 includes a control unit 11c and a storage unit 12c. The storage unit 12a has a storage area for a distributed ledger DL1, the storage unit 12b has a storage area for a distributed ledger DL2, and the storage unit 12c has a storage area for a distributed ledger DL3. Note that information stored in the distributed ledgers DL1, DL2, DL3 is shared by distributed ledger management by the block chain.

The communication device 10-1 is a device belonging to a data provider side, and the communication device 10-2 is a device belonging to a data user side. The communication device 10-3 is a device having a function of data processing.

[Step S1] The control unit 11a registers first metadata including data provided by a data provider and attribute information of the data in the distributed ledger DL.

[Step S2] The control unit 11b registers, in the distributed ledger DL2, second metadata including a processing service for when processing and using the data by a data user and attribute information of the processing service.

[Step S3] The control unit 11a determines whether or not to approve the processing service based on the first metadata and the second metadata.

[Step S4] When a result of the determination of whether or not to approve the processing service is to approve, the control unit 11c executes data processing based on the processing service in the data processing environment that disapproves access from the communication device 10-1 and the communication device 10-2 to the data and the processing service.

As described above, in the communication device 10, when it is determined to approve the processing service based on data and metadata that is attribute information of a processing service of the data, data processing based on the processing service is performed in a data processing environment of a third party (in a data processing environment that disapproves access from the communication devices 10-1, 10-2 to the data and the processing service). Therefore, it is possible to prevent secondary use of data and leakage of processing services (including the data processing method).

Second Embodiment

Figure 2:
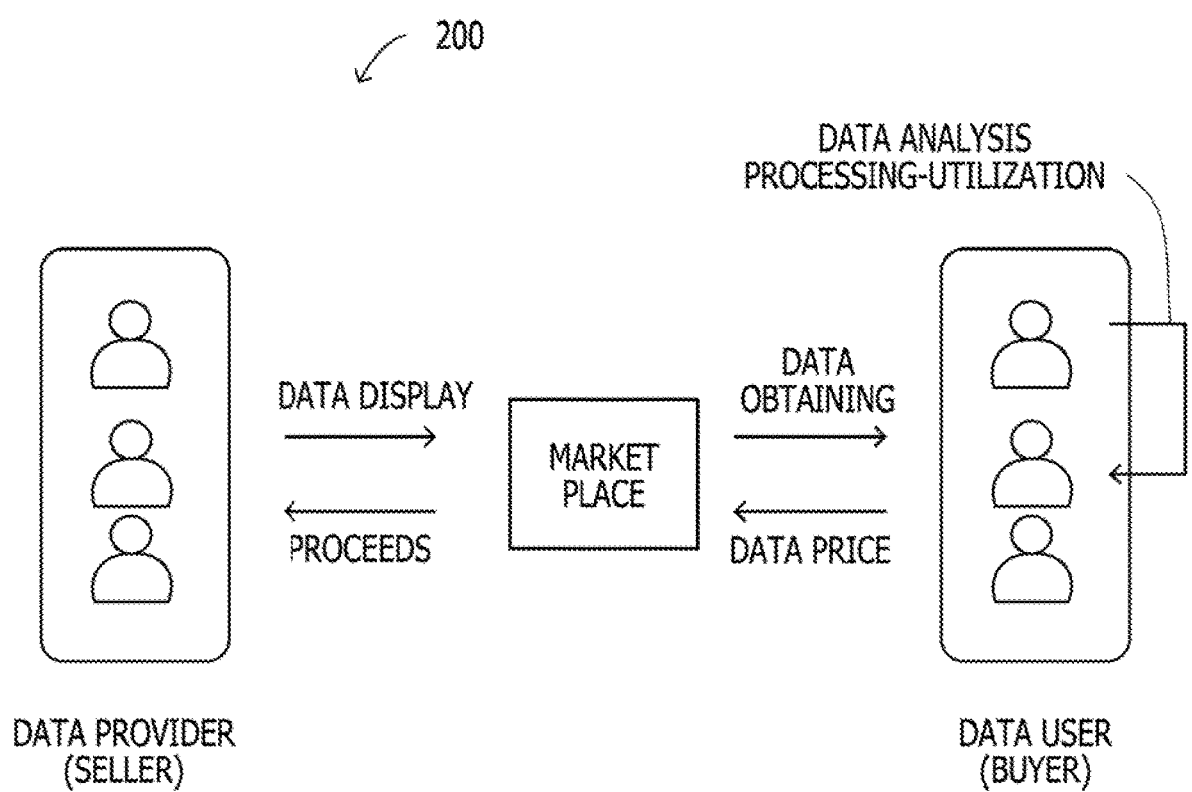
FIG. 2 is a diagram for describing a data distribution market.

Next, a second embodiment will be described. First, a data distribution market will be described. FIG. 2 is a diagram for describing a data distribution market. In a data distribution market 200, selling and buying of data is carried out such that a data provider (seller) sets a price for data and places the data on sale, and a data user (buyer) buys the data.

Data users process and analyze the purchased data to extract information useful for their business and utilize the information. Further, when the payment is made for the purchased data, it can be expected that profits will be generated for the data provider and that more valuable data will be gathered in the distribution place.

However, since the data that is a product of the data distribution market 200 can be duplicated, it is important how to protect primary data issued by the data provider. If a user who abuses the ability to copy data leaks the primary data to others without permission, the data provider suffers disadvantages. Furthermore, even a data user who has no intention of an illegal act can copy the data, there is a possibility that primary data may be accidentally leaked from the source of the data user.

On the other hand, not only data but also know-how of data usage such as data processing and analysis is, for example, an intellectual property and may not be published to others in some cases. In the data distribution market 200 where the content of such a data processing service can be seen by others, the data user may dislike that the know-how is leaked to others, and there is also a possibility that the use of data will not advance.

As described above, in order to smoothly operate the data distribution market 200, a mechanism for preventing secondary use of data and leakage of processing services is needed.

Figure 3:
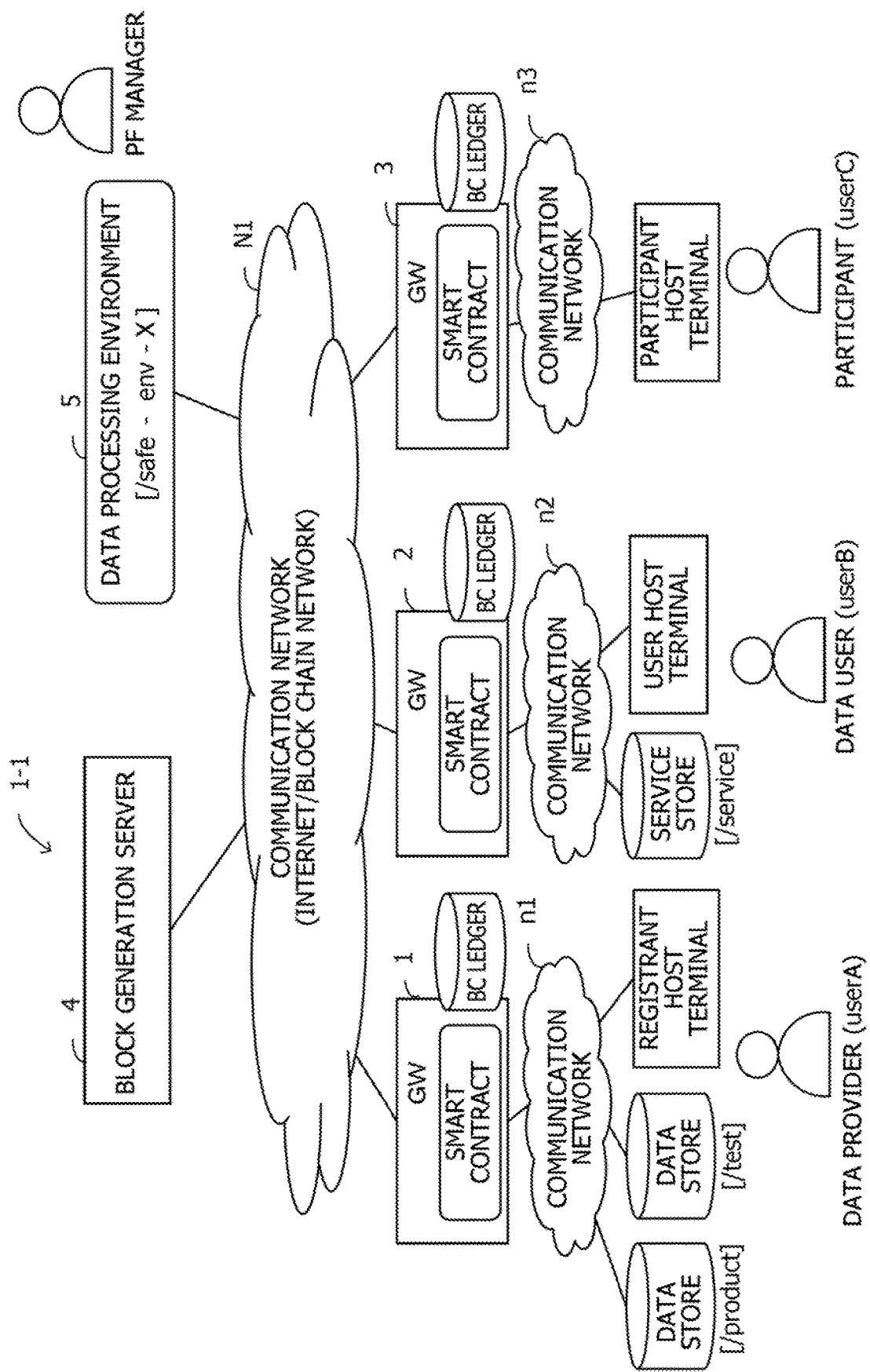
FIG. 3 is a diagram illustrating an example of a communication system according to a second embodiment.

FIG. 3 is a diagram illustrating an example of a communication system according to the second embodiment. In a communication system 1-1 according to the second embodiment, a gateway (hereinafter referred to as GW) 1, GW2, GW3, a block generation server 4, and a data processing environment 5 are connected to a communication network N1 that achieves a block chain (hereinafter referred to as BC). Note that GW1, GW2, and GW3 correspond to the communication device 10. In the example of FIG. 3, the GW1 corresponds to the communication device 10-1 of FIG. 1, and the GW2 corresponds to the communication device 10-2 of FIG. 1.

The GW1, GW2, GW3 are nodes each having a distributed ledger (hereinafter referred to as a BC ledger) and a smart contract that is a protocol for making an automatic contract, and are connected to communication networks n1, n2, n3, respectively. Note that the communication network N1 is, for example, the Internet or BC network, and the communication networks n1, n2, n3 are, for example, local networks in a company.

A registrant host terminal, a data store [/product], and a data store [/test] are connected to the communication network n1 as a data provider (userA). The data store [/product] stores actual data, and the data store [/test] stores test data (test (simulated) data).

A user host terminal and a service store [/service] are connected to the communication network n2 as a data user (userB). Processing services are stored in the service store [/service]. Further, a participant host terminal is connected to the communication network n3 as a participant (userC) other than the parties.

Here, the block generation server 4 performs a process of blocking transactions (a set of series of processes) issued by the GW1, GW2, GW3 and transmitting a block to each GW. For the block generation server 4, for example, an ordering service of Hyperledger Fabric, which is open source software (OSS) of a consortium type block chain, may be applied. In the following, a case of a consortium type block chain will be used as an example, but the communication system may be similarly implemented with a public type block chain. In a case of the public type, the block generation server 4 corresponds to a mining device.

Furthermore, the data processing environment 5 (hereinafter sometimes referred to as a data processing environment [safe-env-X] or the like) is managed by a platform manager (hereinafter referred to as a PF manager), and is a server environment that all participants recognizes as safe, and data processing is safely performed in this place.

Figure 4:
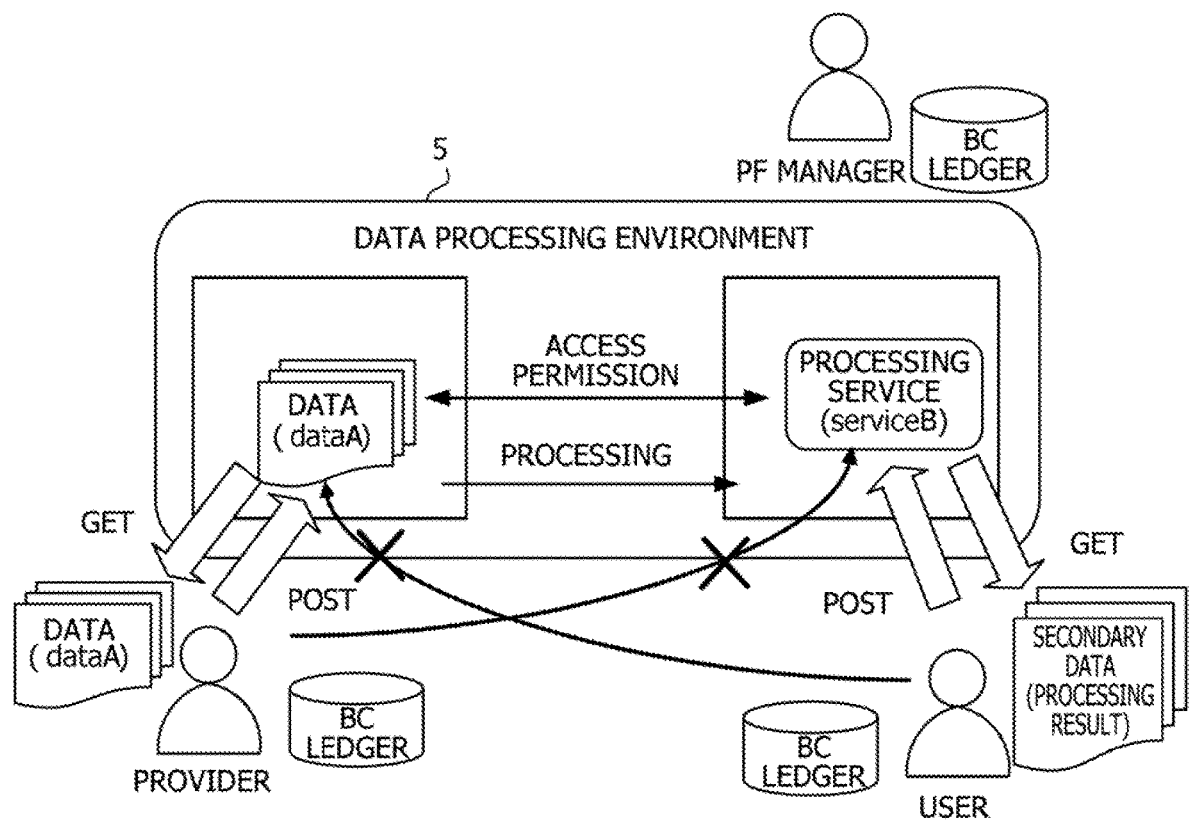
FIG. 4 is a diagram illustrating an example of an operation performed in a communication system.

FIG. 4 is a diagram illustrating an example of operation performed in the communication system. In the communication system 1-1, while all BC participants verify the processing content utilizing a smart contract mechanism, data processing is executed in a reliable environment where the data provider and the data user can trust each other.

The reliable environment corresponds to the data processing environment [safe-env-X] illustrated in FIG. 3. This is a third-party environment that the user recognizes as safe, and is a protected space so that data and processing services may not be directly viewed from outside. For example, it is a system in which only requests (GET, POST) of Hypertext Transfer Protocol (HTTP) and Hypertext Transfer Protocol Secure (HTTPS), which are built on a server prepared by the PF manager or a consortium owner, are accepted and processed based on information in the BC ledger.

Note that GET and POST are used as a request method. The GET is used when receiving data from the server, and desired data is received by specifying a request Uniform Resource Locator (URL). Further, the POST is used when transmitting data to the server, and data is embedded in a request body, so as to transfer the data to the location specified in a request URL.

When the data user desires to use the data by a processing service, the data user creates a processing service that describes data processing. Then, the data user sends a request to use the data by issuing a transaction including the created processing service and meta-information including the attribute of the processing service to the data provider.

The data provider confirms that the processing service does not use illegal data and approves data access. Once access to the data is approved, the approved data is set within the data processing environment so as to be processed by the processing service.

Communication between the data provider and the data user is performed by a smart contract on the BC, and the meta-information registered together with the provided data and the processing service allows not only the parties but also the third party to verify whether the processing service operates properly. Thus, it is possible to provide a platform in which only processing results agreed by both the data provider and user are distributed without showing the primary data and the processing service between the data user and the data provider.

<Hardware Configuration>

Figure 5:
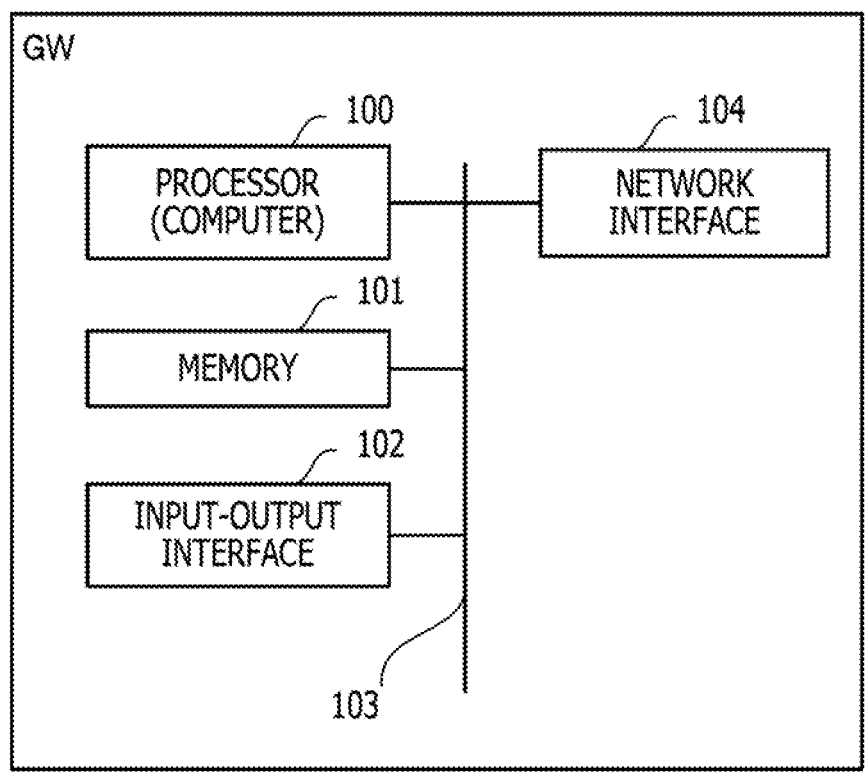
FIG. 5 is a diagram illustrating an example of a hardware configuration of a GW.

FIG. 5 is a diagram illustrating an example of a hardware configuration of a GW. The GW (communication device 10) is entirely controlled by the processor (computer) 100. The processor 100 implements a function of the control unit 11.

A memory 101, an input-output interface 102, and a network interface 104 are connected to the processor 100 via a bus 103. The processor 100 may also be a multiprocessor. The processor 100 is, for example, a central processing unit (CPU), a micro processing unit (MPU), a digital signal processor (DSP), an application specific integrated circuit (ASIC), or a programmable logic device (PLD). Further, the processor 100 may be a combination of two or more elements of a CPU, an MPU, a DSP, an ASIC, and a PLD.

The memory 101 includes a function of the storage unit 12 and is used as a main storage device of the GW. In the memory 101, at least a part of an operating system (OS) program or an application program to be executed by the processor 100 is temporarily stored. Furthermore, the memory 101 stores various data needed in processing by the processor 100.

Further, the memory 101 is also used as an auxiliary storage device of the GW, and stores a program of OS, application programs, and various data. The memory 101 may include a semiconductor storage device such as a flash memory or a solid state drive (SSD), or a magnetic recording medium such as a hard disk drive (HDD) as an auxiliary storage device. Note that the memory 101 stores a BC ledger, a routing table, and a program for executing a smart contract.

Peripheral devices connected to the bus 103 include an input-output interface 102 and a network interface 104. The input-output interface 102 may be connected to a monitor (for example, a light emitting diode (LED), a liquid crystal display (LCD), or the like) that functions as a display device that displays the state of the GW according to an instruction from the processor 100.

Moreover, the input-output interface 102 can be connected to an information input device such as a keyboard and a mouse, and transmits a signal sent from the information input device to the processor 100.

Furthermore, the input-output interface 102 also functions as a communication interface for connecting peripheral devices. For example, the input-output interface 102 may be connected to an optical drive device that reads data recorded on an optical disk using laser light or the like. Examples of the optical disc include Blu-ray Disc (registered trademark), compact disc read only memory (CD-ROM), CD-Recordable (R)/Rewritable (RW), and the like.

Further, for example, to the input-output interface 102, a memory device and a memory reader-writer may be connected. The memory device is a recording medium equipped with a communication function with the input-output interface 102. The memory reader-writer is a device which writes data in a memory card or reads data from the memory card. The memory card is a card type recording medium.

The network interface 104 is connected to a network and performs network interface control. For example, a network interface card (NIC), a wireless local area network (LAN) card, or the like may be used. Data received by the network interface 104 is output to the memory 101 and the processor 100.

The processing function of the GW may be implemented by the hardware configuration as described above. For example, the GW may perform processing of the present embodiment by the processor 100 executing each predetermined program.

The GW implements a processing function of the second embodiment by executing, for example, a program recorded in a computer-readable recording medium. A program in which the processing content to be executed by the GW is described may be recorded in various recording media.

For example, the program to be executed by the GW may be stored in the auxiliary storage device. The processor 100 loads at least a part of the program in the auxiliary storage device on the main storage device and executes the program.

Further, it may also be recorded in a portable recording medium such as an optical disk, a memory device, a memory card, or the like. The program stored in the portable recording medium becomes executable after being installed on the auxiliary storage device, for example, by control of the processor 100. Furthermore, the processor 100 may also read the program directly from the portable recording medium and execute the program.

Note that similar hardware may be applied to a data processing server 50 described later with reference to FIG. 7 as the hardware of the GW described above.

Figure 6:
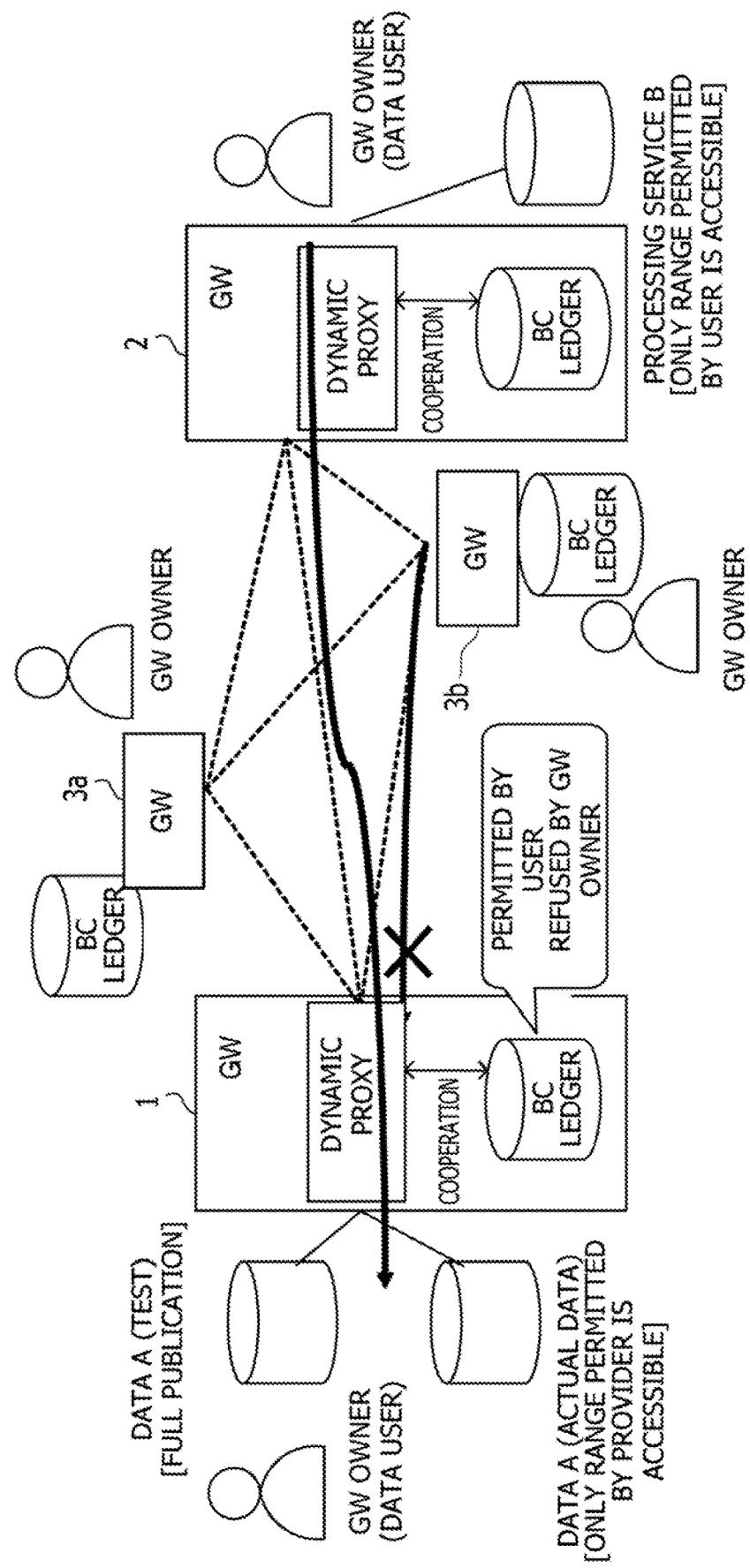
FIG. 6 is a diagram illustrating an example of a BC platform in which a communication system is built.

FIG. 6 is a diagram illustrating an example of a BC platform on which a communication system is constructed. In the BC, control of the BC ledger and BC ledger synchronization and smart contract control are performed to achieve access control for every data and processing service.

Each of the participants exchanging data have GW1, GW2, GW3a, GW3b, and an access policy is shared through the BC ledgers provided in the GW1, GW2, GW3a, GW3b, so as to perform access control with each other. Then, a dynamic proxy that sets the routing table in cooperation with the BC ledger provides an environment in which the data provider itself is capable of controlling access. Note that a proxy is dynamically set in the GW1, GW2, GW3a, GW3b to have a relay function, and for example, an external node is allowed to connect via the GW having the proxy.

Further, by using "test data (simulated data)" created by simulating data A (actual data) in advance by the data provider, the data user may confirm that the data processing is performed as intended, and may use the data smoothly.

Moreover, since it becomes possible to manage the data processing service, for example, only part of the processing service B permitted by the data user who owns the processing service B may be accessible to other users.

Figure 7:
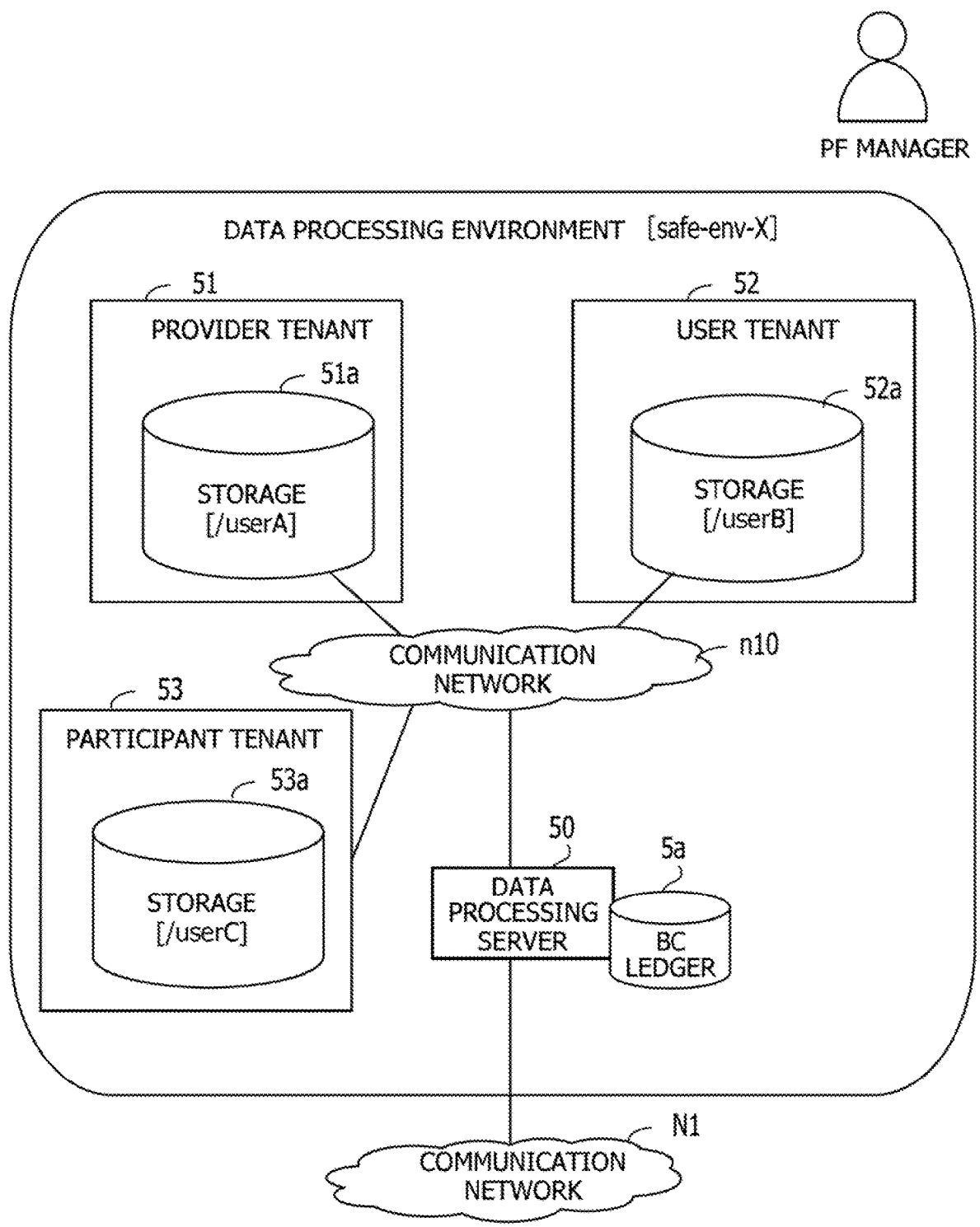
FIG. 7 is a diagram illustrating an example of an internal configuration of a data processing environment.

FIG. 7 is a diagram illustrating an example of an internal configuration of the data processing environment. The data processing environment [safe-env-X] includes a provider tenant 51, a user tenant 52, a participant tenant 53, a communication network n10, and a data processing server 50 (corresponding to the communication device 10-3 in FIG. 1) having a BC ledger 5a, and the data processing server 50 is connected to the communication network N1 illustrated in FIG. 3.

The provider tenant 51 has a storage 51a (storage [/userA]), the user tenant 52 has a storage 52a (storage [/userB]), and the participant tenant 53 has a storage 53a (storage [/userC]).

Inside the data processing environment [safe-env-X], a tenant for every user is prepared in this manner, and tenants are not able to access each other. The data processing environment [safe-env-X] accepts only HTTP/HTTPS requests (GET, POST) as a specific communication protocol.

Further, the data processing server 50 performs a data processing process based on the information in the BC ledger 5a, and only returns provided data and a data processing result using the processing service to the user. Therefore, an environment is constructed in which the user may not directly browse or edit the provided data or the processing service.

Figure 8:
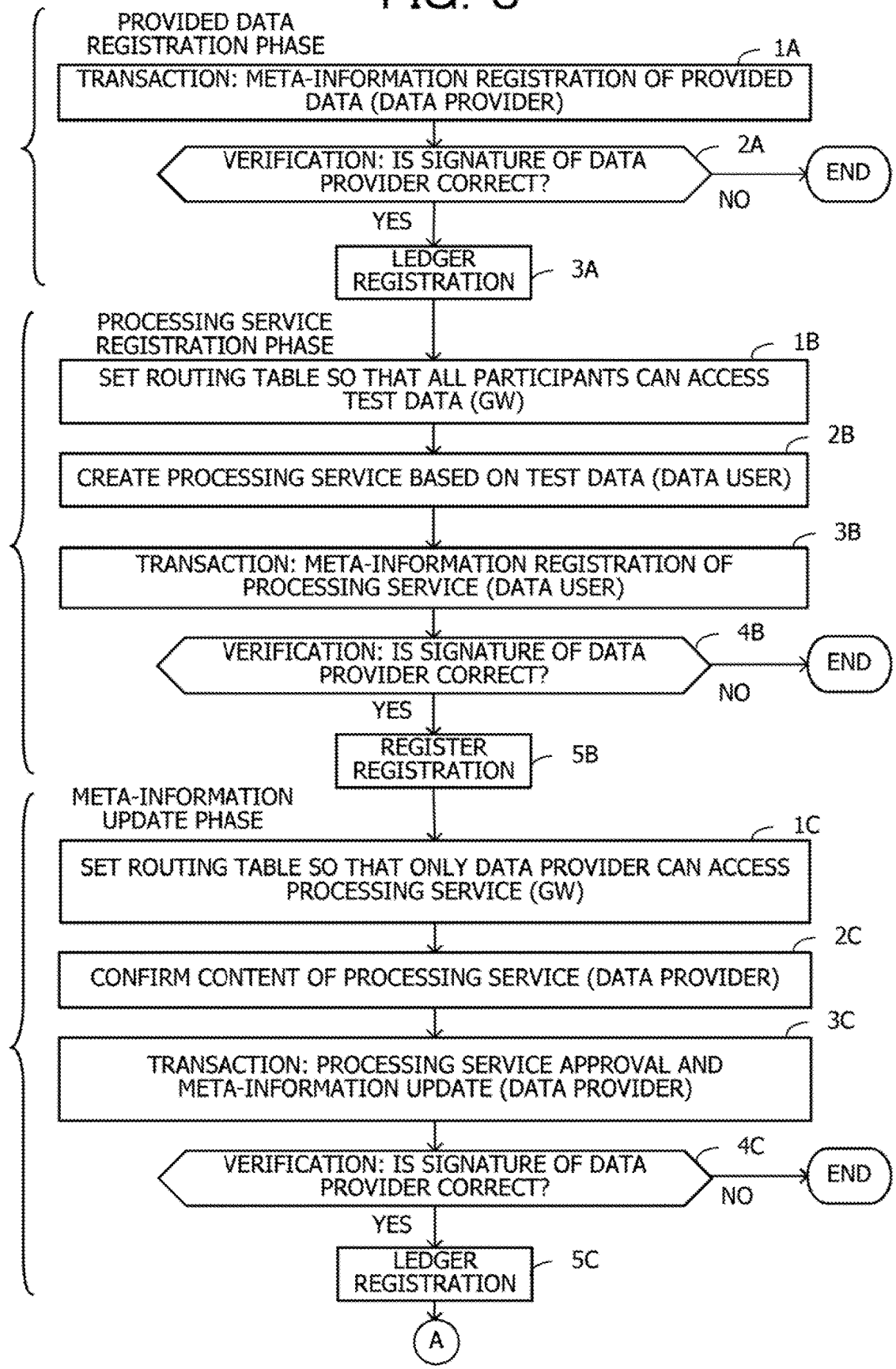
FIG. 8 is a diagram illustrating an example of an overall processing flow of a communication system.
Figure 9:
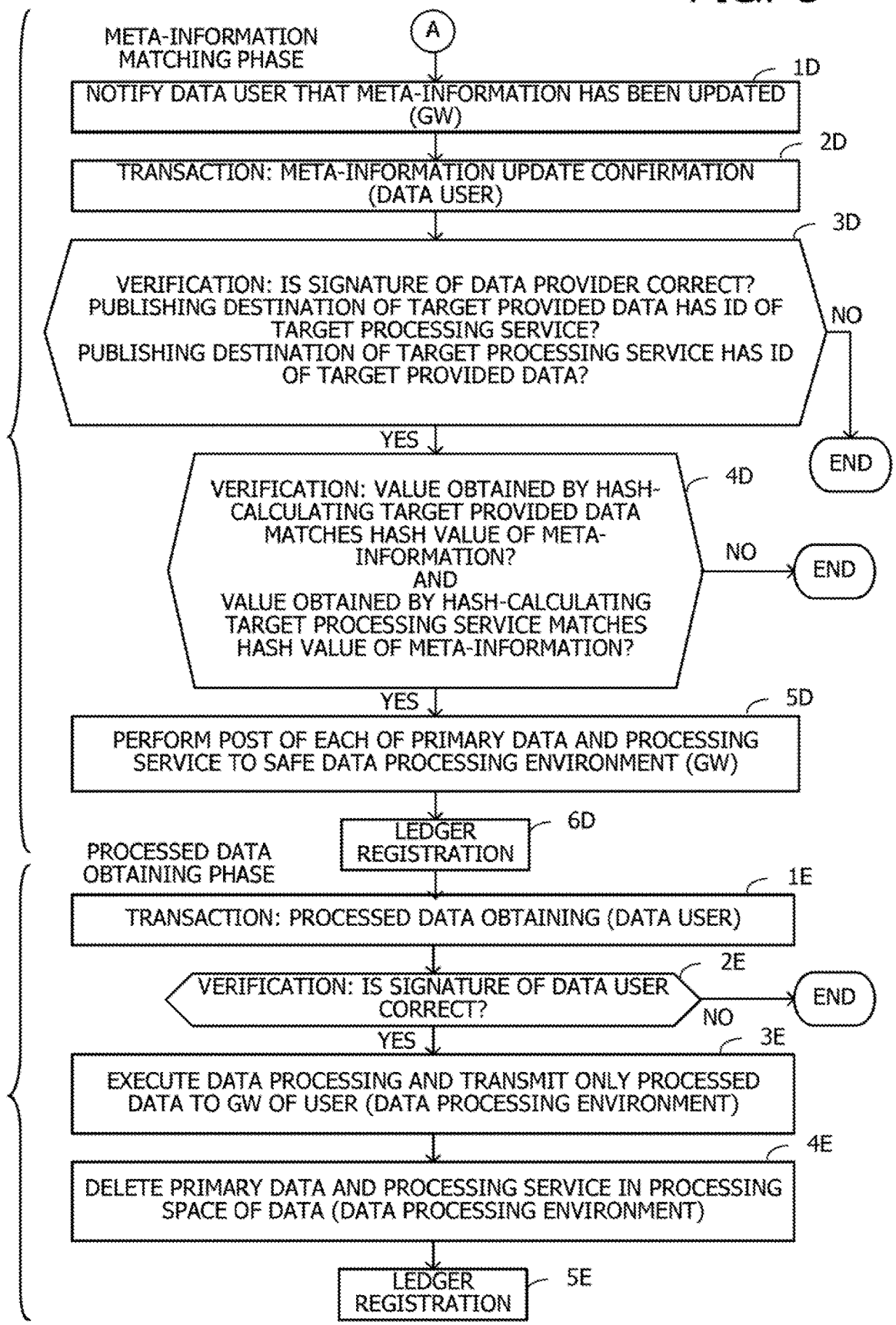
FIG. 9 is a diagram illustrating an example of the overall processing flow of the communication system.

FIGS. 8 and 9 are diagrams illustrating an example of an overall processing flow of the communication system. Parentheses in the flow in the diagram illustrate a main body of the processing. The overall processing flow has items of a provided data registration phase (step 1A to step 3A) and a processing service registration phase (step 1B to step 5B).

Moreover, the overall processing flow has items of a meta-Information update phase (steps 1C to 5C), a meta-information matching phase (steps 1D to 6D), and a processed data obtaining phase (steps 1E to 5E).

[Step 1A] A data provider (GW) registers meta-information of provided data (transaction).

[Step 2A] The GW verifies whether or not a signature of the data provider is correct. When it is correct, the flow proceeds to a process of step 3A.

[Step 3A] The GW performs ledger registration. The flow proceeds to a process of step 1B.

[Step 1B] The GW sets up a routing table so that all the participants are able to access test data.

[Step 2B] The data user (GW) creates a processing service based on the test data.

[Step 3B] The data user (GW) registers meta-information of the processing service (transaction).

[Step 4B] The GW verifies whether or not a signature of the data user is correct. When it is correct, the flow proceeds to a process of step 5B.

[Step 5B] The GW performs ledger registration. The flow proceeds to a process of step 1C.

[Step 1C] The GW sets up the routing table so that only the data provider is able to access the processing service.

[Step 2C] The data provider (GW) confirms the content of the processing service.

[Step 3C] The data provider (GW) approves the processing service and updates the meta-information (transaction).

[Step 4C] The GW verifies whether or not the signature of the data provider is correct. When it is correct, the flow proceeds to a process of step 5C.

[Step 5C] The GW performs ledger registration. The flow proceeds to a process of step 1D.

[Step 1D] The GW notifies the data user that the meta-information has been updated.

[Step 2D] The data user (GW) confirms the update of the meta-information (transaction).

[Step 3D] The GW verifies whether or not the signature of the data user is correct whether or not a publishing destination of the target provided data has ID of the target processing service, and whether or not a publishing destination of the target processing service has ID of the target provided data. When the signature of the data user is correct and the publishing destination of the target provided data has the ID of the target processing service and the publishing destination of the target processing service has the ID of the target provided data, the flow proceeds to a process of step 4D.

[Step 4D] The data processing environment verifies whether or not a value obtained by hash-calculating the target provided data matches a hash value of the meta-information, and whether or not a value obtained by hash-calculating the target processing service matches the hash value of the meta-information. When the value obtained by hash-calculating the target provided data matches the hash value of the meta-information and the value obtained by hash-calculating the target processing service matches the hash value of the meta-information, the flow proceeds to a process of step 5D.

[Step 5D] The GW performs a POST of each of primary data and the processing service to the safe data processing environment.

[Step 6D] The GW performs ledger registration. The flow proceeds to a process of step 1E.

[Step 1E] The data user (GW) obtains processed data (transaction).

[Step 2E] The GW verifies whether or not the signature of the data user is correct. When it is correct, the flow proceeds to a process of step 3E.

[Step 3E] The data processing environment executes data processing and transmits only the processed data to the GW of the user.

[Step 4E] The data processing environment deletes the primary data and the processing service in the data processing environment.

[Step 5E] The GW performs ledger registration.

Next, operation in each phase of the second embodiment will be described in detail.

<Advance Preparation>

As a safe data processing environment, the PF manager prepares the data processing environment safe-env-X illustrated in FIG. 7. Furthermore, information of the data processing environment safe-env-X is registered in each GW, so that the network is capable of communicating therewith.

Figure 10:
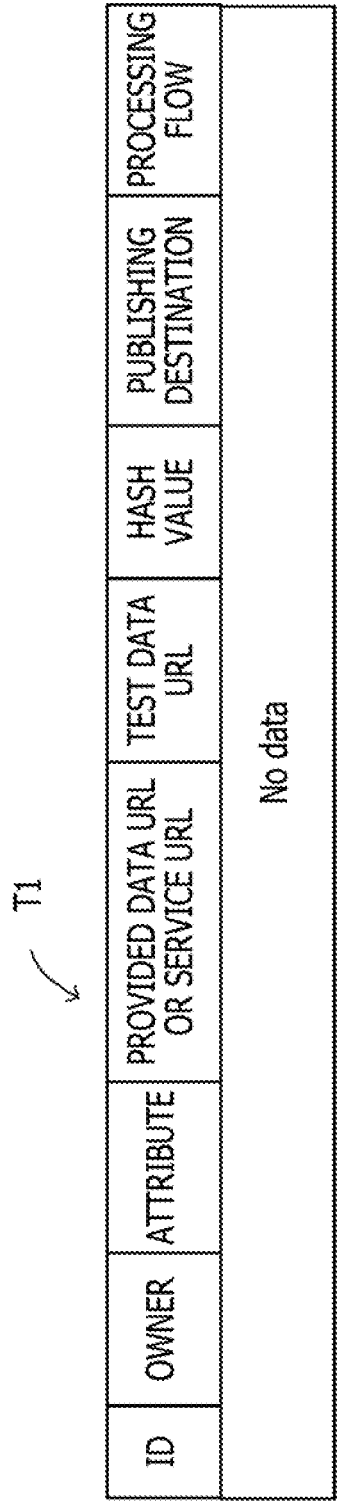
FIG. 10 is a diagram illustrating an example of a meta-information table.

FIG. 10 is a diagram illustrating an example of a meta-information table. A meta-information table T1 is a table for managing meta-information for publishing a usage range of data. The meta-information table T1 has items of ID, owner, attribute, provided data URL or service URL, test data URL, hash value, publishing destination, and processing flow. In an initial state, there is no data registered for each item. The meta-information table is stored in the BC ledger.

Note that in the above items, the attribute indicates whether it is provided data, processing service, or processed data. The provided data URL or service URL is the URL of an access destination when obtaining the provided data or the processing service.

The test data URL is the URL of an access destination when obtaining test data. The hash value is a value obtained by hash-calculating data (or a processing service). Based on the hash value, it is determined whether or not transmitted data (or a processing service) matches registered data (or a processing service).

FIG. 11 is a diagram illustrating an example of proxy setting tables. Proxy setting tables T2, T3, T4 are tables for managing information used for distribution of requests received by the GW for each of the GW1, GW2, GW3, and have items of RequestURL, method, and SendTo. The proxy setting tables are stored in the respective BC ledgers.

The GW searches for an item that matches the RequestURL and method, and transfers a matching request to the URL written in the SendTo. When a request that does not match is received, Not Found is returned and the request is discarded.

In an initial state, there is included a setting for transferring a transaction request issued by each GW owner and block information distributed from the block generation server 4 to the smart contract.

For example, the proxy setting table T2 includes a setting (/GW1/smartContract) for transferring information of a transaction request (/transaction) and block (/block) distributed from the block generation server 4 to the smart contract of the GW1. Note that since any request other than these is discarded, in the initial state, it is not possible to access any data or service from each GW.

<Provided Data Registration Phase>

Figure 12:
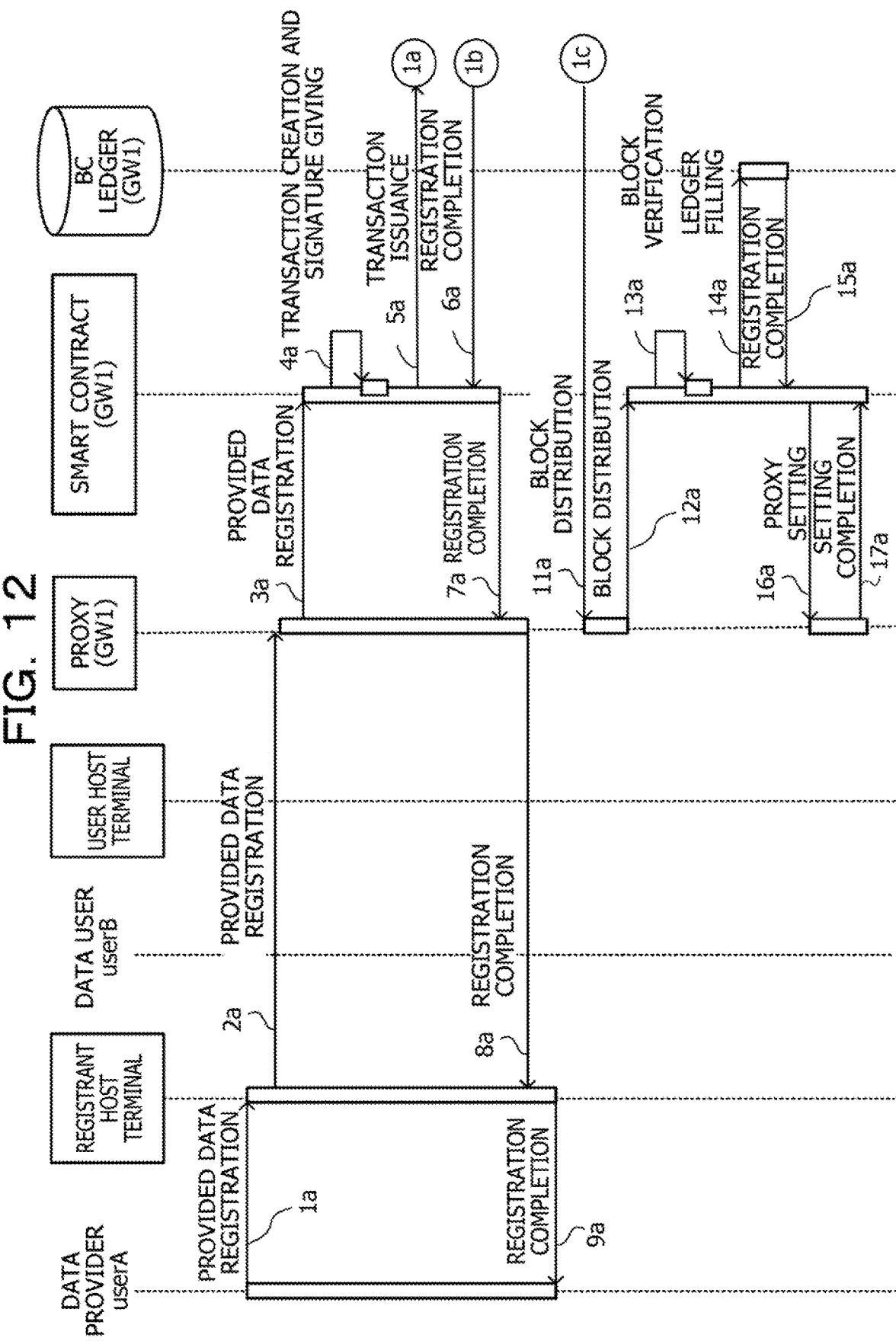
FIG. 12 is a sequence diagram illustrating an example of a provided data registration phase.
Figure 13:
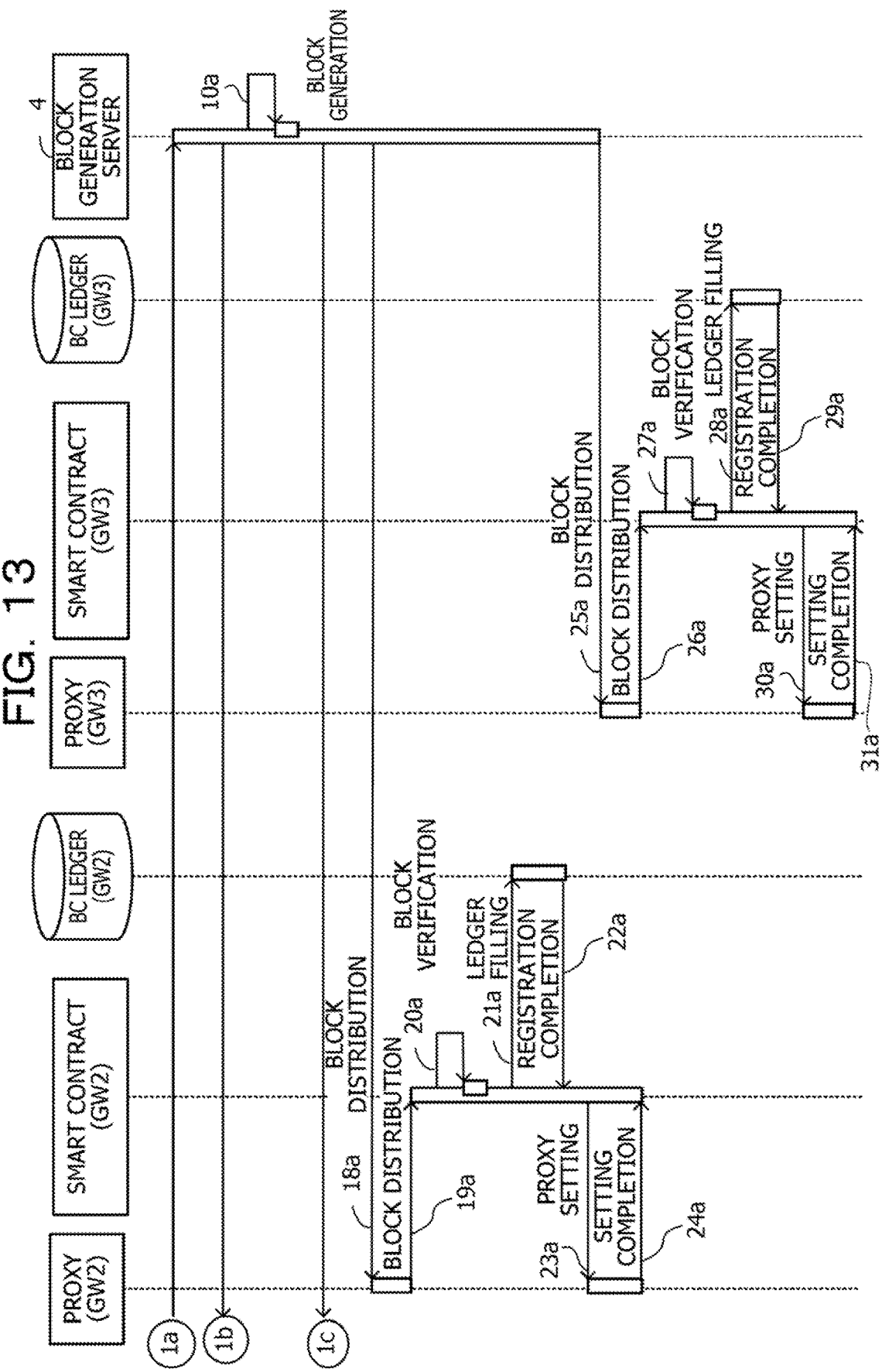
FIG. 13 is a sequence diagram illustrating an example of the provided data registration phase.

FIGS. 12 and 13 are sequence diagrams illustrating an example of a provided data registration phase.

[Step 1a] A data provider (userA) registers provided data in a registrant host terminal.

[Step 2a] The registrant host terminal registers the provided data in a proxy (GW1).

[Step 3a] The proxy (GW1) registers the provided data in a smart contract (GW1).

[Step 4a] The smart contract (GW1) creates a transaction and gives a signature.

[Step 5a] The smart contract (GW1) issues the transaction to the block generation server 4.

[Step 6a] The block generation server 4 notifies the smart contract (GW1) of registration completion.

[Step 7a] The smart contract (GW1) notifies the proxy (GW1) of the registration completion.

[Step 8a] The proxy (GW1) notifies the registrant host terminal of the registration completion.

[Step 9a] The registrant host terminal notifies the data provider (userA) of the registration completion.

[Step 10a] The block generation server 4 generates a block.

[Step 11a] The block generation server 4 distributes the block to the proxy (GW1).

[Step 12a] The proxy (GW1) distributes the block to the smart contract (GW1).

[Step 13a] The smart contract (GW1) performs block verification.

[Step 14a] The smart contract (GW1) fills in the BC ledger (GW1).

[Step 15a] The BC ledger (GW1) notifies the smart contract (GW1) of registration completion.

[Step 16a] The smart contract (GW1) performs proxy setting on the proxy (GW1).

[Step 17a] The proxy (GW1) notifies the smart contract (GW1) of setting completion.

[Step 18a] The block generation server 4 distributes the block to the proxy (GW2).

[Step 19a] The proxy (GW2) distributes the block to the smart contract (GW2).

[Step 20a] The smart contract (GW2) performs block verification.

[Step 21a] The smart contract (GW2) fills in the BC ledger (GW2).

[Step 22a] The BC ledger (GW2) notifies the smart contract (GW2) of the registration completion.

[Step 23a] The smart contract (GW2) performs proxy setting on the proxy (GW2).

[Step 24a] The proxy (GW2) notifies the smart contract (GW2) of setting completion.

[Step 25a] The block generation server 4 distributes the block to the proxy (GW3).

[Step 26a] The proxy (GW3) distributes the block to the smart contract (GW3).

[Step 27a] The smart contract (GW3) performs block verification.

[Step 28a] The smart contract (GW3) fills in the BC ledger (GW3).

[Step 29a] The BC ledger (GW3) notifies the smart contract (GW3) of registration completion.

[Step 30a] The smart contract (GW3) performs proxy setting on the proxy (GW3).

[Step 31a] The proxy (GW3) notifies the smart contract (GW3) of setting completion.

In the provided data registration phase as described above, the data provider issues a provided data registration transaction to the own gateway (GW1). The provided data includes, for example, "data ID (ID)", "signature of provider (owner)", "attribute", and "URL for accessing provided data (provided data URL or service URL)" managed in the meta-information table described above.

Further, the provided data includes "URL for accessing test data (test data URL)", "hash value of provided data (hash value)" and "publishing destination of provided data (publishing destination)". Furthermore, each GW verifies that the signature of the data provider is correct, and when there is no problem, the provided data is written in the BC ledger.

When the writing in the BC ledger is completed, the meta-Information associated with the data ID is shared by the GW1, GW2, GW3 on the BC ledger, and a proxy setting for permitting data access from outside is dynamically generated.

FIG. 14 is a diagram illustrating an example of a meta-information table, and FIG. 15 is a diagram illustrating an example of proxy setting tables. A meta-information table Tia describes meta-information after the provided data registration phase (first metadata related to data is registered). Proxy setting tables T2a, T3a, T4a describe proxy setting information after the provided data registration phase. Note that "-" means a null value, and when this value is included in the publishing destination, it means that the provided data is published to no one.

The data user is able to access data by making an HTTP or HTTPS request with a data ID specified in the URL. According to the requested data ID, the proxy side performs conversion into the URL to actual data (SendTo) and transfers the request.

The URL of SendTo is in the form of "/[GW]/[path]", and for example, in a case of/GW1/test, the request is transferred to/test located under the GW1, and the test data may be obtained.

As described above, in the provided data registration phase, the test data is published to all users, but the provided data is inaccessible to anyone.

<Processing Service Registration Phase>

Figure 16:
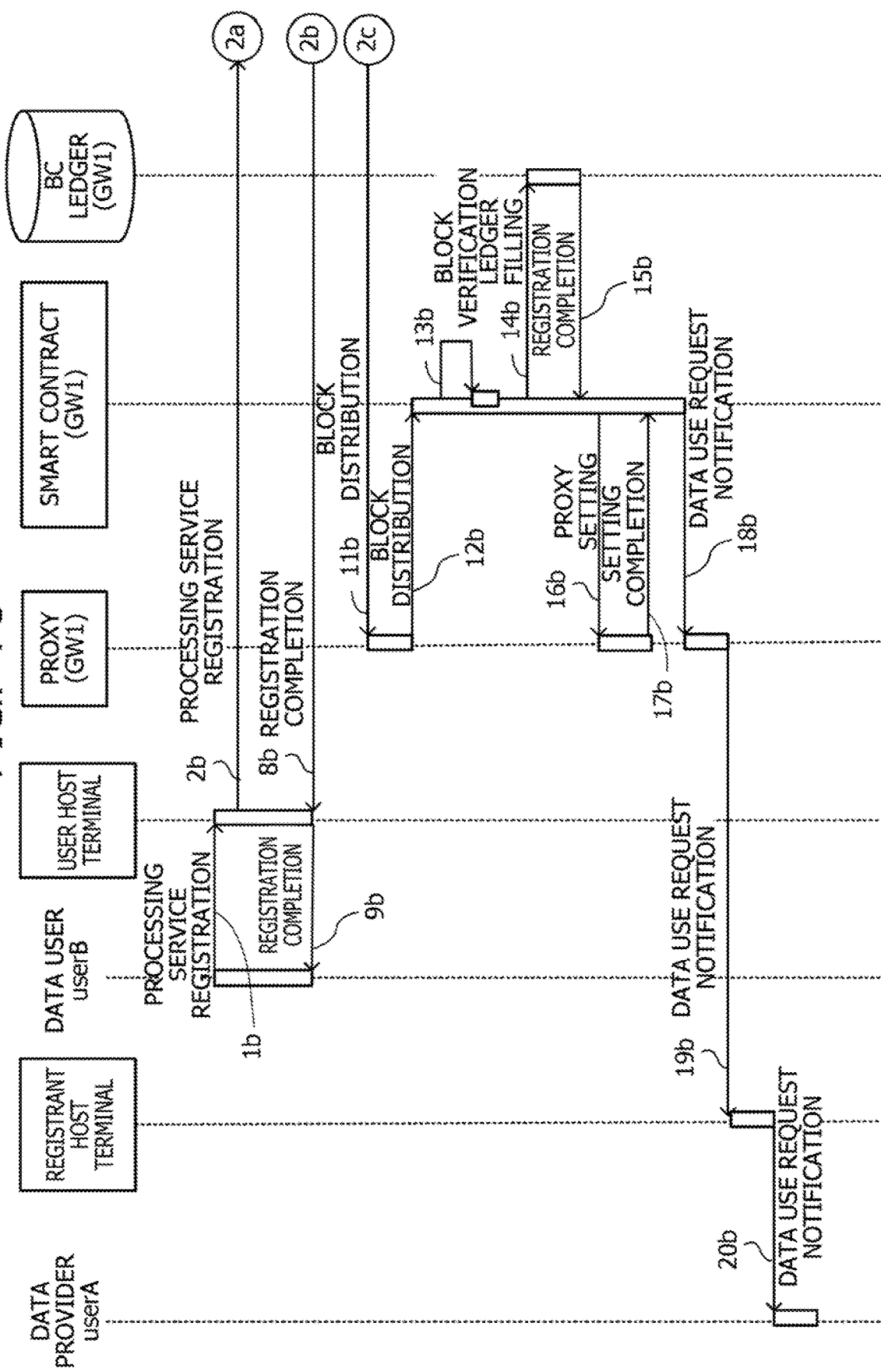
FIG. 16 is a sequence diagram illustrating an example of a processing service registration phase.
Figure 17:
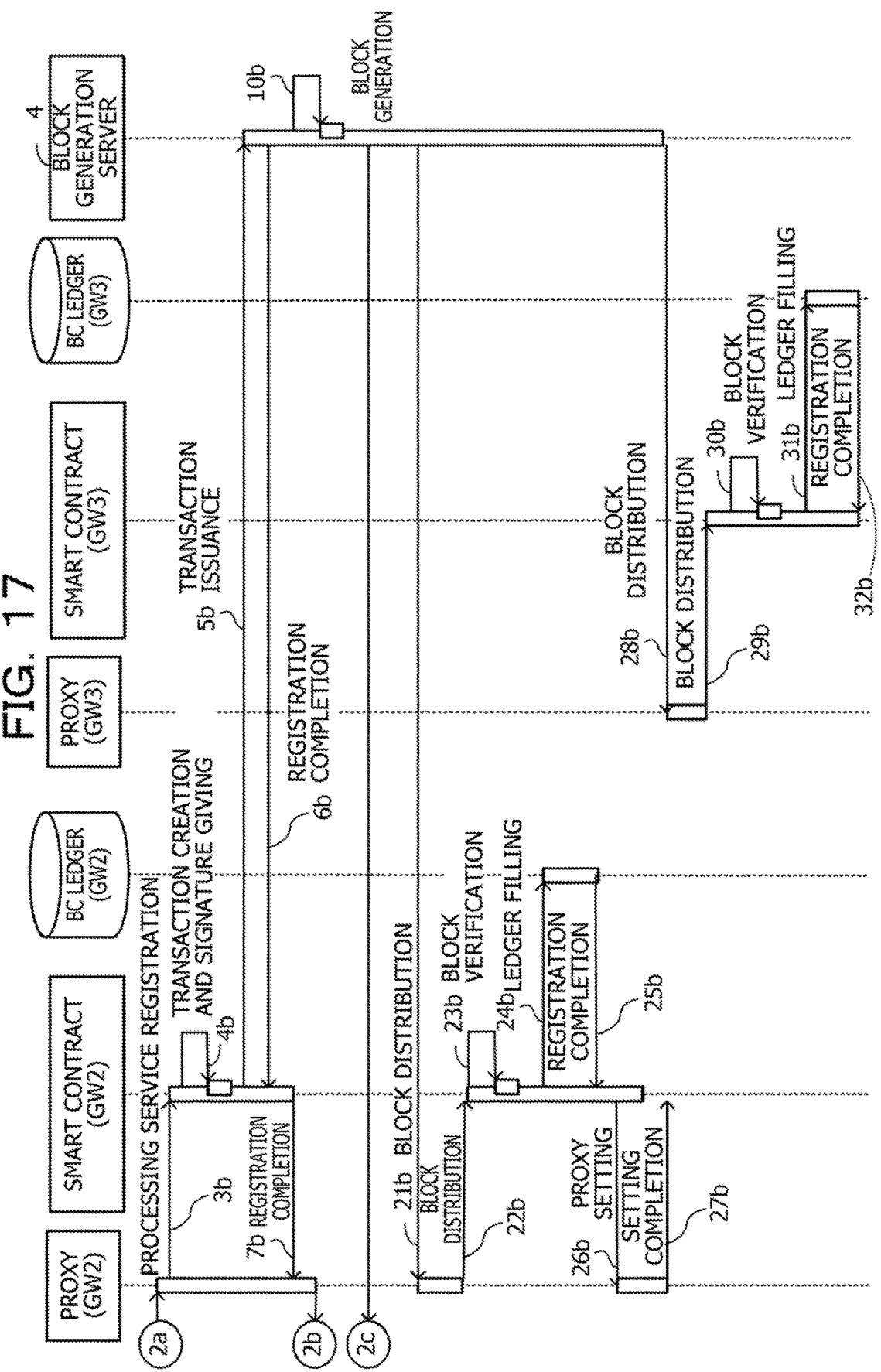
FIG. 17 is a sequence diagram illustrating an example of the processing service registration phase.

FIGS. 16 and 17 are sequence diagrams illustrating an example of a processing service registration phase.

[Step 1b] The data user (userB) registers a processing service in the user host terminal.

[Step 2b] The user host terminal registers the processing service in the proxy (GW2).

[Step 3b] The proxy (GW2) registers the processing service in the smart contract (GW2).

[Step 4b] The smart contract (GW2) creates a transaction and gives a signature.

[Step 5b] The smart contract (GW2) issues the transaction to the block generation server 4.

[Step 6b] The block generation server 4 notifies the smart contract (GW2) of registration completion.

[Step 7b] The smart contract (GW2) notifies the proxy (GW2) of the registration completion.

[Step 8b] The proxy (GW2) notifies the user host terminal of the registration completion.

[Step 9b] The user host terminal notifies the data user of the registration completion.

[Step 10b] The block generation server 4 generates a block.

[Step 11b] The block generation server 4 distributes the block to the proxy (GW1).

[Step 12b] The proxy (GW1) distributes the block to the smart contract (GW1).

[Step 13b] The smart contract (GW1) performs block verification.

[Step 14b] The smart contract (GW1) fills in the BC ledger (GW1).

[Step 15b] The BC ledger (GW1) notifies the smart contract (GW1) of registration completion.

[Step 16b] The smart contract (GW1) performs proxy setting on the proxy (GW1).

[Step 17b] The proxy (GW1) notifies the smart contract (GW1) of setting completion.

[Step 18b] The smart contract (GW1) transmits a data use request notification to the proxy (GW1).

[Step 19b] The proxy (GW1) transmits the data use request notification to the registrant host terminal.

[Step 20b] The registrant host terminal transmits the data use request notification to the data provider (userA).

[Step 21b] The block generation server 4 distributes the block to the proxy (GW2).

[Step 22b] The proxy (GW2) distributes the block to the smart contract (GW2).

[Step 23b] The smart contract (GW2) performs block verification.

[Step 24b] The smart contract (GW2) fills in the BC ledger (GW2).

[Step 25b] The BC ledger (GW2) notifies the smart contract (GW2) of registration completion.

[Step 26b] The smart contract (GW2) performs proxy setting on the proxy (GW2).

[Step 27b] The proxy (GW2) notifies the smart contract (GW2) of setting completion.

[Step 28b] The block generation server 4 distributes the block to the proxy (GW3).

[Step 29b] The proxy (GW3) distributes the block to the smart contract (GW3).

[Step 30b] The smart contract (GW3) performs block verification.

[Step 31b] The smart contract (GW3) fills in the BC ledger (GW3).

[Step 32b] The BC ledger (GW3) notifies the smart contract (GW3) of registration completion.

In the processing service registration phase as described above, the data user creates a processing service by using the test data that has become accessible in the provided data registration phase. The processing service refers to, for example, a program that processes data, an application programming interface (API), or the like.

Further, in order to actually apply to use the created processing service with provided data, the data user issues a processing service registration transaction including "service ID", "signature of user", "attribute", "URL for accessing the processing service", "hash value of processing service", and "publishing destination of processing service" in the own gateway.

At this time, by specifying the data ID desired to be used in the "publishing destination of processing service", the communication system is configured to transfer a notification as a data use request (data use request notification) to the data provider when the meta-information is shared in the BC ledger.

Each GW verifies that the signature of the data user is correct, and when there is no problem, the processing service is written in the BC ledger. When the writing to the BC ledger is completed, meta-information associated with the service ID is shared on the BC ledger, and a proxy setting is dynamically generated.

FIG. 18 is a diagram illustrating an example of a meta-information table, and FIG. 19 is a diagram illustrating an example of proxy setting tables. A meta-information table T1b describes meta-information after the processing service registration phase (second metadata regarding the processing service is newly registered in the table of FIG. 14 described above). Proxy setting tables T2b, T3b, T4b describe the proxy setting information after the processing service registration phase.

In the processing service registration phase, test data remains published to all and the provided data remains inaccessible to anyone, and only the data provider is able to make a POST request to the processing service.

<Meta-Information Update Phase>

Figure 20:
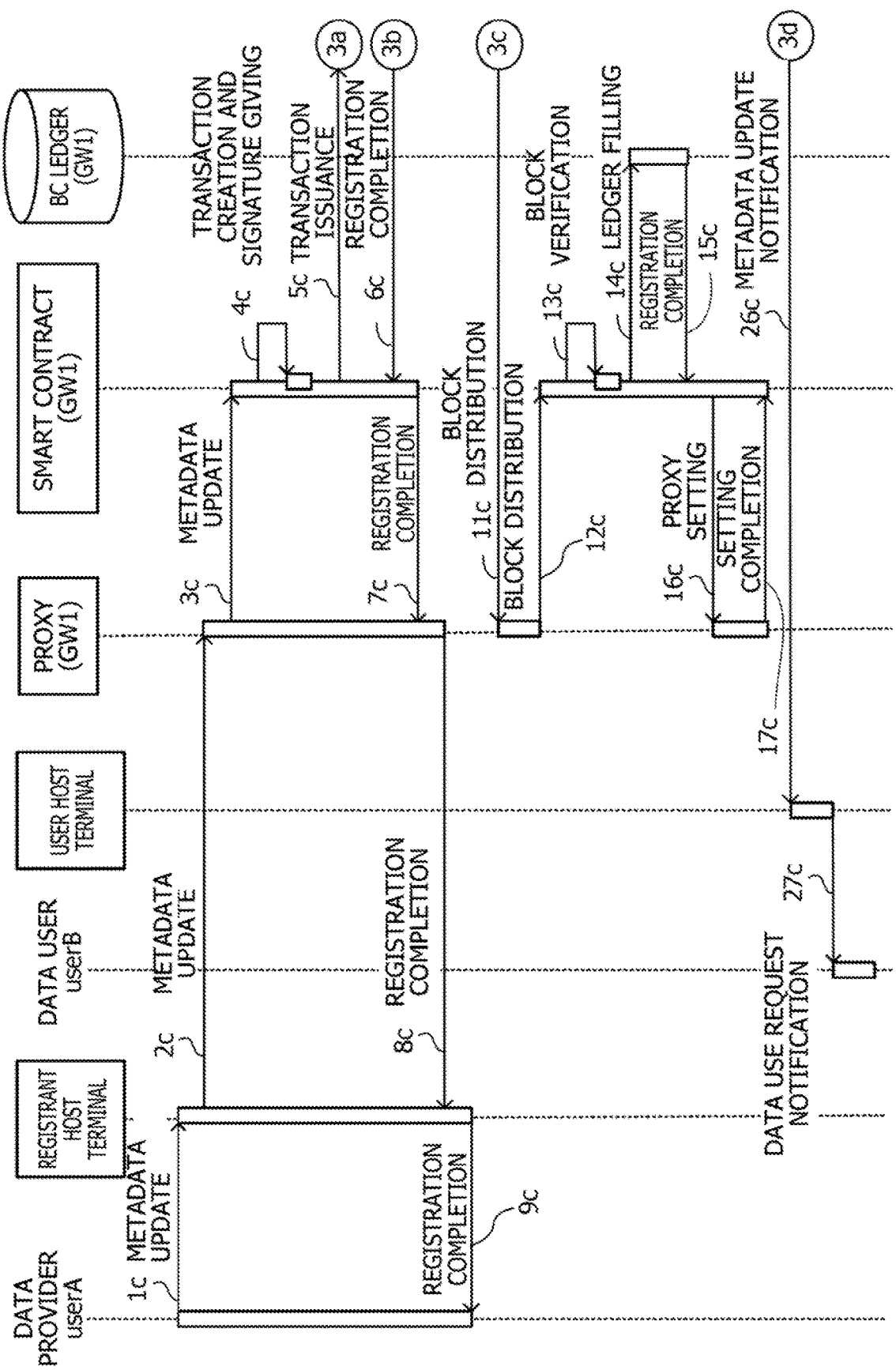
FIG. 20 is a sequence diagram illustrating an example of a meta-information update phase.
Figure 21:
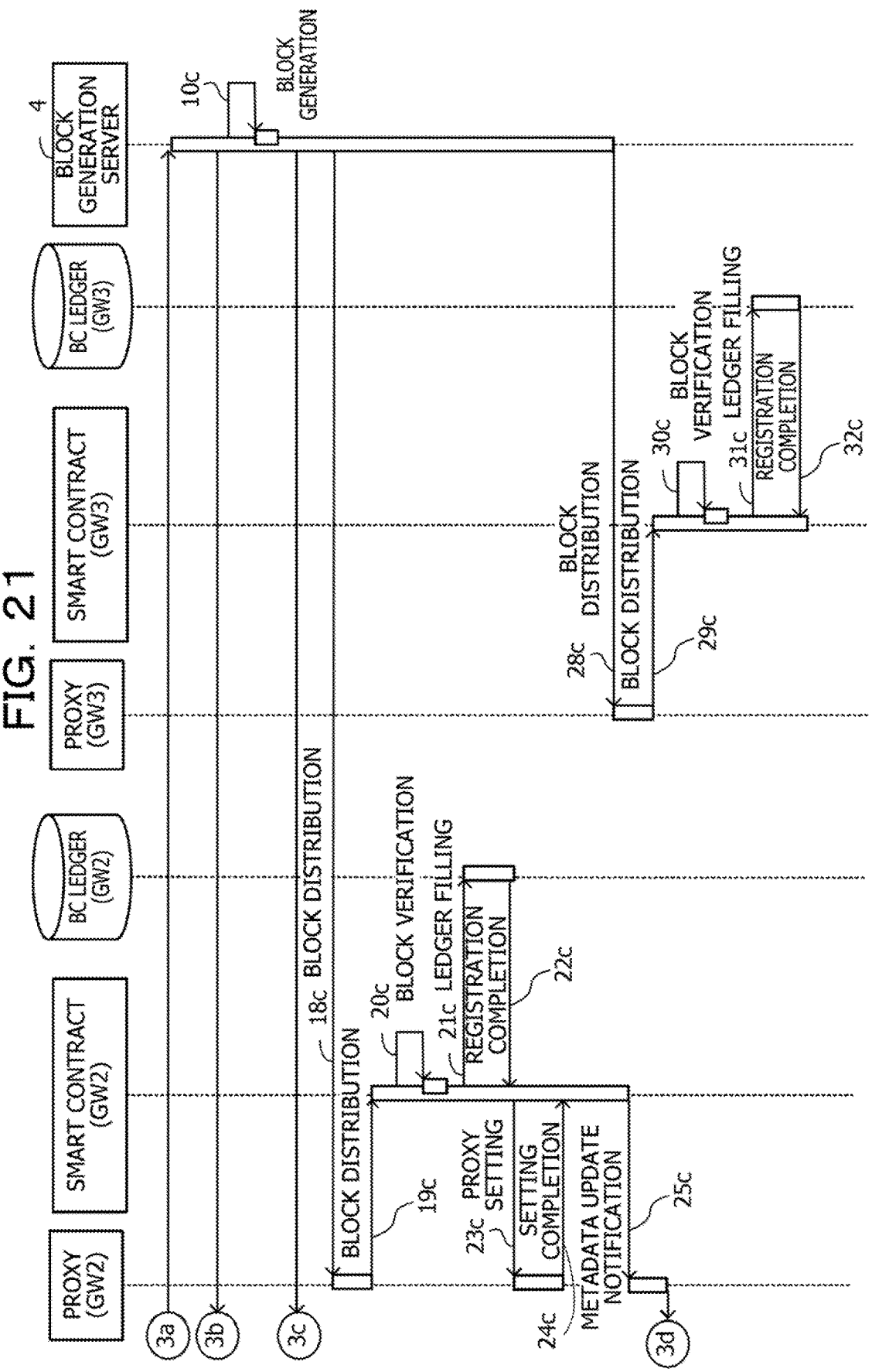
FIG. 21 is a sequence diagram illustrating an example of the meta-information update phase.

FIGS. 20 and 21 are sequence diagrams illustrating an example of the meta-information update phase.

[Step 1c] The data provider (userA) updates metadata for the registrant host terminal.

[Step 2c] The registrant host terminal updates metadata for the proxy (GW1).

[Step 3c] The proxy (GW1) updates metadata for the smart contract (GW1).

[Step 4c] The smart contract (GW1) creates a transaction and gives a signature.

[Step 5c] The smart contract (GW1) issues the transaction to the block generation server 4.

[Step 6c] The block generation server 4 notifies the smart contract (GW1) of registration completion.

[Step 7c] The smart contract (GW1) notifies the proxy (GW1) of the registration completion.

[Step 8c] The proxy (GW1) notifies the registrant host terminal of the registration completion.

[Step 9c] The registrant host terminal notifies the data provider (userA) of the registration completion.

[Step 10c] The block generation server 4 generates a block.

[Step 11c] The block generation server 4 distributes the block to the proxy (GW1).

[Step 12c] The proxy (GW1) distributes the block to the smart contract (GW1).

[Step 13c] The smart contract (GW1) performs block verification.

[Step 14c] The smart contract (GW1) fills in the BC ledger (GW1).

[Step 15c] The BC ledger (GW1) notifies the smart contract (GW1) of registration completion.

[Step 16c] The smart contract (GW1) performs proxy setting on the proxy (GW1).

[Step 17c] The proxy (GW1) notifies the smart contract (GW1) of setting completion.

[Step 18c] The block generation server 4 distributes the block to the proxy (GW2).

[Step 19c] The proxy (GW2) distributes the block to the smart contract (GW2).

[Step 20c] The smart contract (GW2) performs block verification.

[Step 21c] The smart contract (GW2) fills in the BC ledger (GW2).

[Step 22c] The BC ledger (GW2) notifies the smart contract (GW2) of registration completion.

[Step 23c] The smart contract (GW2) performs proxy setting on the proxy (GW2).

[Step 24c] The proxy (GW2) notifies the smart contract (GW2) of setting completion.

[Step 25c] The smart contract (GW2) notifies the proxy (GW2) of metadata update.

[Step 26c] The proxy (GW2) notifies the user host terminal of the metadata update.

[Step 27c] The user host terminal transmits a data use request notification to the data user (userB).

[Step 28c] The block generation server 4 distributes the block to the proxy (GW3).

[Step 29c] The proxy (GW3) distributes the block to the smart contract (GW3).

[Step 30c] The smart contract (GW3) performs block verification.

[Step 31c] The smart contract (GW3) fills in the BC ledger (GW3).

[Step 32c] The BC ledger (GW3) notifies the smart contract (GW3) of registration completion.

In the meta-information update phase as described above, upon receiving a notification of a data use request in the processing service registration phase, the data provider verifies the content of the registered processing service. The verification method includes confirming operation by referring to meta-information of the registered processing service, actually inputting the data into the processing service and checking the result, and the like.

When confirming the operation of the processing service, the data provider may confirm the content of processing of the processing service by specifying the service ID in the URL. At this time, since the permitted request is only the method of POST, the data provider does not browse (GET) the content of the processing service, but by confirming the relationship between an input and an output of the data, it is verified that no unauthorized processing has been performed internally. Therefore, data processing know-how possessed by the data user will not be leaked to others.

Here, safety of a verification method of the processing service will be described. The processing service verification method in this phase is what is called a black box test, and it has a risk of leakage of provided data in that it is not possible to confirm what kind of logic the processing service is internally configured with.

For example, there is a concern that the primary data is stored without being processed in the processing service and is browsed by the data user later. However, in the present embodiment, safety is maintained by a mechanism in which, because the primary data is processed in a safe third party data processing environment, even the data user who owns the processing service is not able to access the processing service itself that processes the provided data and only receives a result of processing. Therefore, in this phase, the data provider only needs to verity information of the input and the output and does not worry about internal processing.

When it is determined that there is no problem with the content of the processing service, in order to approve use of the provided data, the data provider issues a meta-information update transaction to update the item "publishing destination of provided data" in the meta-information of the provided data registered to the own gateway.

The information included in this transaction includes "data ID", "signature of provider", "attribute", "URL for accessing provided data", "URL for accessing test data", "hash value of provided data", and "publishing destination of provided data" similarly to the provided data registration phase, and the service ID of processing service is specified in the "publishing destination of provided data".

At this time, by specifying the service ID for permitting publication of data in "publishing destination of provided data", the communication system is configured to transfer a notification of meta-information update to the owner of the service ID (in this phase, the data user) when the meta-information is shared in the BC ledger.

Each GW verifies that the signature is correct, and when there is no problem, it is written in the ledger. When the writing in the BC ledger is completed, the meta-information associated with the data ID is shared on the BC ledger, and a proxy setting is dynamically generated.

FIG. 22 is a diagram illustrating an example of a meta-information table, and FIG. 23 is a diagram illustrating an example of proxy setting tables. A meta-information table T1c describes meta-information after the meta-information update phase, and proxy setting tables T2c, T3c, T4c describe proxy setting information after the meta-information update phase.

In the meta-information update phase, it is a state that only the GW1 may perform GET to the provided data and POST to the provider tenant. Furthermore, similarly, it is a state that only the GW2 may perform GET to the processing service and POST to the user tenant.

<Meta-Information Matching Phase>

Figure 24:
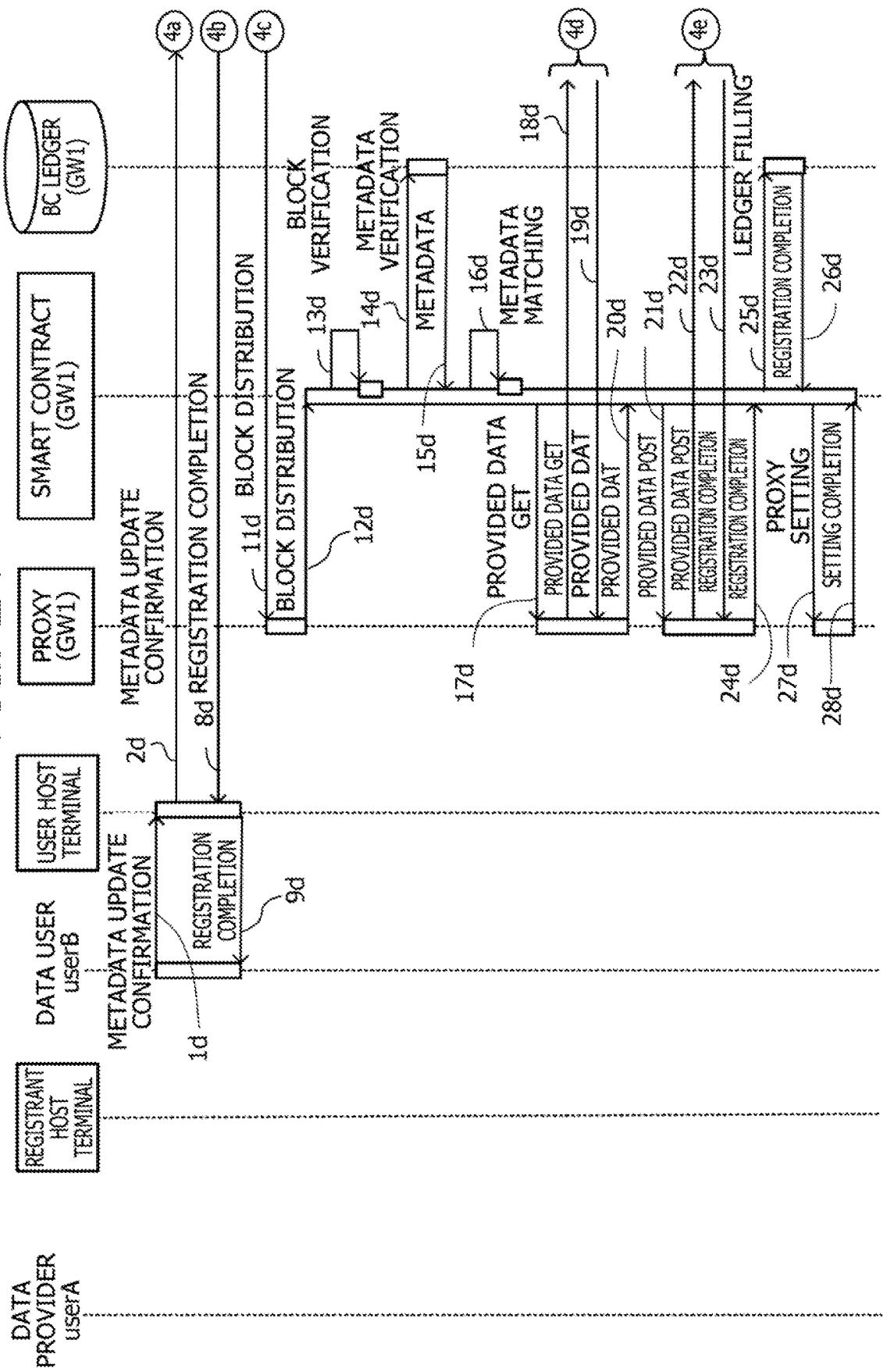
FIG. 24 is a sequence diagram illustrating an example of a meta-Information matching phase.
Figure 25:
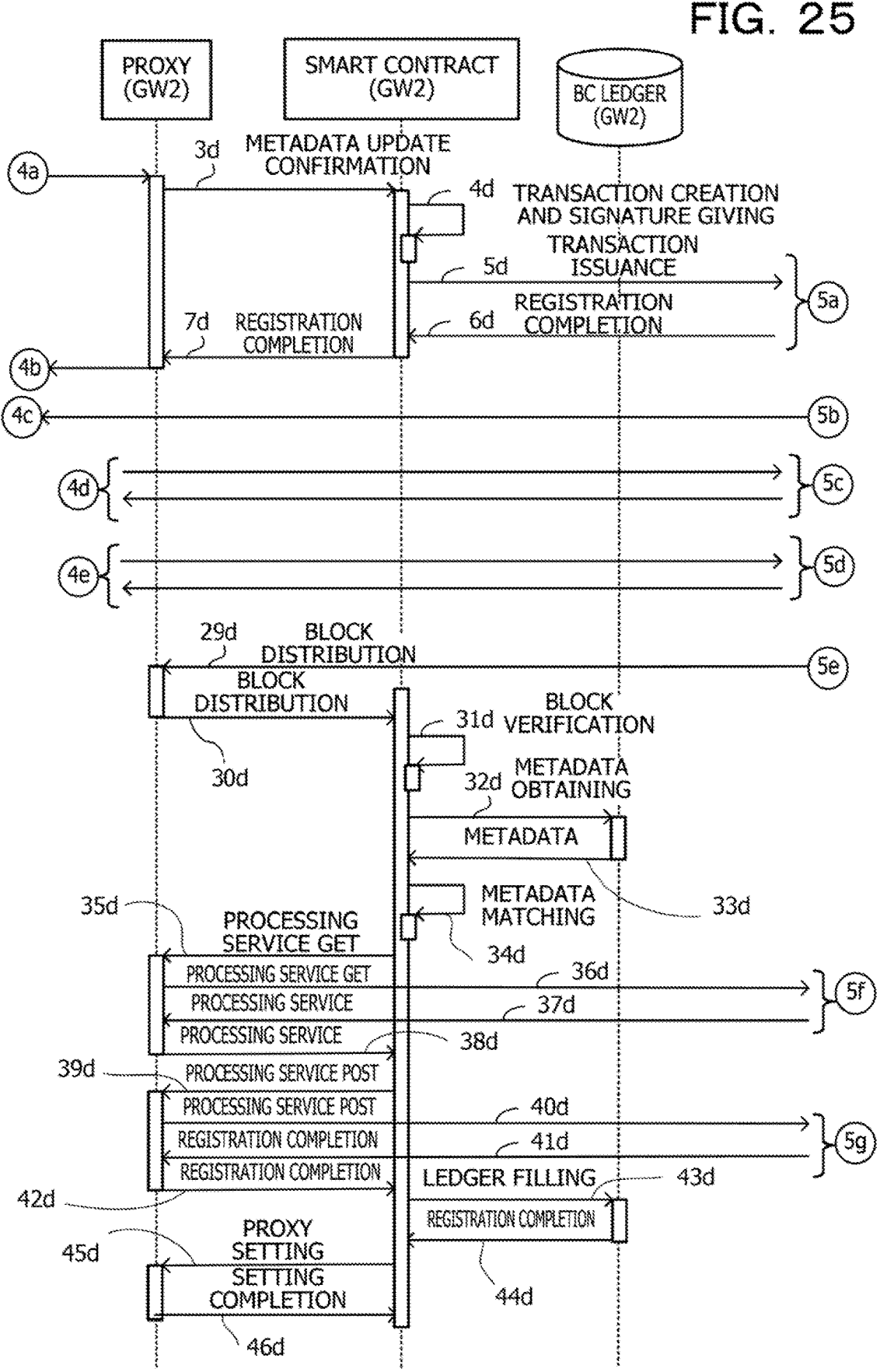
FIG. 25 is a sequence diagram illustrating an example of the meta-information matching phase.
Figure 26:
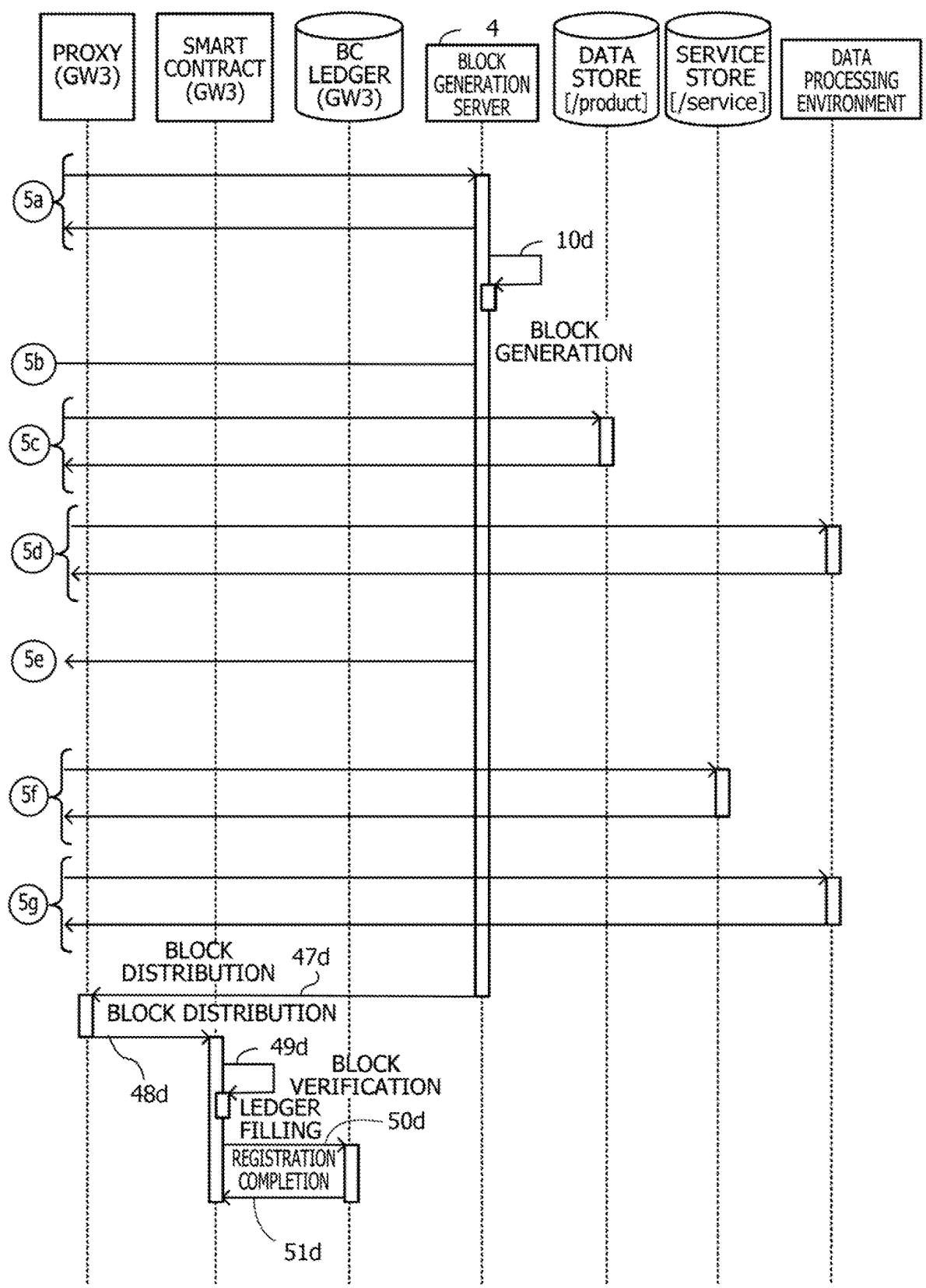
FIG. 26 is a sequence diagram illustrating an example of the meta-information matching phase.

FIGS. 24 to 26 are sequence diagrams illustrating an example of the meta-information matching phase.

[Step 1d] The data user (userB) confirms a metadata update with the user host terminal.

[Step 2d] The user host terminal confirms the metadata update with the proxy (GW2).

[Step 3d] The proxy (GW2) confirms the metadata update with the smart contract (GW2).

[Step 4d] The smart contract (GW2) creates a transaction and gives a signature.

[Step 5d] The smart contract (GW2) issues the transaction to the block generation server 4.

[Step 6d] The block generation server 4 notifies the smart contract (GW2) of registration completion.

[Step 7d] The smart contract (GW2) notifies the proxy (GW2) of the registration completion.

[Step 8d] The proxy (GW2) notifies the user host terminal of the registration completion.

[Step 9d] The user host terminal notifies the data user (userB) of the registration completion.

[Step 10d] The block generation server 4 generates a block.

[Step 11d] The block generation server 4 distributes the block to the proxy (GW1).

[Step 12d] The proxy (GW1) distributes the block to the smart contract (GW1).

[Step 13d] The smart contract (GW1) performs block verification.

[Step 14d] The smart contract (GW1) obtains metadata from the BC ledger (GW1).

[Step 15d] The BC ledger (GW1) transmits metadata to the smart contract (GW1).

[Step 16d] The smart contract (GW1) performs metadata matching.

[Step 17d] The smart contract (GW1) transmits a provided data GET to the proxy (GW1).

[Step 18d] The proxy (GW1) transmits the provided data GET to the data store [/product].

[Step 19d] The data store [/product] transmits the provided data to the proxy (GW1).

[Step 20d] The proxy (GW1) transmits the provided data to the smart contract (GW1).

[Step 21d] The smart contract (GW1) transmits a provided data POST to the proxy (GW1).

[Step 22d] The proxy (GW1) transmits the provided data POST to the data processing environment [safe-env-X].

[Step 23d] The data processing environment [safe-env-X] notifies the proxy (GW1) of registration completion.

[Step 24d] The proxy (GW1) notifies the smart contract (GW1) of the registration completion.

[Step 25d] The smart contract (GW1) fills in the BC ledger (GW1).

[Step 26d] The BC ledger (GW1) notifies the smart contract (GW1) of the registration completion.

[Step 27d] The smart contract (GW1) performs proxy setting on the proxy (GW1).

[Step 28d] The proxy (GW1) notifies the smart contract (GW1) of setting completion.

[Step 29d] The block generation server 4 distributes the block to the proxy (GW2).

[Step 30d] The proxy (GW2) distributes the block to the smart contract (GW2).

[Step 31d] The smart contract (GW2) performs block verification.

[Step 32d] The smart contract (GW2) obtains metadata from the BC ledger (GW2).

[Step 33d] The BC ledger (GW2) transmits metadata to the smart contract (GW2).

[Step 34d] The smart contract (GW2) performs metadata matching.

[Step 35d] The smart contract (GW2) transmits a processing service GET to the proxy (GW2).

[Step 36d] The proxy (GW2) transmits the processing service GET to the service store [/service].

[Step 37d] The service store [/service] transmits the processing service to the proxy (GW2).

[Step 38d] The proxy (GW2) transmits the processing service to the smart contract (GW2).

[Step 39d] The smart contract (GW2) transmits a processing service POST to the proxy (GW2).

[Step 40d] The proxy (GW2) transmits the processing service POST to the data processing environment [safe-env-X].

[Step 41d] The data processing environment [safe-env-X] notifies the proxy (GW2) of registration completion.

[Step 42d] The proxy (GW2) notifies the smart contract (GW2) of the registration completion.

[Step 43d] The smart contract (GW2) fills in the BC ledger (GW2).

[Step 44d] The BC ledger (GW2) notifies the smart contract (GW2) of the registration completion.

[Step 45d] The smart contract (GW2) performs proxy setting on the proxy (GW2).

[Step 46d] The proxy (GW2) notifies the smart contract (GW2) of setting completion.

[Step 47d] The block generation server 4 distributes the block to the proxy (GW3).

[Step 48d] The proxy (GW3) distributes the block to the smart contract (GW3).

[Step 49d] The smart contract (GW3) performs block verification.

[Step 50d] The smart contract (GW3) fills in the BC ledger (GW3).

[Step 51d] The BC ledger (GW3) notifies the smart contract (GW3) of registration completion.

In the meta-information matching phase described above, upon receiving a notification of meta-information update in the meta-information update phase, the data user confirms that the data provider has approved use of the data.

Then, in order to actually start using the data, the data user issues a meta-information update confirmation transaction including "data ID to be used", "service ID to be used", and "signature of user" in the own gateway.

Each GW verifies that the signature is correct and that the meta-information matches. Matching of meta-information is, for example, to take a correlation on whether the ID of a processing service of target e is present in the "publishing destination of provided data" in data of target A, and the ID of provided data of the target A is present in the "publishing destination of processing service" of the target B.

When there is no problem in these verifications, the provided data and the processing service are transferred to the data processing environment, and a routing table for data access is dynamically generated.

Furthermore, when the provided data is transferred to the data processing environment, the data processing server 50 compares the hash value registered in the meta-information with a hash-calculated value of the data that has been actually transferred to verify that they are the same values, and then registers them in the storage in the data processing environment.

In this manner, it is possible to prevent registration of data different from originally registered data. Note that the hash value is verified similarly when the processing service is transferred.

Figure 27:
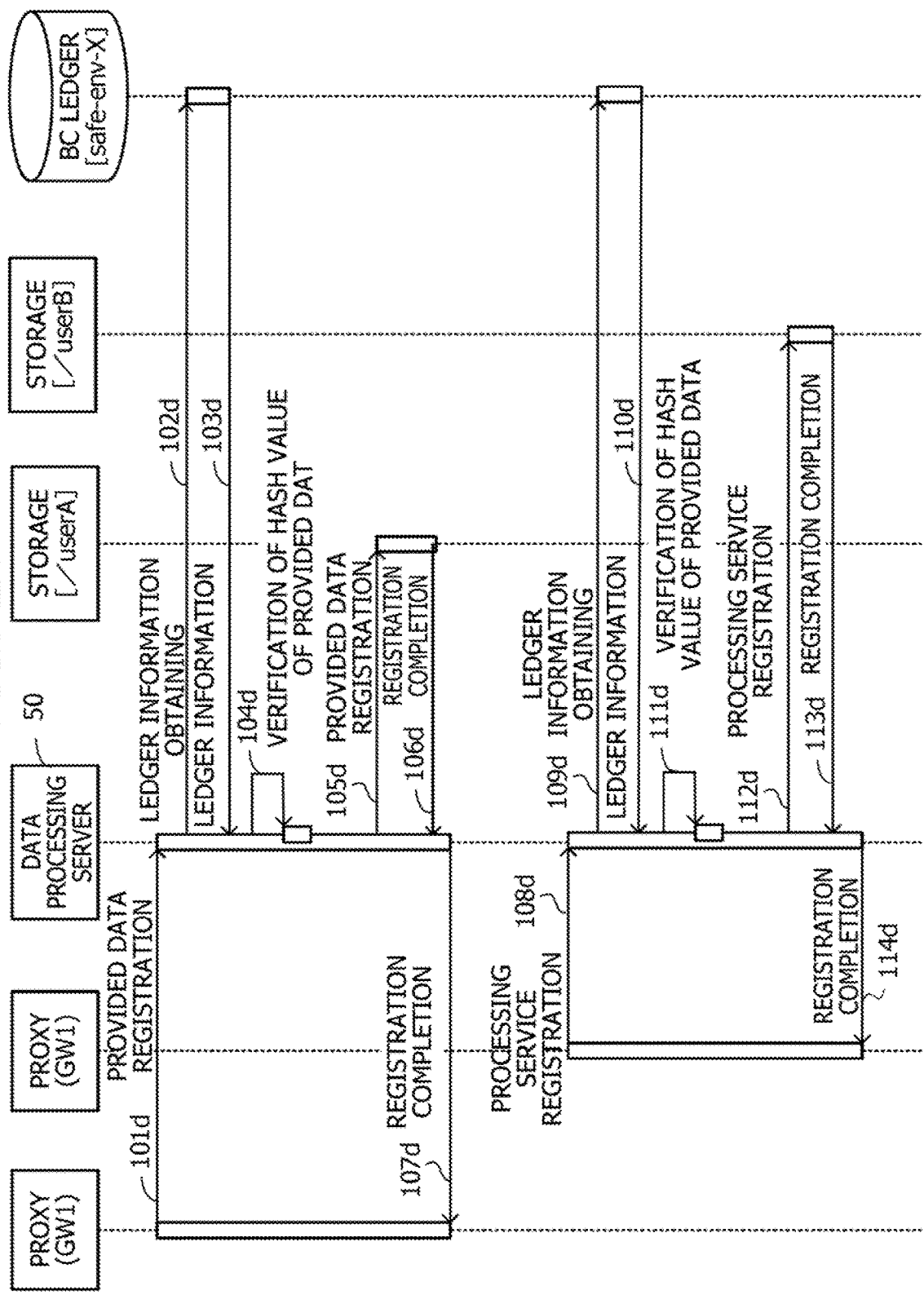
FIG. 27 is a diagram illustrating an operation sequence in the data processing environment in the meta-information matching phase.

FIG. 27 is a diagram illustrating an operation sequence in the data processing environment in the meta-information matching phase. Note that step 22 of FIG. 24 and step 101d of FIG. 27, step 23 of FIG. 24 and step 107d of FIG. 27, step 40d of FIG. 25 and step 108d of FIG. 27, step 41d of FIG. 25 and step 114d of FIG. 27 represent the same processes, respectively.

[Step 101d] The proxy (GW1) registers the provided data in the data processing server 50.

[Step 102d] The data processing server 50 obtains ledger information from the BC ledger.

[Step 103d] The BC ledger transmits the ledger information to the data processing server 50.

[Step 104d] The data processing server 50 verifies a hash value of the provided data.

[Step 105d] The data processing server 50 registers the provided data in the storage [/userA].

[Step 106d] The storage [/userA] notifies the data processing server 50 of registration completion.

[Step 107d] The data processing server 50 notifies the proxy (GW1) of the registration completion.

[Step 108d] The proxy (GW2) registers the processing service in the data processing server 50.

[Step 109d] The data processing server 50 obtains ledger information from the BC ledger.

[Step 110d] The BC ledger transmits the ledger information to the data processing server 50.

[Step 111d] The data processing server 50 verifies a hash value of the processing service.

[Step 112d] The data processing server 50 registers the processing service in the storage [/userB].

[Step 113d] The storage [/userB] notifies the data processing server 50 of registration completion.

[Step 114d] The data processing server 50 notifies the proxy (GW2) of the registration completion.

FIG. 28 is a diagram illustrating an example of a meta-information table, and FIG. 29 is a diagram illustrating an example of proxy setting tables. A meta-information table T1d describes meta-information after the meta-Information matching phase, and proxy setting tables T2d, T3d, T4d describe proxy setting information after the meta-information matching phase.

In this phase, "/processDataId1" is issued as a URL for receiving data of a processing result, which only the user is able to access. Further, the setting to allow performing GET and POST for the provided data and the processing service that has been set in the meta-information update phase is deleted for safety.

Note that even with this setting is present, basically, it is not possible to access the data by others except the owner and thus the setting may be left, but desirably, any setting that is not used is deleted because it becomes a security hole, and is set again when it is used again.

Figure 30:
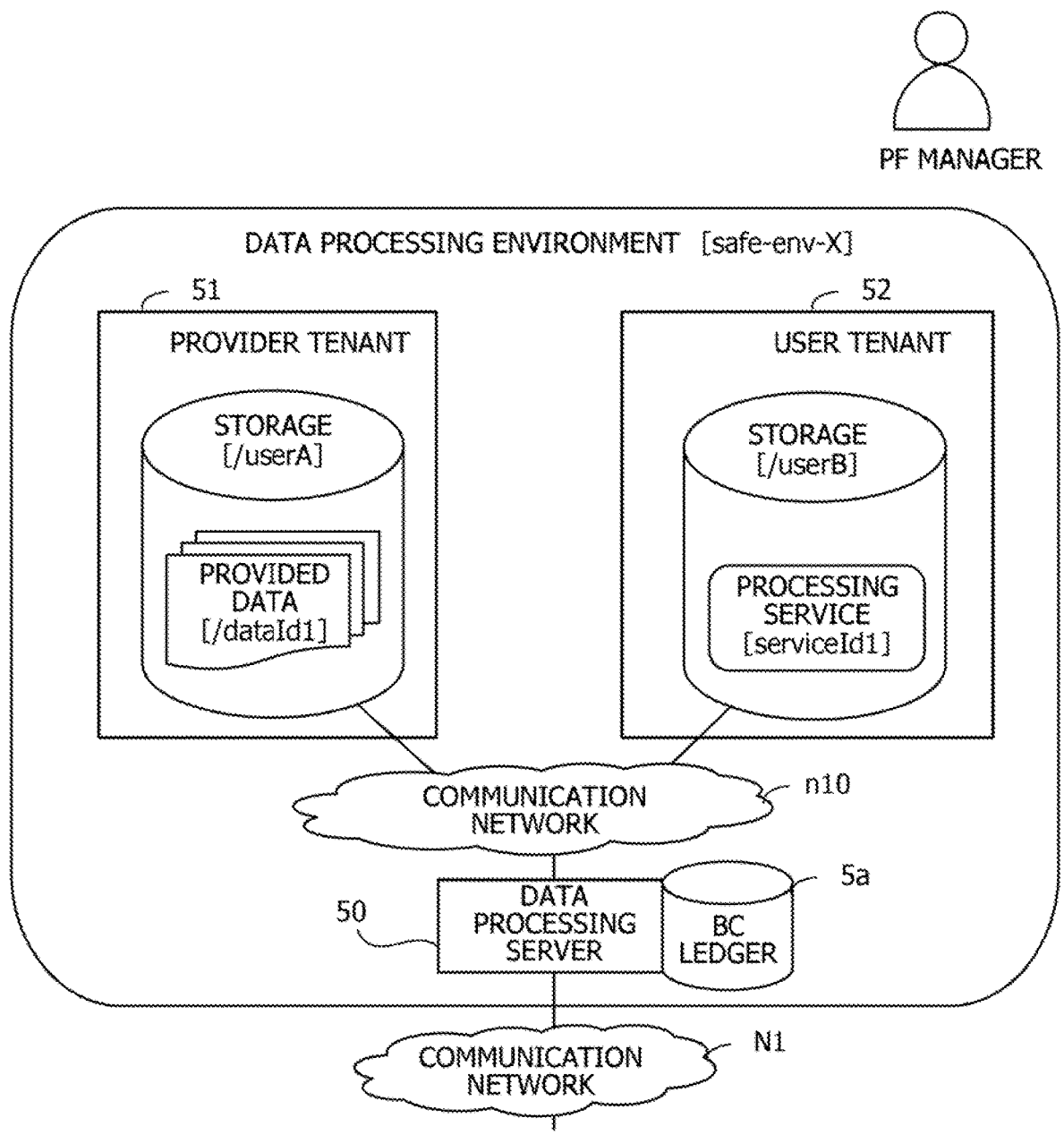
FIG. 30 is a diagram illustrating an example of a configuration of the data processing environment after the meta-information matching phase.

FIG. 30 is a diagram illustrating an example of a configuration of the data processing environment after the meta-information matching phase. Illustration of the participant tenants in the data processing environment is omitted below. In the data processing environment [safe-env-X], provided data [/dataId1] is in a state of being arranged in the storage [/userA] of the provider tenant 51, and the processing service [/serviceId1] is in a state of being arranged in the storage [/userB] of the user tenant 52.

<Processed Data Obtaining Phase>

Figure 31:
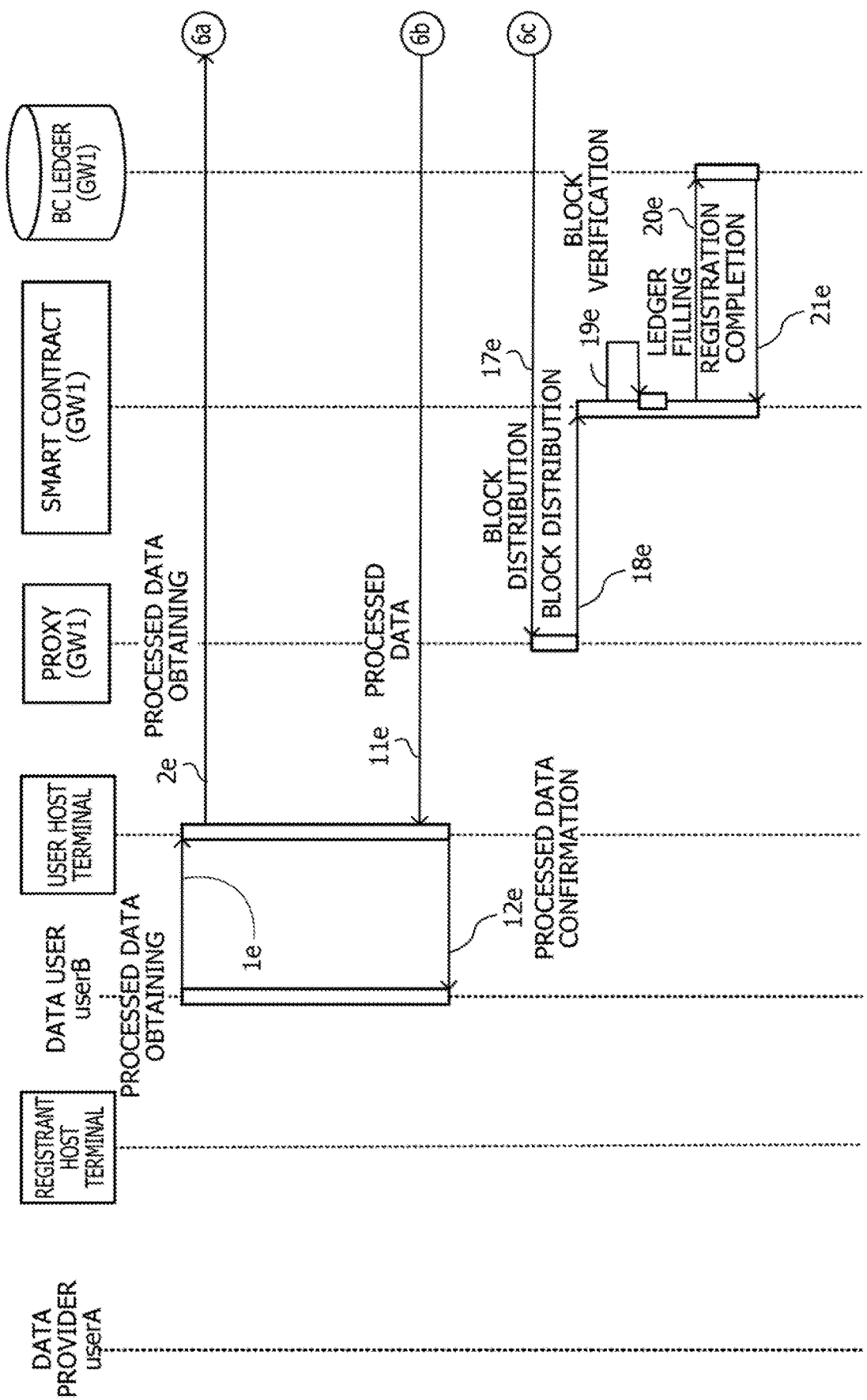
FIG. 31 is a sequence diagram illustrating an example of a processed data obtaining phase.
Figure 32:
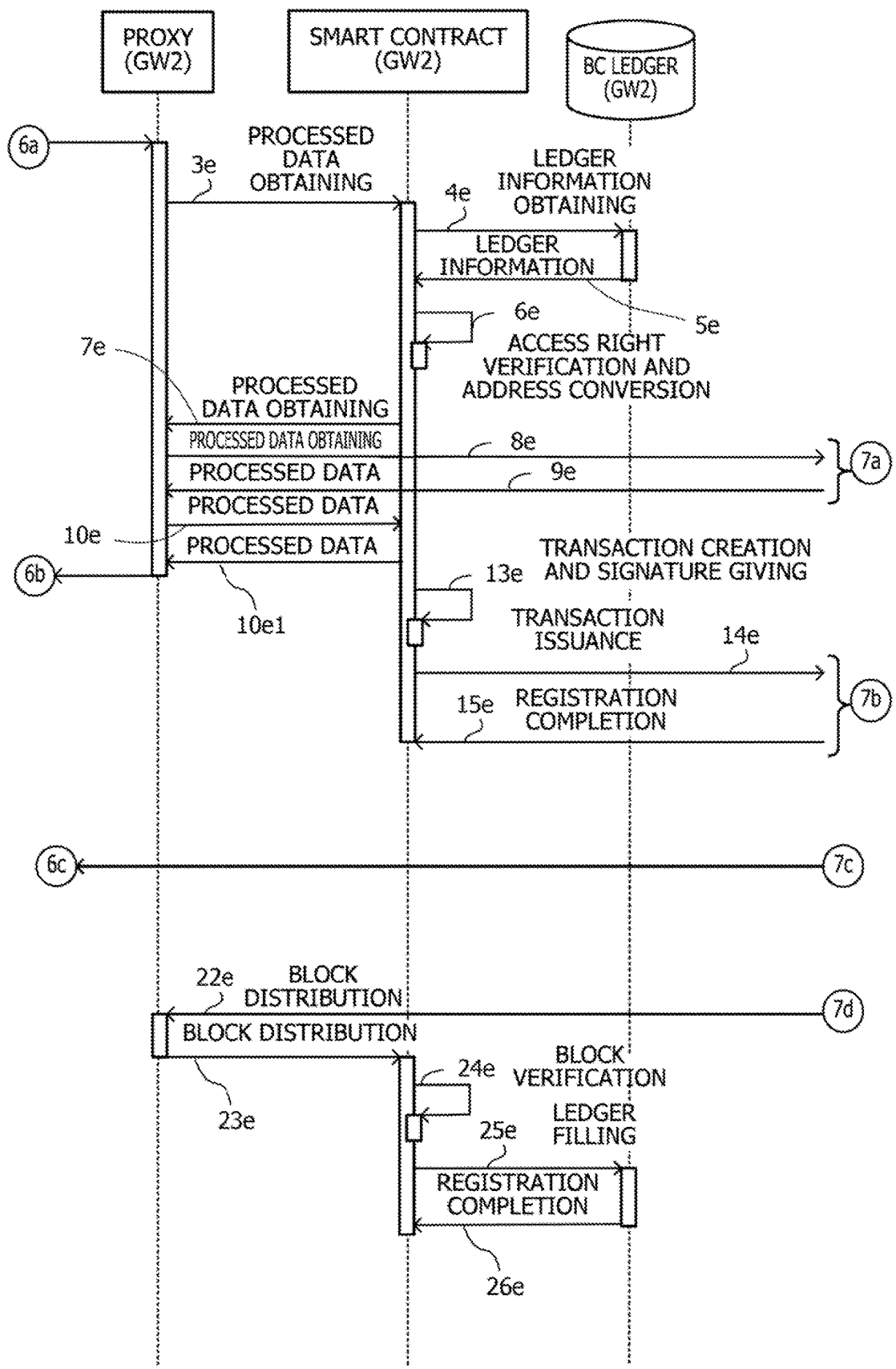
FIG. 32 is a sequence diagram illustrating an example of the processed data obtaining phase.
Figure 33:
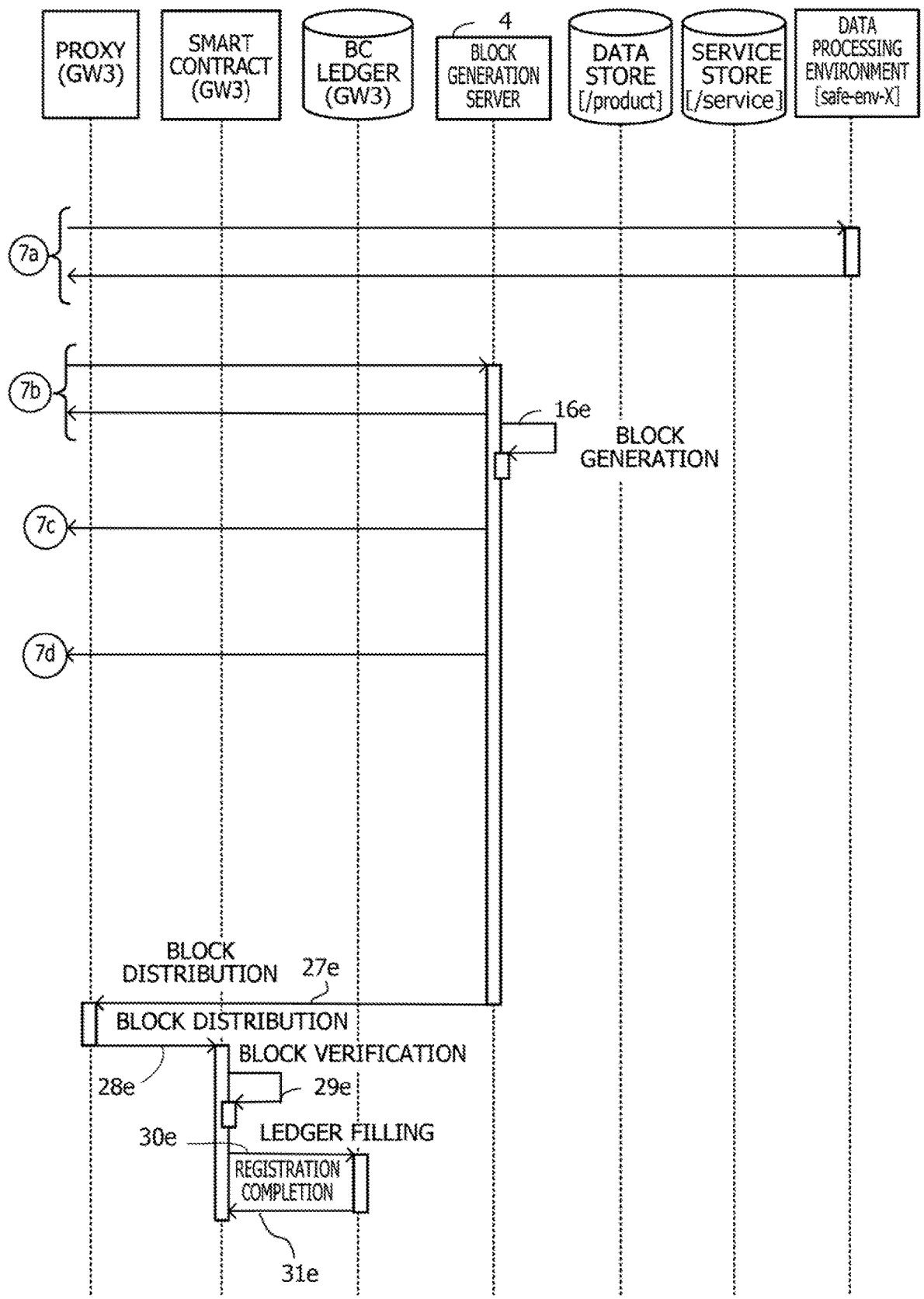
FIG. 33 is a sequence diagram illustrating an example of the processed data obtaining phase.

FIGS. 31 to 33 are sequence diagrams illustrating an example of a processed data obtaining phase.

[Step 1e] The data user (userB) performs processed data obtaining to the user host terminal.

[Step 2e] The user host terminal performs processed data obtaining to the proxy (GW2).

[Step 3e] The proxy (GW2) performs processed data obtaining to the smart contract (GW2).

[Step 4e] The smart contract (GW2) obtains ledger information from the BC ledger (GW2).

[Step 5e] The BC ledger (GW2) transmits the ledger information to the smart contract (GW2).

[Step 6e] The smart contract (GW2) performs access right verification and address conversion.

[Step 7e] The smart contract (GW2) obtains processed data from the proxy (GW2).

[Step 8e] The proxy (GW2) obtains processed data from the data processing environment [safe-env-X].

[Step 9e] The data processing environment [safe-env-X] transmits the processed data to the proxy (GW2).

[Step 10e] The proxy (GW2) transmits the processed data to the smart contract (GW2).

[Step 1el] The smart contract (GW2) transmits the processed data to the proxy (GW2).

[Step 11e] The proxy (GW2) transmits the processed data to the user host terminal.

[Step 12e] The user host terminal transmits the processed data to the data user (userB) (confirmation of the processed data).

[Step 13e] The smart contract (GW2) creates a transaction and gives a signature.

[Step 14e] The smart contract (GW2) issues the transaction to the block generation server 4.

[Step 15e] The block generation server 4 notifies the smart contract (GW2) of registration completion.

[Step 16e] The block generation server 4 generates a block.

[Step 17e] The block generation server 4 distributes the block to the proxy (GW1).

[Step 18e] The proxy (GW1) distributes the block to the smart contract (GW1).

[Step 19e] The smart contract (GW1) performs block verification.

[Step 20e] The smart contract (GW1) fills in the BC ledger (GW1).

[Step 21e] The BC ledger (GW1) notifies the smart contract (GW1) of registration completion.

[Step 22e] The block generation server 4 distributes the block to the proxy (GW2).

[Step 23e] The proxy (GW2) distributes the block to the smart contract (GW2).

[Step 24e] The smart contract (GW2) performs block verification.

[Step 25e] The smart contract (GW2) fills in the BC ledger (GW2).

[Step 26e] The BC ledger (GW2) notifies the smart contract (GW2) of registration completion.

[Step 27e] The block generation server 4 distributes the block to the proxy (GW3).

[Step 28e] The proxy (GW3) distributes the block to the smart contract (GW3).

[Step 29e] The smart contract (GW3) performs block verification.

[Step 30e] The smart contract (GW3) fills in the BC ledger (GW3).

[Step 31e] The BC ledger (GW3) notifies the smart contract (GW3) of registration completion.

Figure 34:
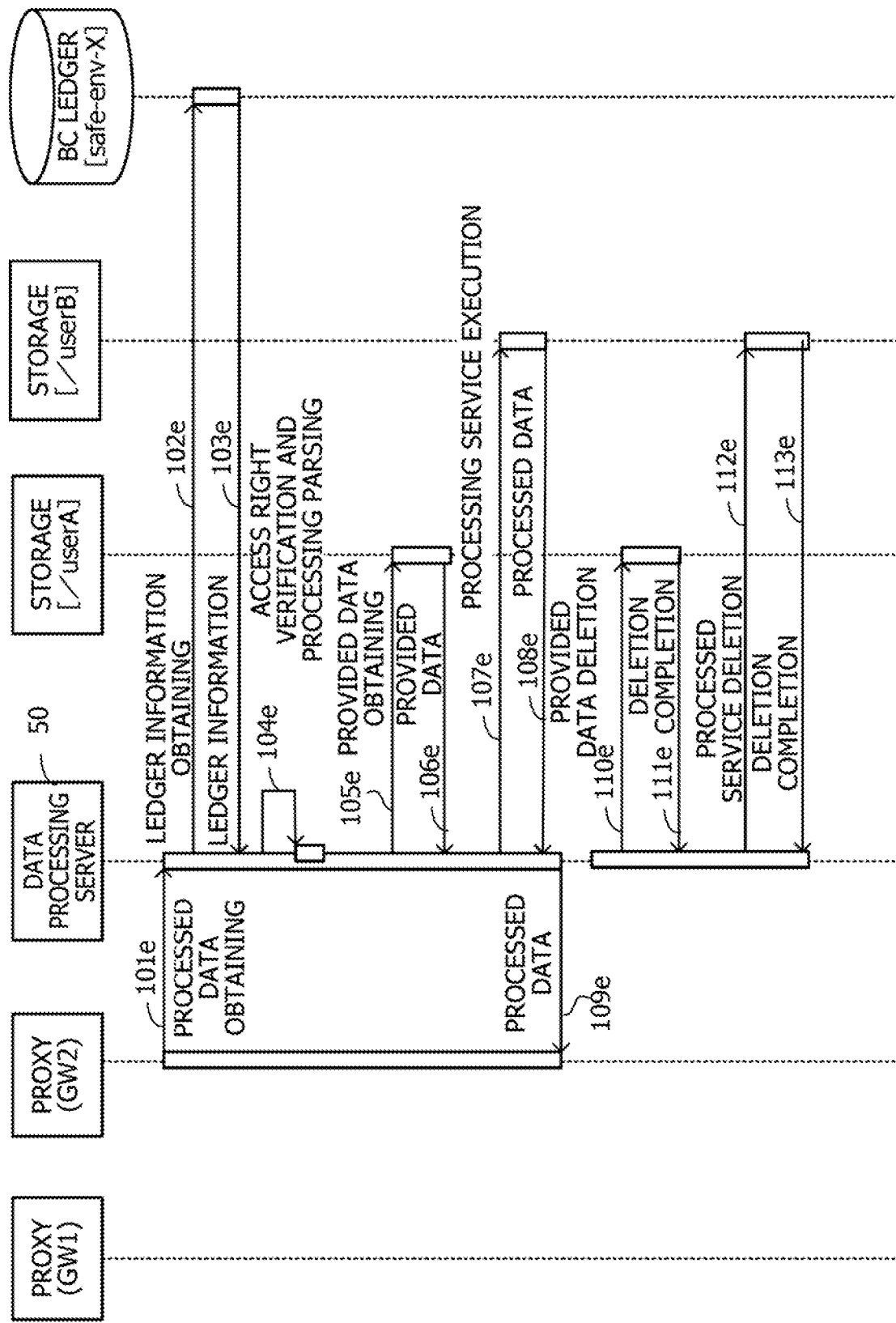
FIG. 34 is a diagram illustrating an operation sequence in the data processing environment in the processed data obtaining phase.
Figure 35:
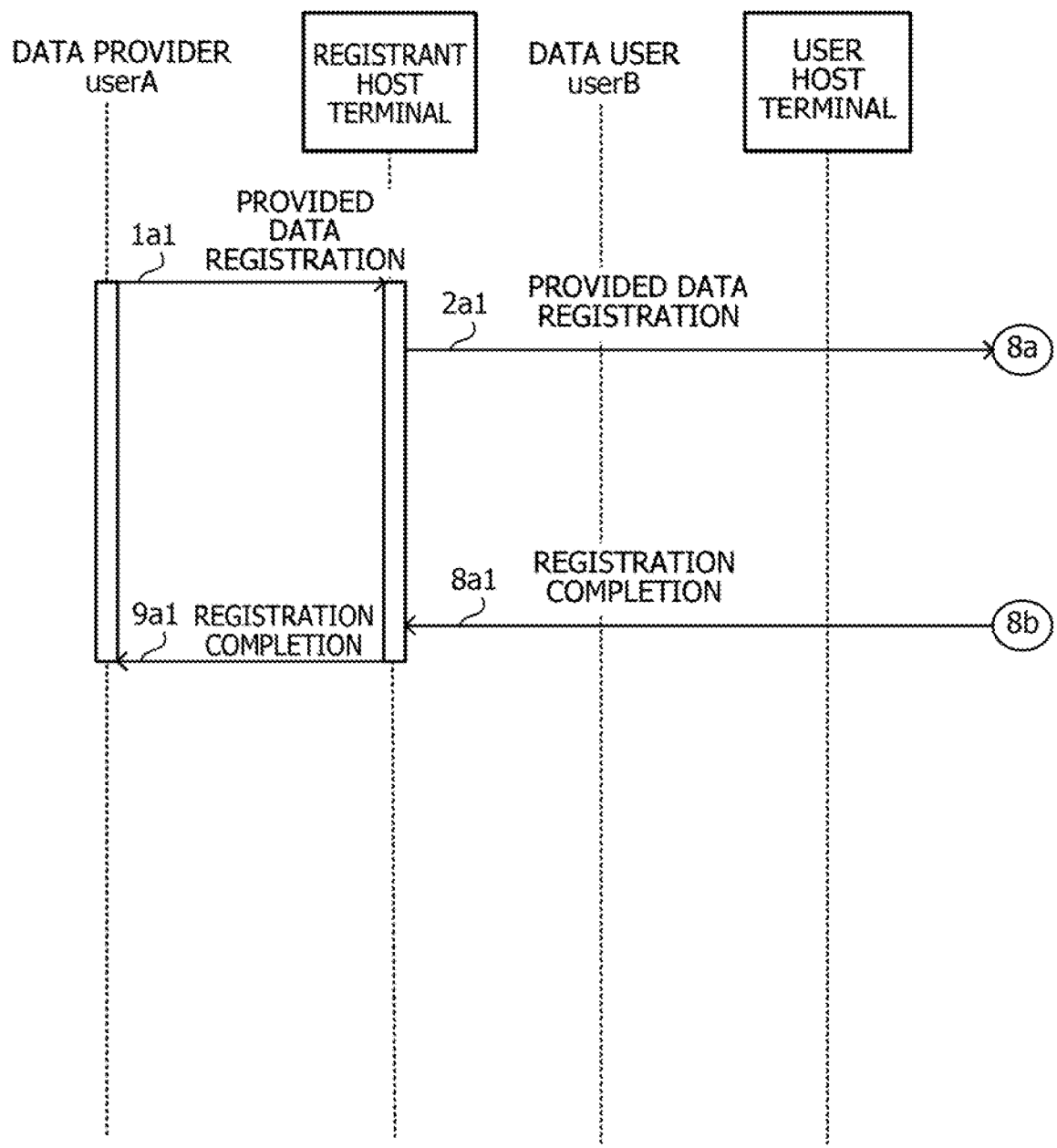
FIG. 35 is a sequence diagram illustrating an example of a provided data registration phase.
Figure 36:
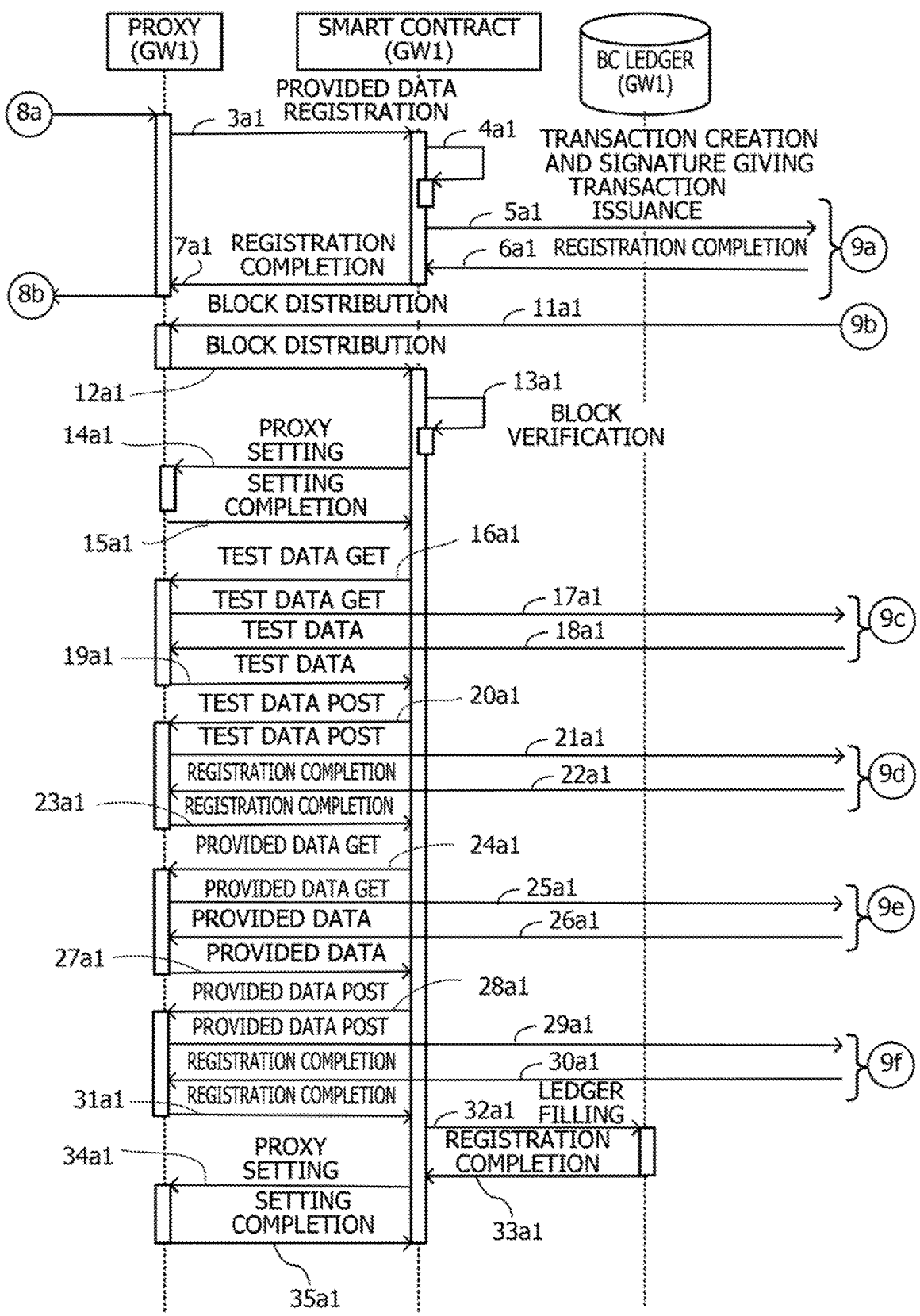
FIG. 36 is a sequence diagram illustrating an example of the provided data registration phase.
Figure 37:
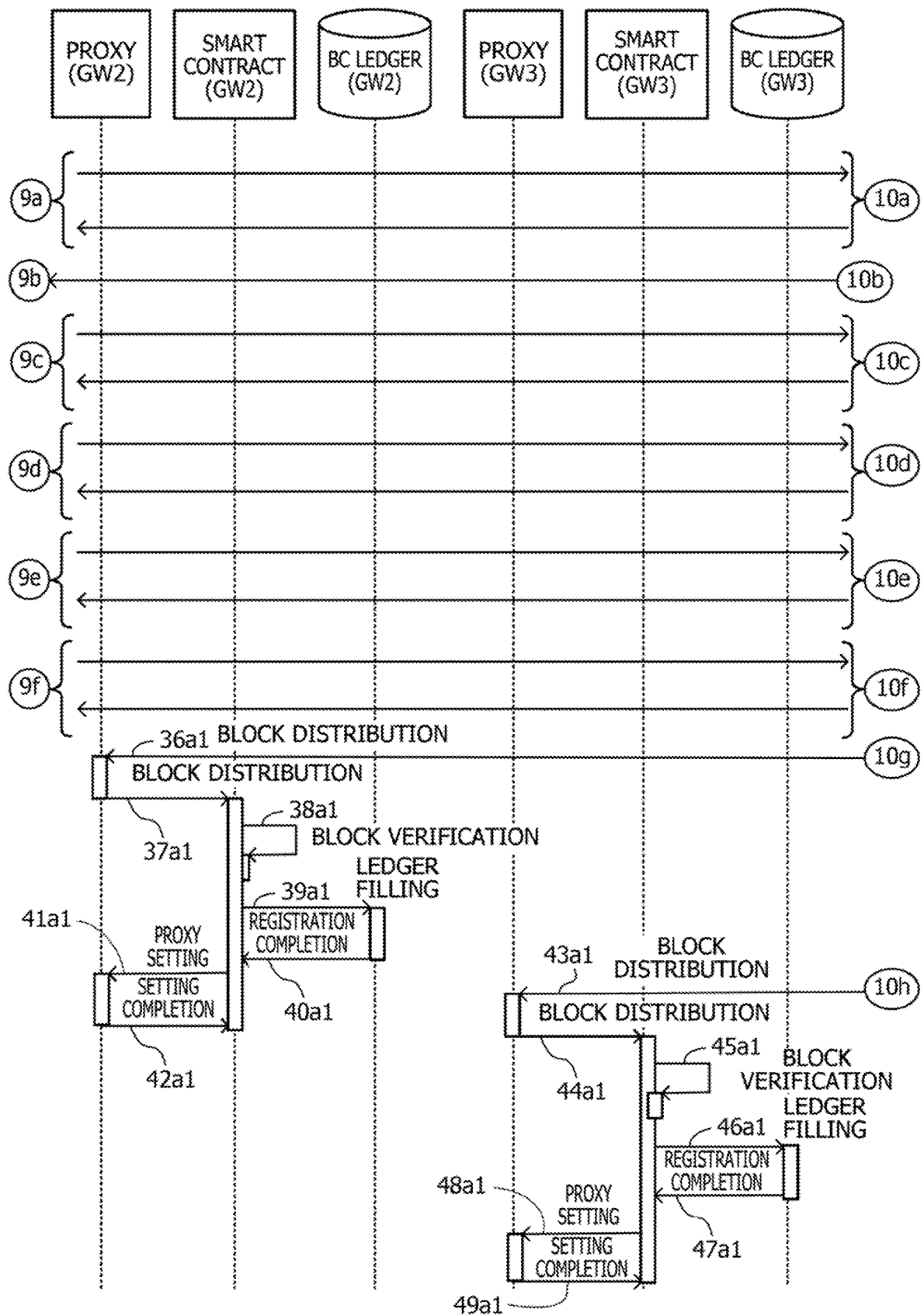
FIG. 37 is a sequence diagram illustrating an example of the provided data registration phase.
Figure 38:
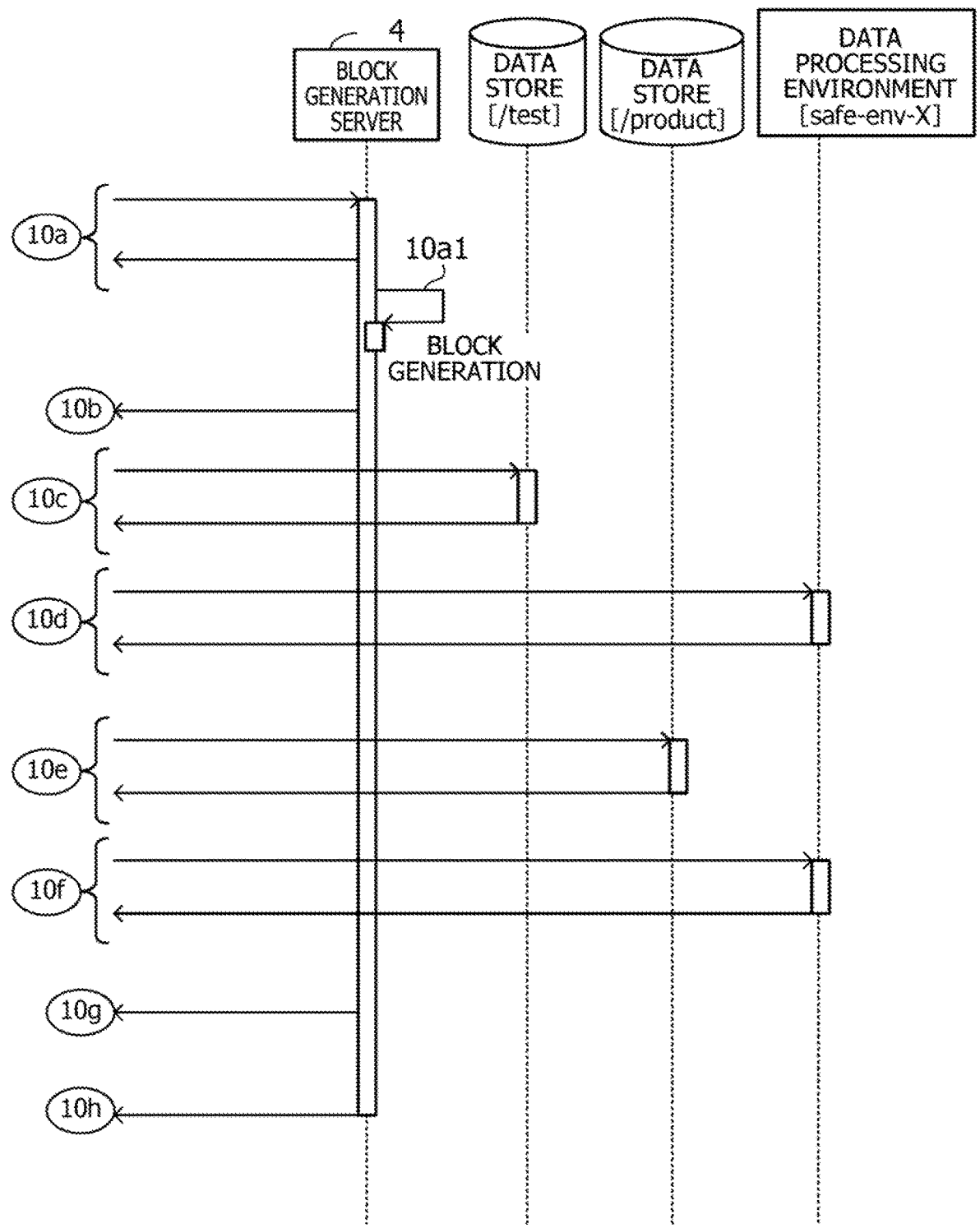
FIG. 38 is a sequence diagram illustrating an example of the provided data registration phase.

FIG. 34 is a diagram illustrating an operation sequence in the data processing environment in the processed data obtaining phase. Step 8e in FIG. 32 and step 101e in FIG. 34, and step 9e in FIG. 32 and step 109e in FIG. 34 represent the same processes, respectively.

[Step 101e] The proxy (GW2) performs processed data obtaining to the data processing server 50.

[Step 102e] The data processing server 50 obtains ledger information from the BC ledger [safe-env-X] (BC ledger 5a) in the data processing environment [safe-env-X].

[Step 103e] The BC ledger [safe-env-X] transmits ledger information to the data processing server 50.

[Step 104e] The data processing server 50 performs access right verification and processing parsing (structure analysis of a program, conversion processing of a data structure, or the like).

[Step 105e] The data processing server 50 performs provided data obtaining to the storage [/userA].

[Step 106e] The storage [/userA] transmits provided data to the data processing server 50.

[Step 107e] The data processing server 50 transmits a result of execution of a processing service to the storage [userB].

[Step 108e] The storage [/userB] transmits the processing service to the data processing server 50.

[Step 109e] The data processing server 50 transmits processed data to the proxy (GW2).

[Step 110e] The data processing server 50 deletes the provided data in the storage [/userA].

[Step 111e] The storage [/userA] notifies the data processing server 50 of deletion completion.

[Step 112e] The data processing server 50 deletes the processing service in the storage [userB].

[Step 113e] The storage [/userB] notifies the data processing server 50 of deletion completion.

In the processed data obtaining phase as described above, when the data user sends a request to "/processDataId1", the request is first transferred to the data processing environment based on the routing table set in the GW. Thereafter, the data processing server 50 obtains provided data according to the contents described in the BC ledger, and returns only a result processed by the processing service to the data user as a response.

When the processed data is transferred to the data user, the provided data and the processing service used for the processing are deleted. This deletion process may be automatically performed by the data processing server 50 or may be performed based on authority of the PF manager.

Here, confirmation of resource deletion in the data processing environment will be described. The data processing environment [safe-env-X] ensures safety of data and services by accepting only specific HTTP/HTTPS requests. Therefore, unlike general tenants, the owner may not freely browse or enable editing. The address to a resource is utilized to confirm that the resource has been deleted in such a special environment.

In the data processing server 50, when data is stored, the storage address of the data (first information) is temporarily issued, and when a processing service is stored, the address of the processing service (second information) is temporarily issued. Further, the data processing server 50 also deletes the storage address of data when the data is deleted, and also deletes the address stored by a processing service when the processing service is deleted.

By detecting these addresses, the GW may verify the existence of data or a processing service in the data processing environment without accessing the data or the processing service.

Furthermore, in order to leave a correct delivery of processed data to the data user as an evidence trail, a transaction including the "processed data obtaining result" and the "signature of user" is issued at a timing when obtaining of the processed data is completed, and is recorded in the BC ledger at each GW.

Through such a procedure, processing agreed between the data provider and the data user may be executed and data may be distributed without browsing the primary data by the data user and the processing service by the data provider.

Third Embodiment

Next, a third embodiment will be described. The third embodiment is a case where data and a processing service are stored in a data processing environment. In the third embodiment, simultaneously with registration of meta-information, data and a processing service are transferred to the data processing server 50 and managed on the data processing server 50.

<Provided Data Registration Phase>

FIGS. 35 to 38 are sequence diagrams illustrating an example of a provided data registration phase.

[Step 1a1] A data provider (userA) registers provided data in a registrant host terminal.

[Step 2a1] The registrant host terminal registers the provided data in a proxy (GW1).

[Step 3a1] The proxy (GW1) registers the provided data in a smart contract (GW1).

[Step 4a1] The smart contract (GW1) creates a transaction and gives a signature.

[Step 5a1] The smart contract (GW1) issues the transaction to the block generation server 4.

[Step 6a1] The block generation server 4 notifies the smart contract (GW1) of registration completion.

[Step 7a1] The smart contract (GW1) notifies the proxy (GW1) of the registration completion.

[Step 8a1] The proxy (GW1) notifies the registrant host terminal of the registration completion.

[Step 9a1] The registrant host terminal notifies the data provider (userA) of the registration completion.

[Step 10a1] The block generation server 4 generates a block.

[Step 11a1] The block generation server 4 distributes the block to the proxy (GW1).

[Step 12a1] The proxy (GW1) distributes the block to the smart contract (GW1).

[Step 13a1] The smart contract (GW1) performs block verification.

[Step 14a1] The smart contract (GW1) performs proxy setting on the proxy (GW1).

[Step 15a1] The proxy (GW1) notifies the smart contract (GW1) of setting completion.

[Step 16a1] The smart contract (GW1) transmits a test data GET to the proxy (GW1).

[Step 17a1] The proxy (GW1) transmits the test data GET to a data store [/test].

[Step 18a1] The data store [/test] transmits test data to the proxy (GW1).

[Step 19a1] The proxy (GW1) transmits the test data to the smart contract (GW1).

[Step 20a1] The smart contract (GW1) transmits a test data POST to the proxy (GW1).

[Step 21a1] The proxy (GW1) transmits the test data POST to a data processing environment [safe-env-X].

[Step 22a1] The data processing environment [safe-env-X] notifies the proxy (GW1) of registration completion.

[Step 23a1] The proxy (GW1) notifies the smart contract (GW1) of the registration completion.

[Step 24a1] The smart contract (GW1) transmits a provided data GET to the proxy (GW1).

[Step 25a1] The proxy (GW1) transmits the provided data GET to a data store [/product].

[Step 26a1] The data store [/product] transmits provided data to the proxy (GW1).

[Step 27a1] The proxy (GW1) transmits the provided data to the smart contract (GW1).

[Step 28a1] The smart contract (GW1) transmits a provided data POST to the proxy (GW1).

[Step 29a1] The proxy (GW1) transmits the provided data POST to the data processing environment [safe-env-X].

[Step 30a1] The data processing environment [safe-env-X] notifies the proxy (GW1) of registration completion.

[Step 31a1] The proxy (GW) notifies the smart contract (GW1) of the registration completion.

[Step 32a1] The smart contract (GW1) fills in a BC ledger (GW1).

[Step 33a1] The BC ledger (GW1) notifies the smart contract (GW1) of registration completion.

[Step 34a1] The smart contract (GW1) performs proxy setting on the proxy (GW1).

[Step 35a1] The proxy (GW1) notifies the smart contract (GW1) of setting completion.

[Step 36a1] The block generation server 4 distributes the block to a proxy (GW2).

[Step 37a1] The proxy (GW2) distributes the block to a smart contract (GW2).

[Step 38a1] The smart contract (GW2) performs block verification.

[Step 39a1] The smart contract (GW2) fills in a BC ledger (GW2).

[Step 40a1] The BC ledger (GW2) notifies the smart contract (GW2) of registration completion.

[Step 41a1] The smart contract (GW2) performs proxy setting on the proxy (GW2).

[Step 42a1] The proxy (GW2) notifies the smart contract (GW2) of setting completion.

[Step 43a1] The block generation server 4 distributes the block to a proxy (GW3).

[Step 44a1] The proxy (GW3) distributes the block to a smart contract (GW3).

[Step 45a1] The smart contract (GW3) performs block verification.

[Step 46a1] The smart contract (GW3) fills in a BC ledger (GW3).

[Step 47a1] The BC ledger (GW3) notifies the smart contract (GW3) of registration completion.

[Step 48a1] The smart contract (GW3) performs proxy setting on the proxy (GW3).

[Step 49a1] The proxy (GW3) notifies the smart contract (GW3) of setting completion.

Figure 39:
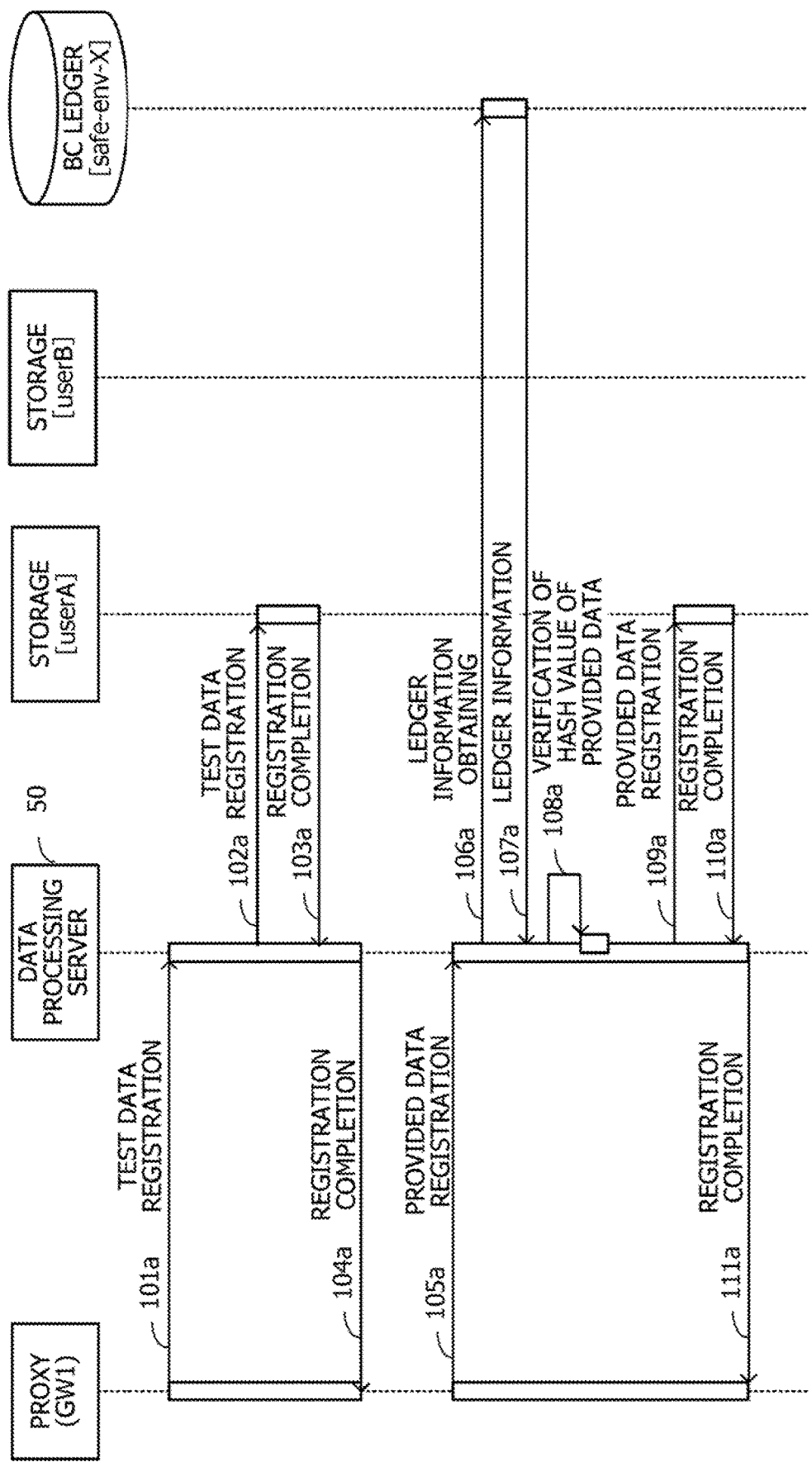
FIG. 39 is a diagram illustrating an operation sequence in a data processing environment in the provided data registration phase.

FIG. 39 is a diagram illustrating an operation sequence in the data processing environment in the provided data registration phase. Step 21a1 of FIG. 36 and step 101a of FIG. 39, step 22a1 of FIG. 36 and step 104a of FIG. 39, step 29a1 of FIG. 36 and step 105a of FIG. 39, step 30a1 of FIG. 36 and step 11a of FIG. 39 represent the same processes, respectively.

[Step 101a] The proxy (GW1) registers test data in the data processing server 50.

[Step 102a] The data processing server 50 registers the test data in the storage [/userA].

[Step 103a] The storage [/userA] notifies the data processing server 50 of registration completion.

[Step 104a] The data processing server 50 notifies the proxy (GW1) of registration completion.

[Step 105a] The proxy (GW1) registers provided data in the data processing server 50.

[Step 106a] The data processing server 50 obtains ledger information from the BC ledger.

[Step 107a] The BC ledger transmits ledger information to the data processing server 50.

[Step 108a] The data processing server 50 verifies a hash value of the provided data.

[Step 109a] The data processing server 50 registers the provided data in the storage [/userA].

[Step 110a] The storage [/userA] notifies the data processing server 50 of registration completion.

[Step 111a] The data processing server 50 notifies the proxy (GW1) of the registration completion.

In the provided data registration phase as described above, the data provider issues a provided data registration transaction that includes "data ID", "signature of provider", "attribute", "URL for accessing provided data", "URL for accessing test data", "hash value of provided data", and "publishing destination of provided data" to the own gateway (GW1).

Each GW verifies that the signature of the data provider is correct and, when there is no problem, transfers provided data and test data to the data processing environment, and writes meta-information to the BC ledger. When the writing to the BC ledger is completed, the meta-information associated with the data ID is shared on the BC ledger, and a proxy setting for permitting data access from outside is dynamically generated.

FIG. 40 is a diagram illustrating an example of a meta-information table. A meta-information table T1a1 describes meta-information after the provided data registration phase. FIGS. 41 and 42 are diagrams illustrating an example of proxy setting tables.

Proxy setting tables T2a1, T3a1, T4a1 in FIG. 41 describe proxy setting information before data registration in the provided data registration phase (the proxy setting table after being set in step 14a1 in FIG. 36), and proxy setting tables T2a1, T3a11, T4a11 in FIG. 42 describe proxy setting information after the provided data registration phase.

Figure 43:
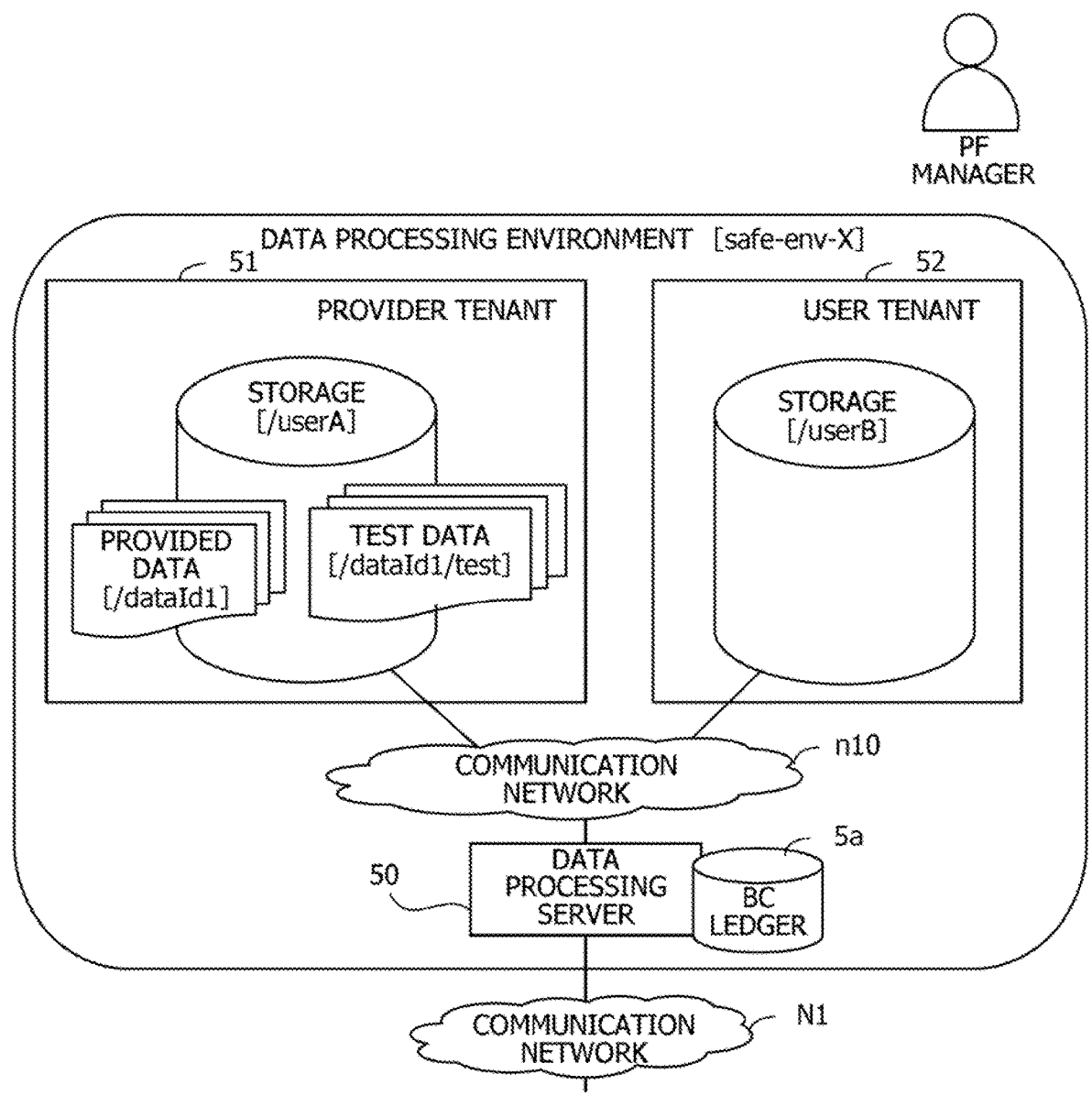
FIG. 43 is a diagram illustrating an example of a configuration in the data processing environment after the provided data registration phase.

FIG. 43 is a diagram illustrating an example of a configuration in the data processing environment after the provided data registration phase. In the data processing environment [safe-env-X], provided data [/dataId1] and test data [/dataId1/test] are in a state of being arranged in the storage [/userA] of a provider tenant 51.

Through the provided data registration phase described above, the test data is published to all users, and the provided data is inaccessible to anyone.

<Processing Service Registration Phase>

Figure 44:
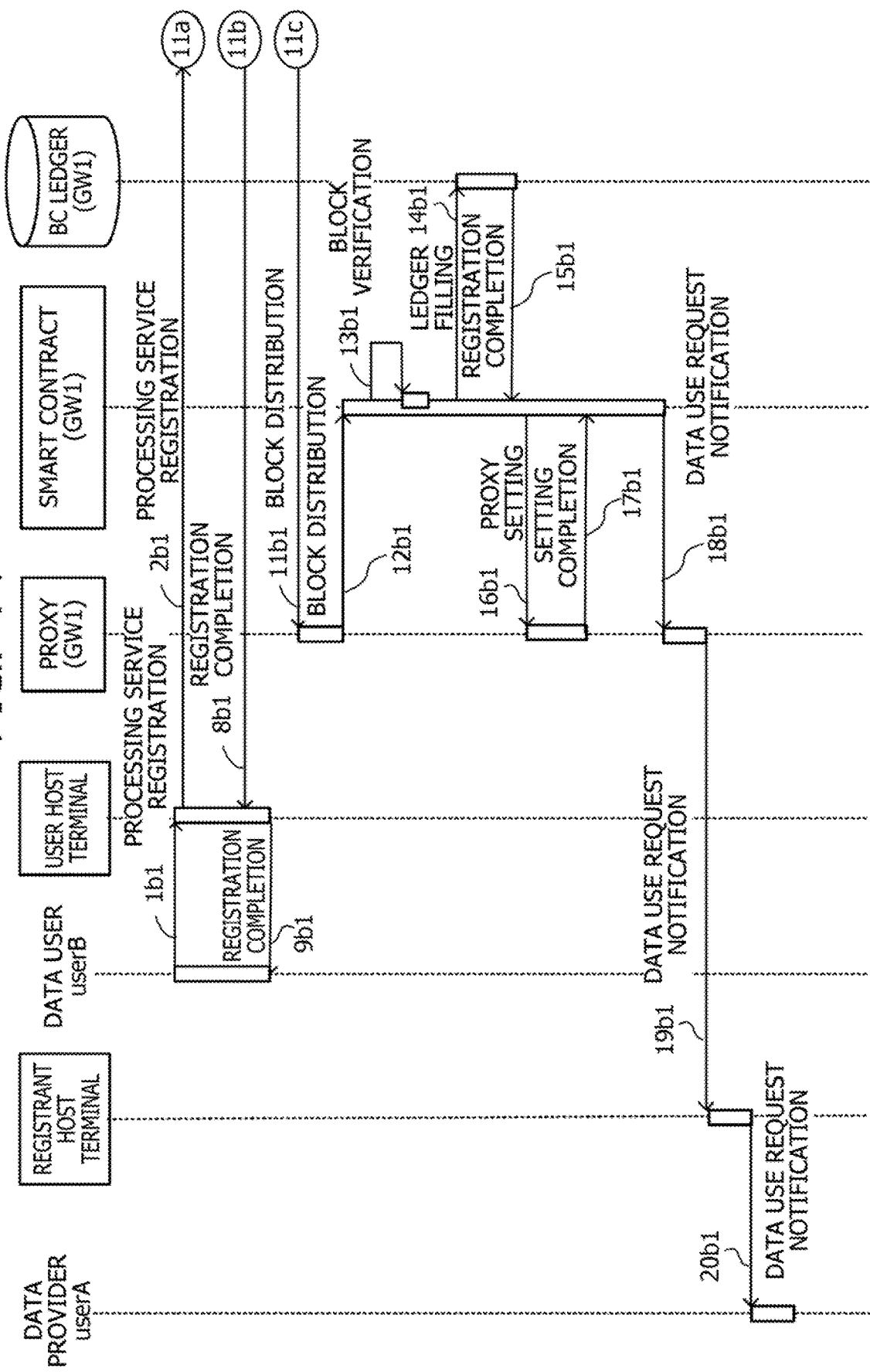
FIG. 44 is a sequence diagram illustrating an example of a processing service registration phase.
Figure 45:
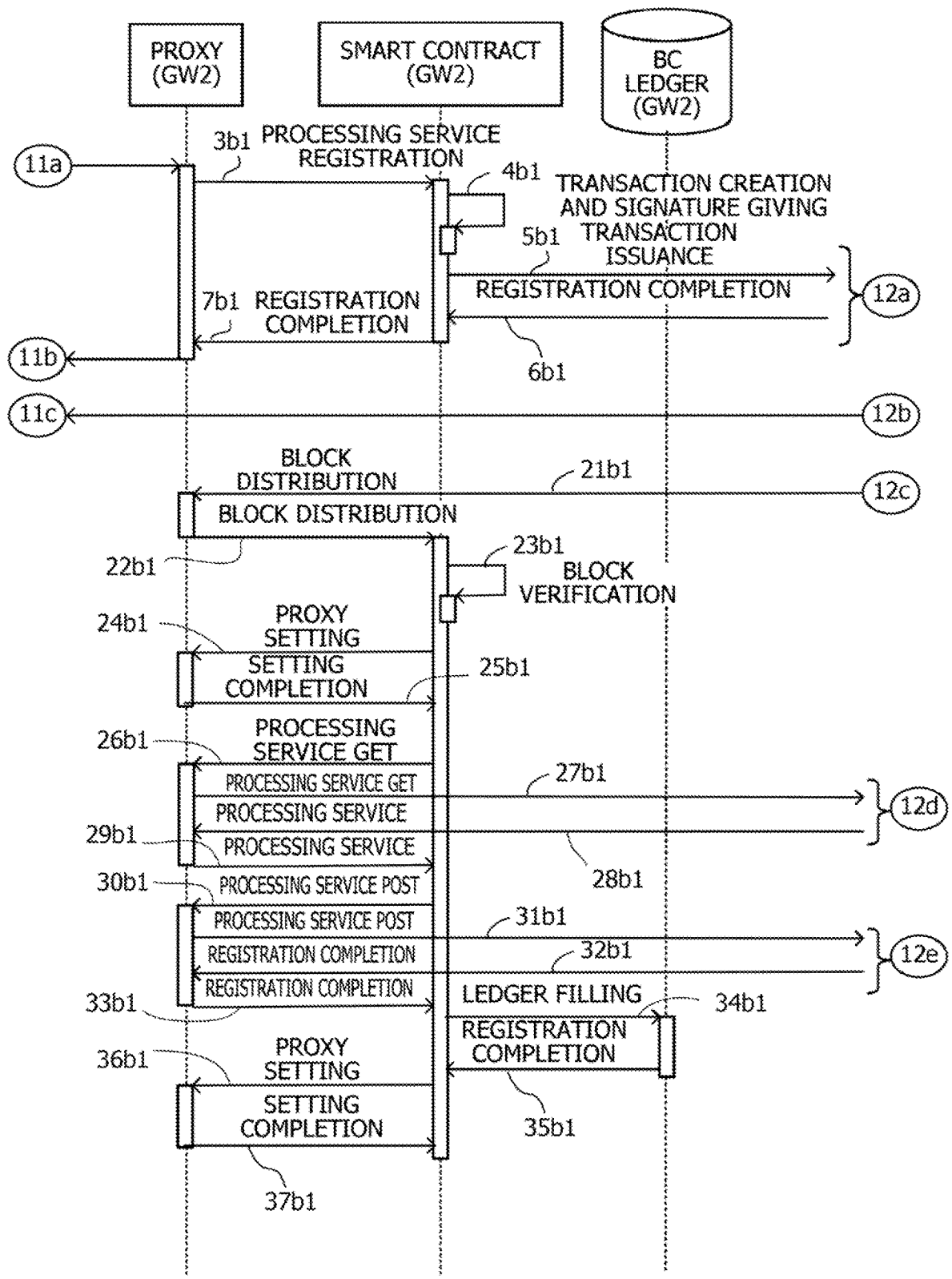
FIG. 45 is a sequence diagram illustrating an example of the processing service registration phase.
Figure 46:
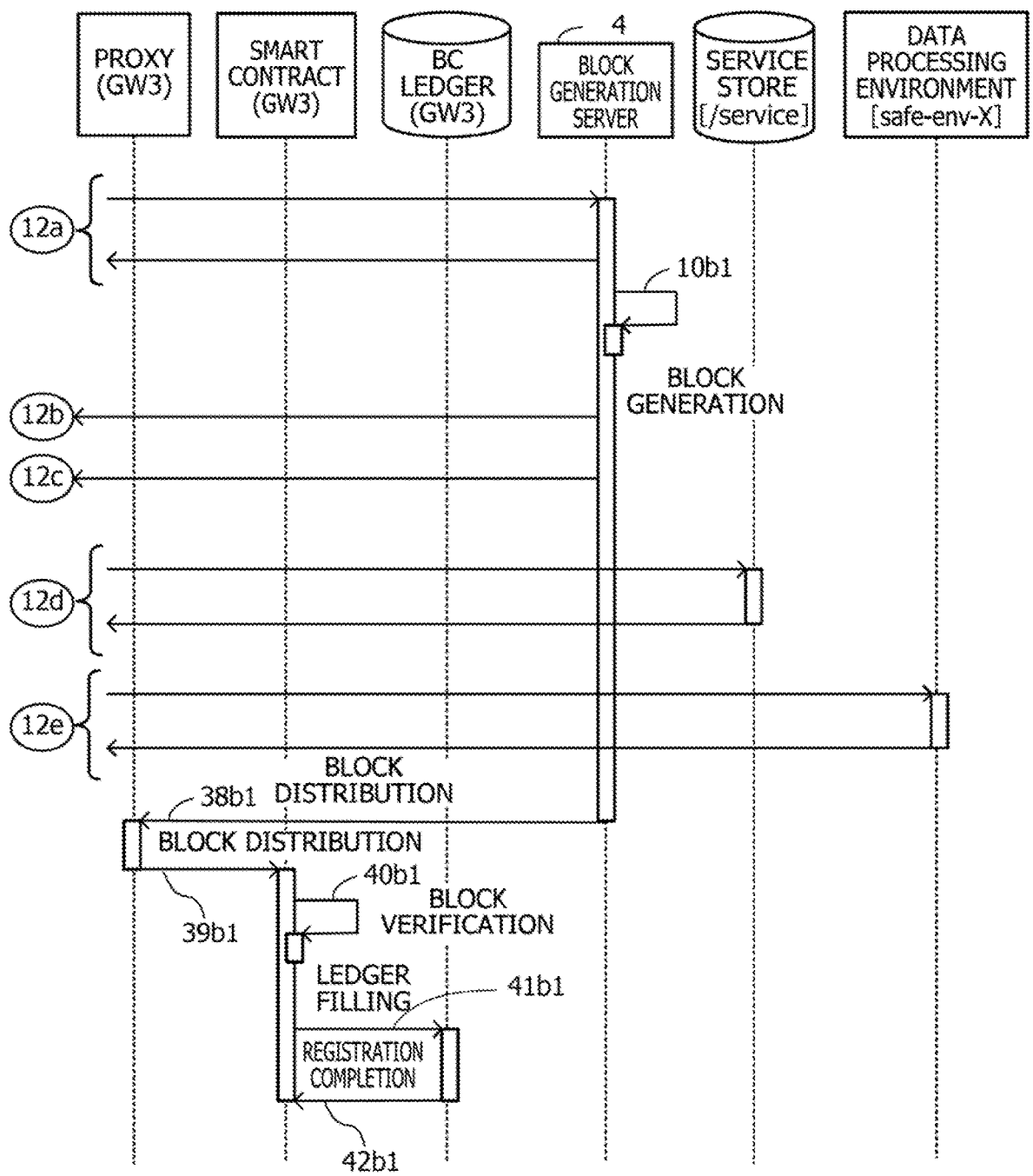
FIG. 46 is a sequence diagram illustrating an example of the processing service registration phase.

FIGS. 44 to 46 are sequence diagrams illustrating an example of a processing service registration phase.

[Step b1] A data user (userB) registers a processing service in a user host terminal.

[Step 2b1] The user host terminal registers the processing service in the proxy (GW2).

[Step 3b1] The proxy (GW2) registers the processing service in the smart contract (GW2).

[Step 4b1] The smart contract (GW2) creates a transaction and gives a signature.

[Step 5b1] The smart contract (GW2) issues the transaction to the block generation server 4.

[Step 6b1] The block generation server 4 notifies the smart contract (GW2) of registration completion.

[Step 7b1] The smart contract (GW2) notifies the proxy (GW2) of the registration completion.

[Step 8b1] The proxy (GW2) notifies the user host terminal of the registration completion.

[Step 9b1] The user host terminal notifies the data user (userB) of the registration completion.

[Step 10b1] The block generation server 4 generates a block.

[Step 11b1] The block generation server 4 distributes the block to the proxy (GW1).

[Step 12b1] The proxy (GW1) distributes the block to the smart contract (GW1).

[Step 13b1] The smart contract (GW1) performs block verification.

[Step 14b1] The smart contract (GW1) fills in the BC ledger (GW1).

[Step 15b1] The BC ledger (GW1) notifies the smart contract (GW1) of registration completion.

[Step 16b1] The smart contract (GW1) performs proxy setting on the proxy (GW1).

[Step 17b1] The proxy (GW1) notifies the smart contract (GW1) of setting completion.

[Step 18b1] The smart contract (GW1) transmits a data use request notification to the proxy (GW1).

[Step 19b1] The proxy (GW1) transmits a data use request notification to the registrant host terminal.

[Step 20b1] The registrant host terminal transmits a data use request notification to the data provider (userA).

[Step 21b1] The block generation server 4 distributes the block to the proxy (GW2).

[Step 22b1] The proxy (GW2) distributes the block to the smart contract (GW2).

[Step 23b1] The smart contract (GW2) performs block verification.

[Step 24b1] The smart contract (GW2) performs proxy setting on the proxy (GW2).

[Step 25b1] The proxy (GW2) notifies the smart contract (GW2) of setting completion.

[Step 26b1] The smart contract (GW2) transmits a processing service GET to the proxy (GW2).

[Step 27b1] The proxy (GW2) transmits the processing service GET to a service store [/service].

[Step 28b1] The service store [/service] transmits a processing service to the proxy (GW2).

[Step 29b1] The proxy (GW2) transmits the processing service to the smart contract (GW2).

[Step 30b1] The smart contract (GW2) transmits a processing service POST to the proxy (GW2).

[Step 31b1] The proxy (GW2) transmits the processing service POST to the data processing environment [safe-env-X].

[Step 32b1] The data processing environment [safe-env-X] notifies the proxy (GW2) of registration completion.

[Step 33b1] The proxy (GW2) notifies the smart contract (GW2) of the registration completion.

[Step 34b1] The smart contract (GW2) fills in the BC ledger (GW2).

[Step 35b1] The BC ledger (GW2) notifies the smart contract (GW2) of registration completion.

[Step 36b1] The smart contract (GW2) performs proxy setting on the proxy (GW2).

[Step 37b1] The proxy (GW2) notifies the smart contract (GW2) of setting completion.

[Step 38b1] The block generation server 4 distributes the block to the proxy (GW3).

[Step 39b1] The proxy (GW3) distributes the block to the smart contract (GW3).

[Step 40b1] The smart contract (GW3) performs block verification.

[Step 41b1] The smart contract (GW3) fills in the BC ledger (GW3).

[Step 42b1] The BC ledger (GW3) notifies the smart contract (GW3) of registration completion.

Figure 47:
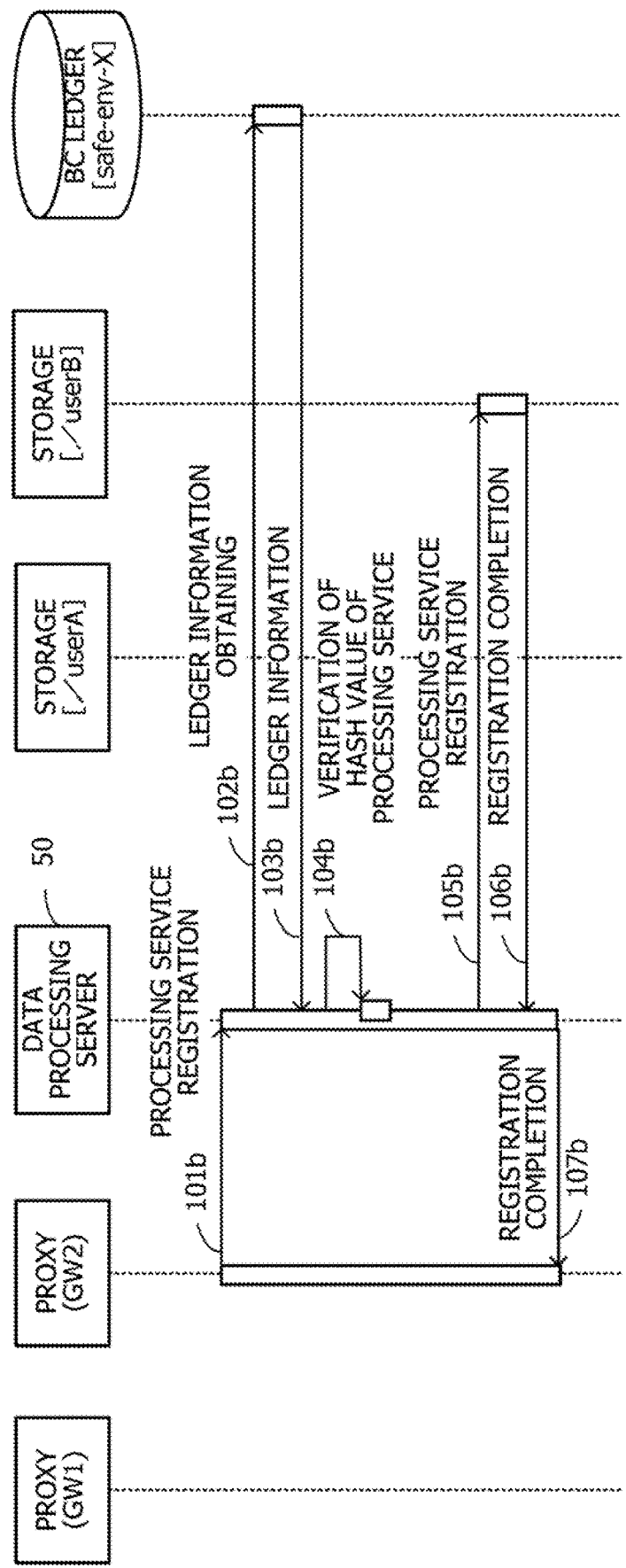
FIG. 47 is a diagram illustrating an operation sequence in the data processing environment in the processing service registration phase.

FIG. 47 is a diagram illustrating an operation sequence in the data processing environment in the processing service registration phase. Step 31b1 in FIG. 45 and step 101b in FIG. 47, and step 32b1 in FIG. 45 and step 107b in FIG. 47 represent the same processes, respectively.

[Step 101b] The proxy (GW2) registers the processing service in the data processing server 50.

[Step 102b] The data processing server 50 obtains ledger information from the BC ledger [safe-env-X].

[Step 103b] The BC ledger [safe-env-X] transmits ledger information to the data processing server 50.

[Step 104b] The data processing server 50 verifies a hash value of the processing service.

[Step 105b] The data processing server 50 registers the processing service in the storage [/userB].

[Step 106b] The storage [/userB] notifies the data processing server 50 of registration completion.

[Step 107b] The data processing server 50 notifies the proxy (GW2) of registration completion.

In the processing service registration phase as described above, the data user creates a processing service by using the test data that has become accessible in the provided data registration phase. In order to actually apply to use the created processing service with the provided data, the data user issues a processing service registration transaction including "service ID", "signature of user", "attribute", "URL for accessing the processing service", "hash value of processing service", and "publishing destination of processing service" in the own gateway.

Each GW verifies that the signature of the data user is correct, and when there is no problem, it is written in the BC ledger. When the writing to the BC ledger is completed, meta-information associated with the service ID is shared on the BC ledger, and a proxy setting is dynamically generated.

FIG. 48 is a diagram illustrating an example of a meta-information table. A meta-information table T1b1 describes meta-information after the processing service registration phase. FIGS. 49 and 50 are diagrams illustrating an example of proxy setting tables. Proxy setting tables T2b1, T3b1, T4b1 in FIG. 49 describe proxy setting information before data registration in the processing service registration phase (the proxy setting table after being set in step 24b1 in FIG. 45), and proxy setting tables T2b11, T3b11, T4b11 in FIG. 50 describe proxy setting information after the processing service registration phase.

Figure 51:
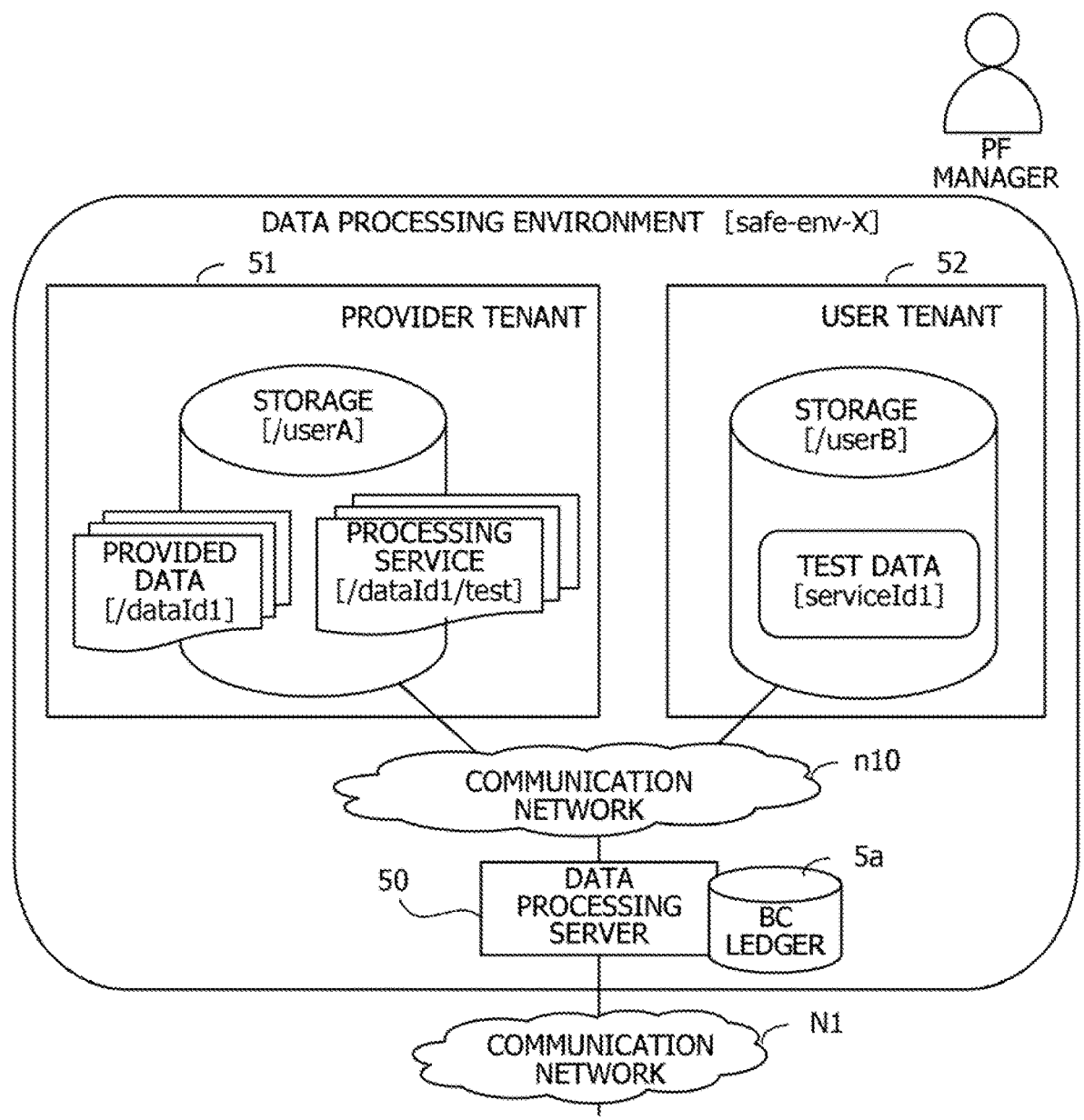
FIG. 51 is a diagram illustrating an example of a configuration in the data processing environment after the processing service registration phase.

FIG. 51 is a diagram illustrating an example of a configuration in the data processing environment after the processing service registration phase. In the data processing environment [safe-env-X], provided data [/dataId1] and test data [/dataId1/test] are in a state of being arranged in the storage [/userA] of the provider tenant 51. Further, the processing service [serviceId1] is in a state of being arranged in the storage [/userB] of the user tenant 52.

In the processing service registration phase described above, the test data remains published to all and the provided data remains inaccessible to anyone, and only the data provider is able to make a POST request to the processing service.

<Meta-Information Update Phase>

Figure 52:
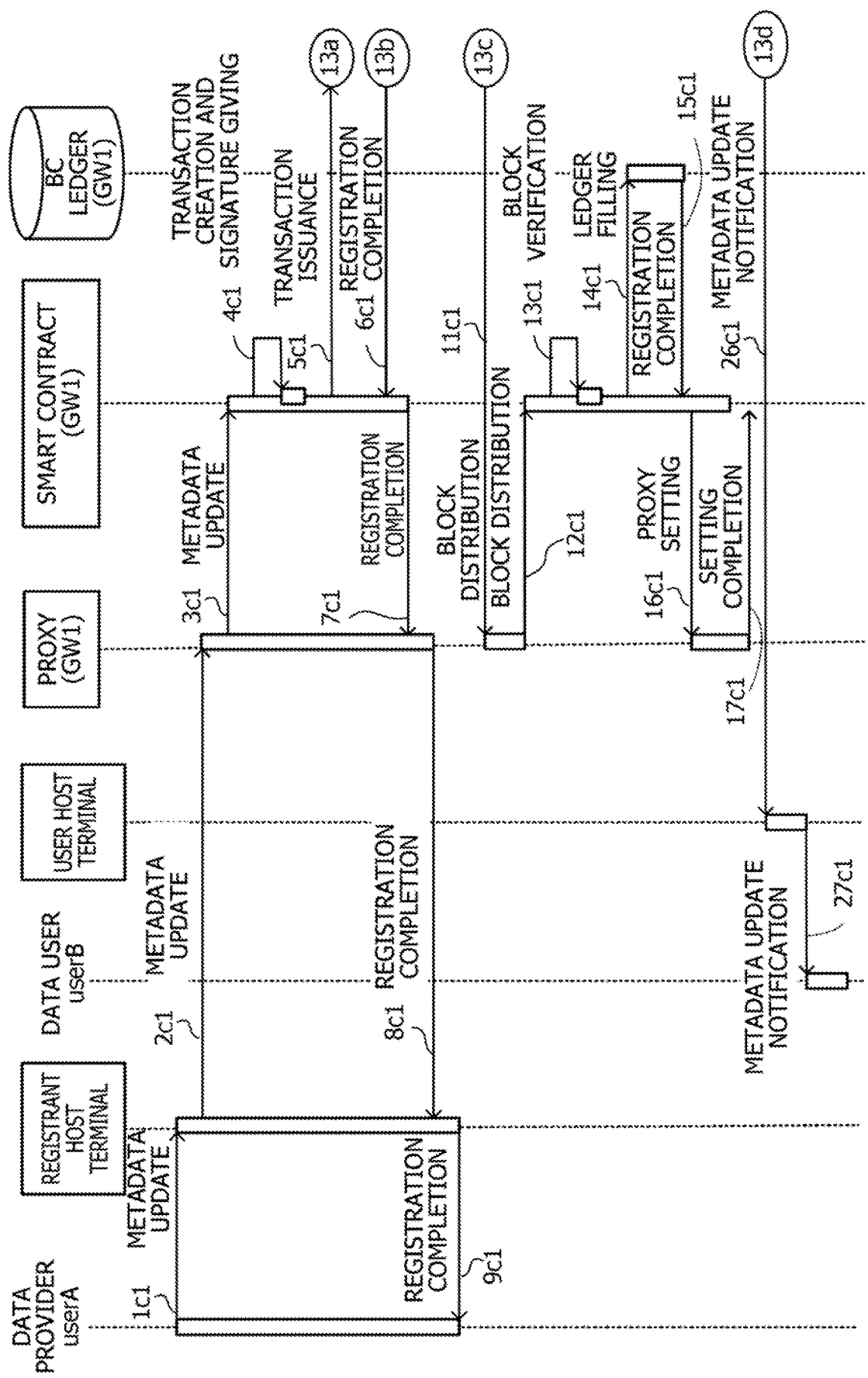
FIG. 52 is a sequence diagram illustrating an example of a meta-information update phase.
Figure 53:
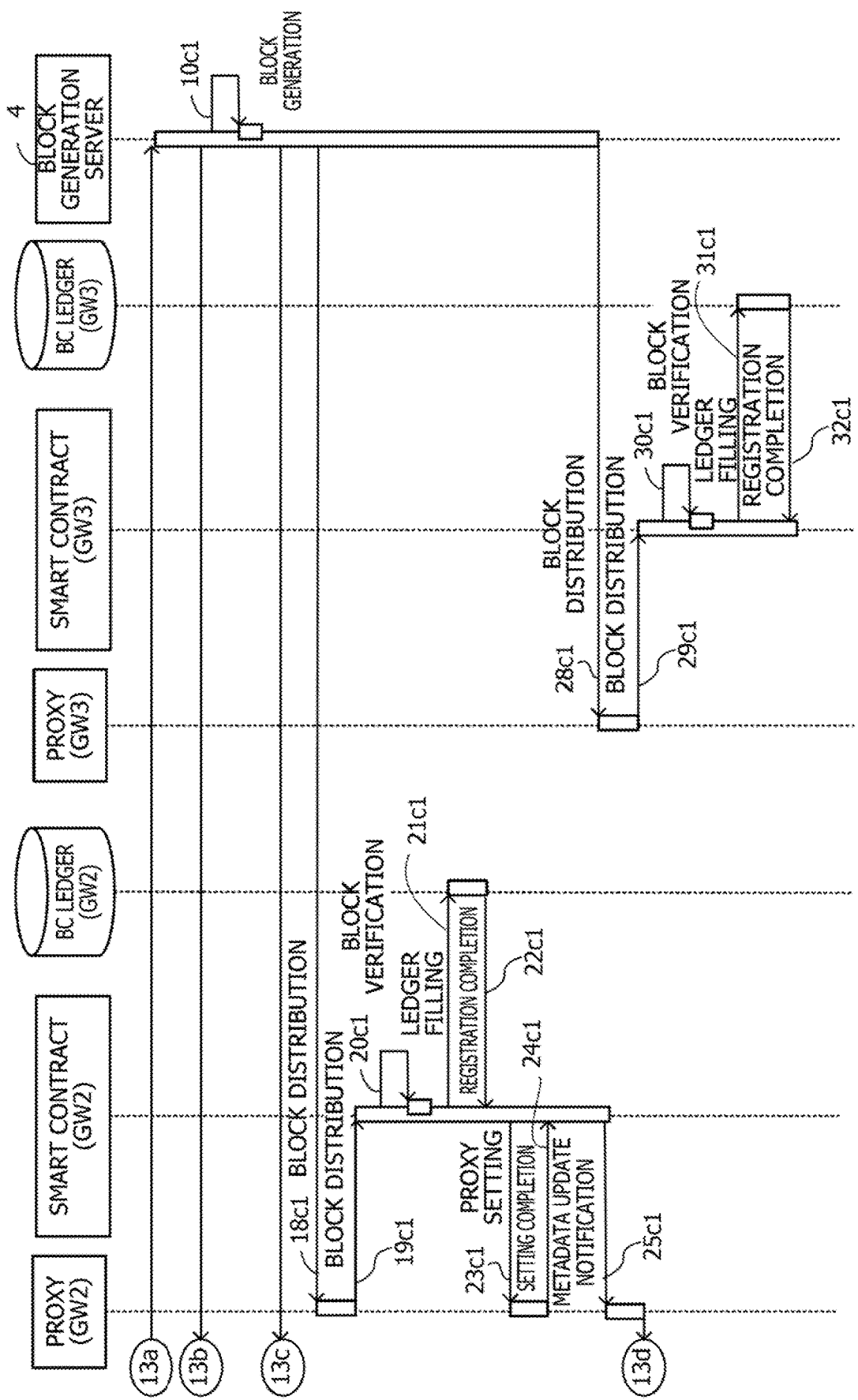
FIG. 53 is a sequence diagram illustrating an example of the meta-information update phase.

FIGS. 52 and 53 are sequence diagrams illustrating an example of a meta-information update phase.

[Step 1c1] The data provider (userA) updates metadata in a registrant host terminal.

[Step 2c1] The registrant host terminal registers provided data in the proxy (GW1).

[Step 3c1] The proxy (GW1) updates metadata in the smart contract (GW1).

[Step 4c1] The smart contract (GW1) creates a transaction and gives a signature.

[Step 5c1] The smart contract (GW1) issues the transaction to the block generation server 4.

[Step 6c1] The block generation server 4 notifies the smart contract (GW1) of registration completion.

[Step 7c1] The smart contract (GW1) notifies the proxy (GW1) of the registration completion.

[Step 8c1] The proxy (GW1) notifies the registrant host terminal of the registration completion.

[Step 9c1] The registrant host terminal notifies the data provider (userA) of the registration completion.

[Step 10c1] The block generation server 4 generates a block.

[Step 11c1] The block generation server 4 distributes the block to the proxy (GW1).

[Step 12c1] The proxy (GW1) distributes the block to the smart contract (GW1).

[Step 13c1] The smart contract (GW1) performs block verification.

[Step 14c1] The smart contract (GW1) fills in the BC ledger (GW1).

[Step 15c1] The BC ledger (GW1) notifies the smart contract (GW1) of registration completion.

[Step 16c1] The smart contract (GW1) performs proxy setting on the proxy (GW1).

[Step 17c1] The proxy (GW1) notifies the smart contract (GW1) of setting completion.

[Step 18c1] The block generation server 4 distributes the block to the proxy (GW2).

[Step 19c1] The proxy (GW2) distributes the block to the smart contract (GW2).

[Step 20c1] The smart contract (GW2) performs block verification.

[Step 21c1] The smart contract (GW2) fills in the BC ledger (GW2).

[Step 22c1] The BC ledger (GW2) notifies the smart contract (GW2) of registration completion.

[Step 23c1] The smart contract (GW2) performs proxy setting on the proxy (GW2).

[Step 24c1] The proxy (GW2) notifies the smart contract (GW2) of setting completion.

[Step 25c1] The smart contract (GW2) notifies the proxy (GW2) of metadata update.

[Step 26c1] The proxy (GW2) notifies the user host terminal of the metadata update.

[Step 27c1] The user host terminal transmits a data use request notification to the data user (userB).

[Step 28c1] The block generation server 4 distributes the block to the proxy (GW3).

[Step 29c1] The proxy (GW3) distributes the block to the smart contract (GW3).

[Step 30c1] The smart contract (GW3) performs block verification.

[Step 31c1] The smart contract (GW3) fills in the BC ledger (GW3).

[Step 32c1] The BC ledger (GW3) notifies the smart contract (GW3) of registration completion.

In the meta-information update phase as described above, upon receiving a notification of a data use request in the processing service registration phase, the data provider verifies the content of the registered processing service. When it is determined that there is no problem with the content of the processing service, in order to approve use of the provided data, the data provider issues a meta-information update transaction to update the item "publishing destination of provided data" in the meta-information of the provided data registered to the own gateway.

The information included in this transaction includes "data ID", "signature of provider" "attribute", "URL for accessing provided data", "URL for accessing test data", "hash value of provided data", and "publishing destination of provided data" similarly to the provided data registration phase, and the service ID of the processing service is specified in the "publishing destination of provided data".

Each GW verifies that the signature is correct, and when there is no problem, it is written in the BC ledger. When the writing in the BC ledger is completed, the meta-information associated with the data ID is shared on the BC ledger, and a proxy setting is dynamically generated.

FIG. 54 is a diagram illustrating an example of a meta-information table, and FIG. 55 is a diagram illustrating an example of proxy setting tables. A meta-information table T1c1 describes meta-information after the meta-information update phase, and proxy setting tables T2c1, T3c1, T4c1 describe proxy setting information after the meta-Information update phase. In this phase, the setting for access to the verified processing services is only deleted.

<Meta-Information Matching Phase>

Figure 56:
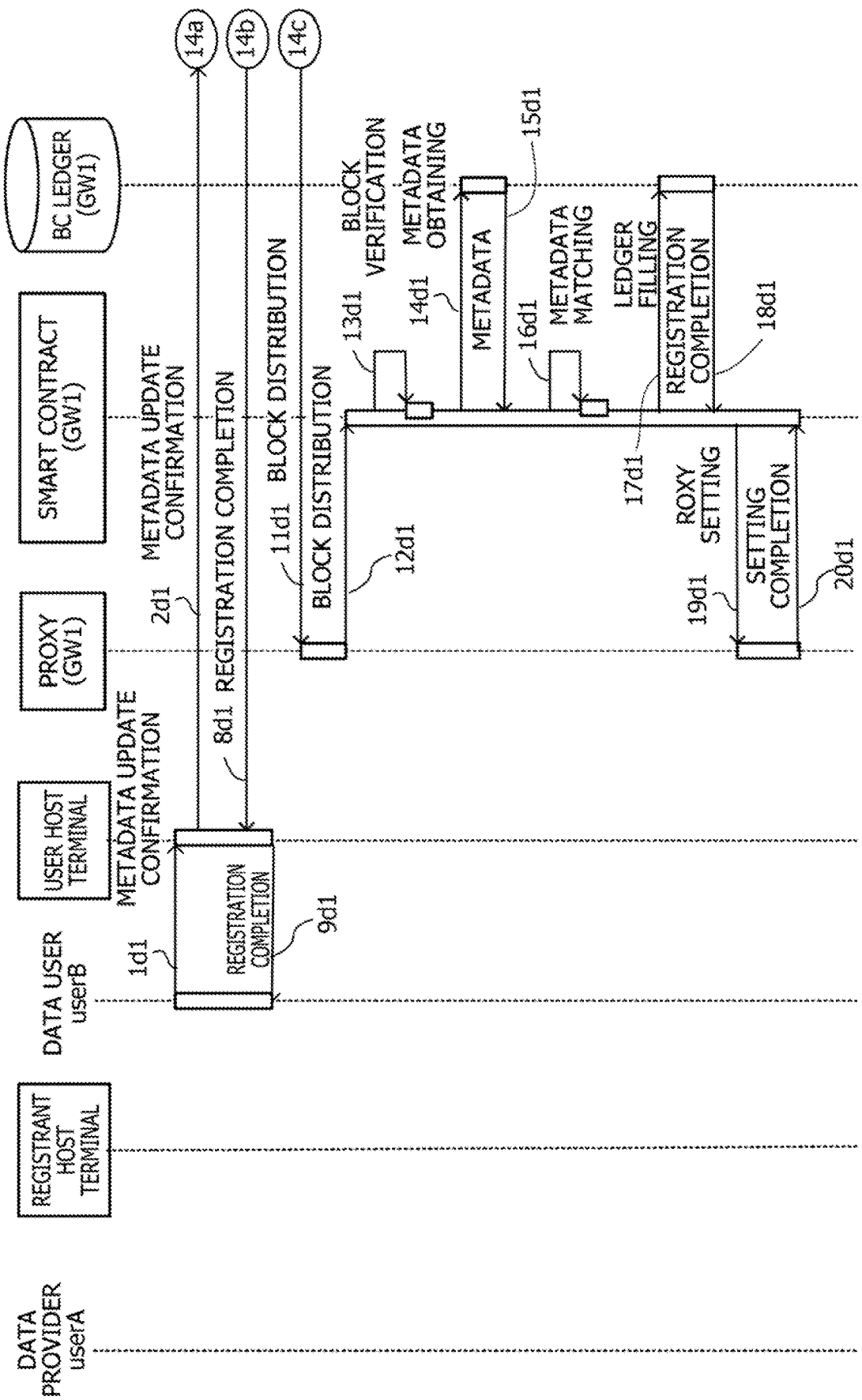
FIG. 56 is a sequence diagram illustrating an example of a meta-information matching phase.
Figure 57:
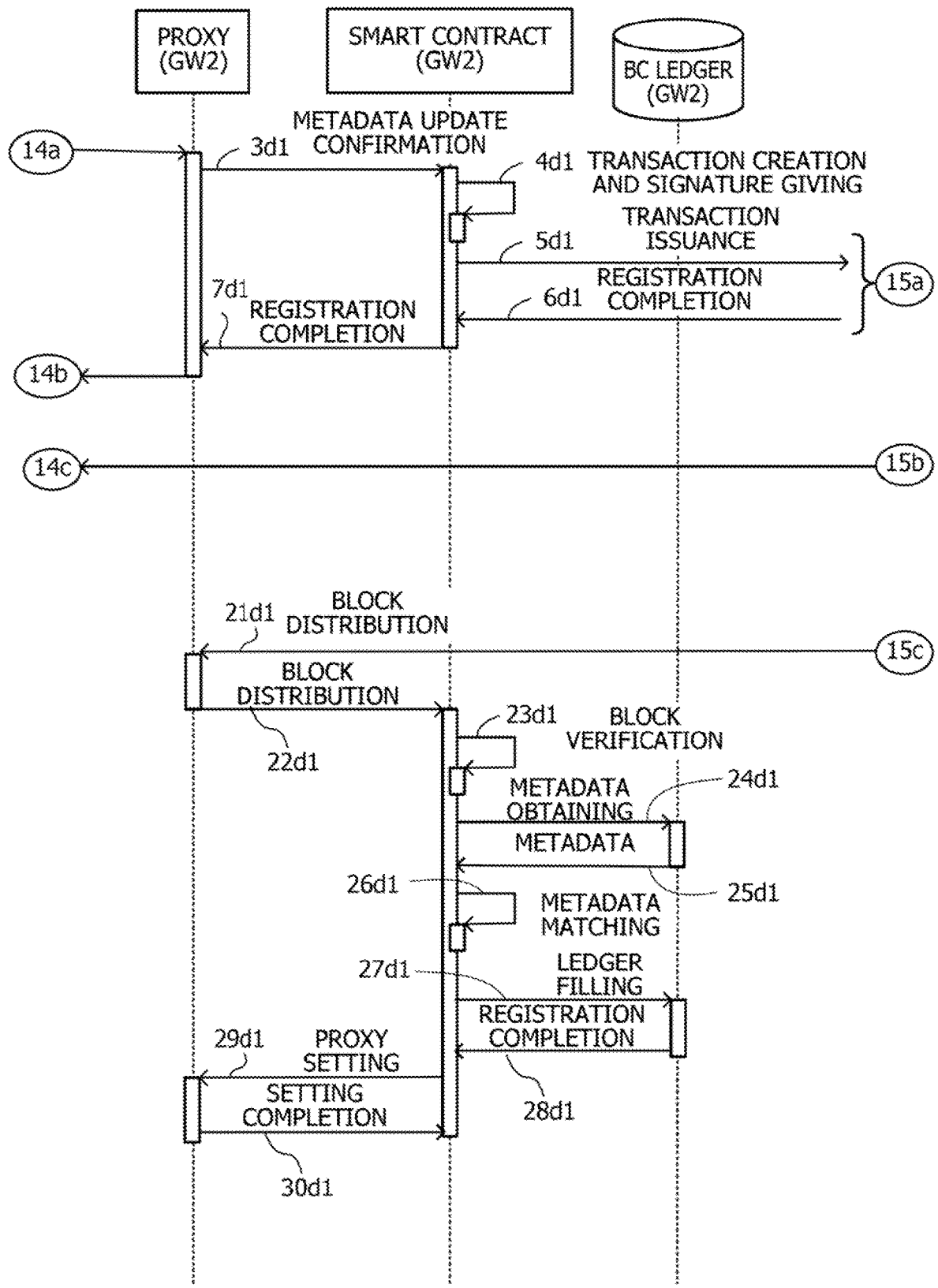
FIG. 57 is a sequence diagram illustrating an example of the meta-information matching phase.
Figure 58:
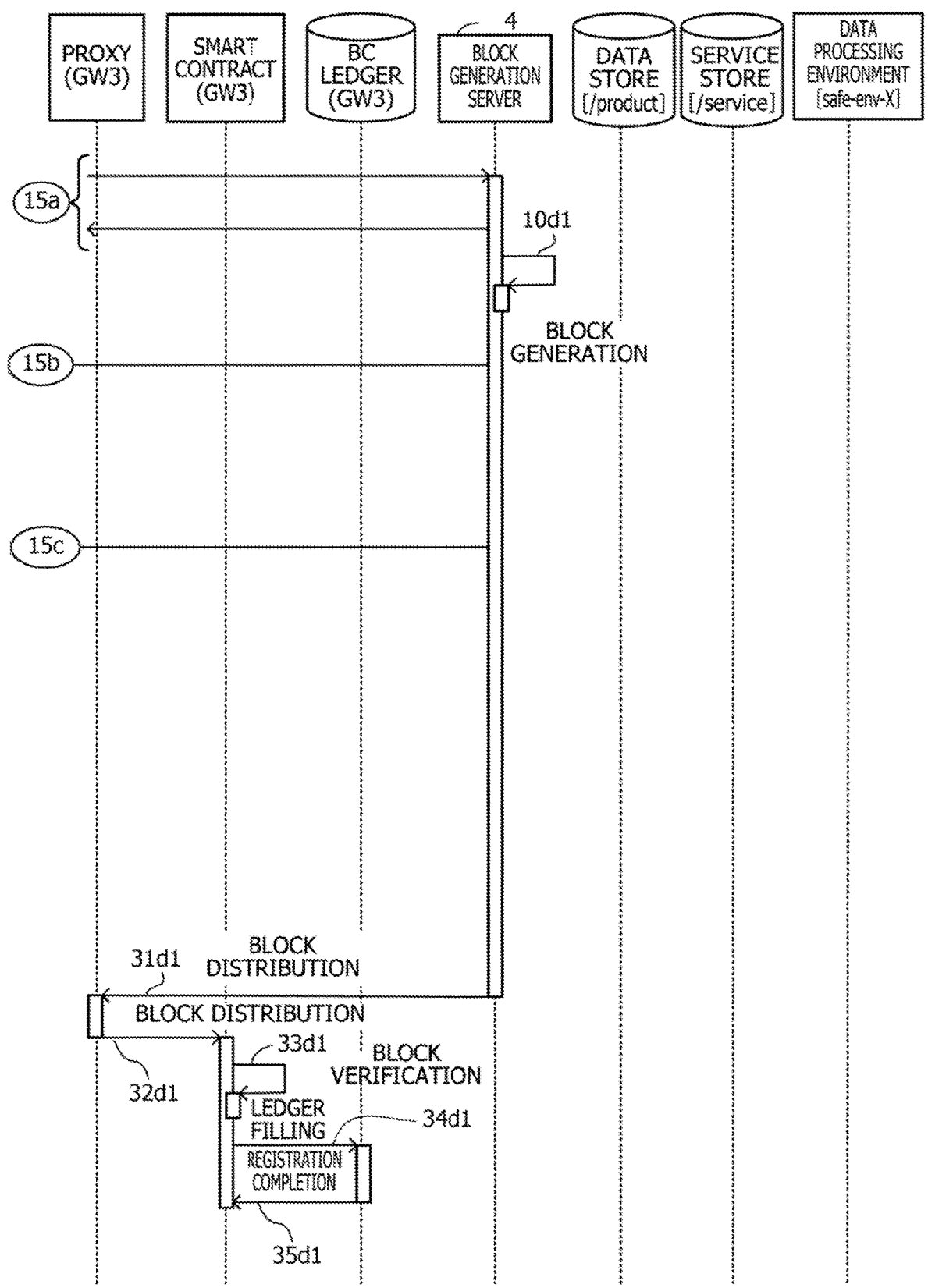
FIG. 58 is a sequence diagram illustrating an example of the meta-Information matching phase.

FIGS. 56 to 58 are sequence diagrams illustrating an example of a meta-information matching phase.

[Step 1d1] The data user (userB) confirms a metadata update with the user host terminal.

[Step 2d1] The user host terminal confirms the metadata update with the proxy (GW2).

[Step 3d1] The proxy (GW2) confirms the metadata update with the smart contract (GW2).

[Step 4d1] The smart contract (GW2) creates a transaction and gives a signature.

[Step 5d1] The smart contract (GW2) issues the transaction to the block generation server 4.

[Step 6d1] The block generation server 4 notifies the smart contract (GW2) of registration completion.

[Step 7d1] The smart contract (GW2) notifies the proxy (GW2) of the registration completion.

[Step 8d1] The proxy (GW2) notifies the user host terminal of the registration completion.

[Step 9d1] The user host terminal notifies the data user (userB) of the registration completion.

[Step 10d1] The block generation server 4 generates a block.

[Step 11d1] The block generation server 4 distributes the block to the proxy (GW1).

[Step 12d1] The proxy (GW1) distributes the block to the smart contract (GW1).

[Step 13d1] The smart contract (GW1) performs block verification.

[Step 14d1] The smart contract (GW1) obtains metadata from the BC ledger (GW1).

[Step 15d1] The BC ledger (GW1) transmits metadata to the smart contract (GW1).

[Step 16d1] The smart contract (GW1) performs metadata matching.

[Step 17d1] The smart contract (GW1) fills in the BC ledger (GW1).

[Step 18d1] The BC ledger (GW1) notifies the smart contract (GW1) of registration completion.

[Step 19d1] The smart contract (GW1) performs proxy setting on the proxy (GW1).

[Step 20d1] The proxy (GW1) notifies the smart contract (GW1) of setting completion.

[Step 21d1] The block generation server 4 distributes the block to the proxy (GW2).

[Step 22d1] The proxy (GW2) distributes the block to the smart contract (GW2).

[Step 23d1] The smart contract (GW2) performs block verification.

[Step 24d1] The smart contract (GW2) obtains metadata from the BC ledger (GW2).

[Step 25d1] The BC ledger (GW2) transmits metadata to the smart contract (GW2).

[Step 26d1] The smart contract (GW2) performs metadata matching.

[Step 27d1] The smart contract (GW2) fills in the BC ledger (GW2).

[Step 28d1] The BC ledger (GW2) notifies the smart contract (GW2) of registration completion.

[Step 29d1] The smart contract (GW2) performs proxy setting on the proxy (GW2).

[Step 30d1] The proxy (GW2) notifies the smart contract (GW2) of setting completion.

[Step 31d1] The block generation server 4 distributes the block to the proxy (GW3).

[Step 32d1] The proxy (GW3) distributes the block to the smart contract (GW3).

[Step 33d1] The smart contract (GW3) performs block verification.

[Step 34d1] The smart contract (GW3) fills in the BC ledger (GW3).

[Step 35d1] The BC ledger (GW3) notifies the smart contract (GW3) of registration completion.

In the meta-information matching phase as described above, upon receiving a notification of meta-information update in the meta-information update phase, the data user confirms that the data provider has approved use of the data.

Then, in order to actually start using the data, the data user issues a meta-information update confirmation transaction including "data ID to be used", "service ID to be used", and "signature of user" in the own gateway.

Each GW verifies that the signature is correct and that the meta-information matches. When there is no problem in these verifications, a routing table for data access is dynamically generated.

FIG. 59 is a diagram illustrating an example of a meta-information table, and FIG. 60 is a diagram illustrating an example of proxy setting tables. A meta-information table T1d1 describes meta-information after the meta-Information matching phase, and proxy setting tables T2d1, T3d1, T4d1 describe the proxy setting information after the meta-information matching phase. In this phase, "/processDataId1" is issued as a URL for receiving data of a processing result, which only the data user is able to access.

<Processed Data Obtaining Phase>

A sequence of a processed data obtaining phase of the third embodiment is the same as the sequence illustrated in FIG. 31 to FIG. 33 described above, and an operation sequence in the data processing environment of the third embodiment is the same as the sequence illustrated in FIG. 34 described above.

When the data user sends a request to "/processDataId1", the request is transferred based on a routing table set in the GW, and the data processing server 50 obtains provided data and only returns a result of processing by the processing service to the data user as a response.

Furthermore, in order to leave a correct delivery of processed data to the user as an evidence trail, a transaction including the "processed data obtaining result" and the "signature of user" is issued at a timing when obtaining of the processed data is completed, and is recorded in the BC ledger at each GW. In the third embodiment, the data and the processing service are not deleted, and all the processes are completed by recording the BC ledger.

Fourth Embodiment

Next, a fourth embodiment will be described. In the fourth embodiment, a data processing environment to be executed is specified among a plurality of data processing environments. In the fourth embodiment, a trusted processing environment for data and a processing service is selected from a plurality of data processing environments, and the processing is executed only under that environment.

FIG. 61 is a diagram illustrating an example of a communication system according to the fourth embodiment. In a communication system 1a-1 of the fourth embodiment, a data processing environment 5-1 (data processing environment [safe-env-X]), a data processing environment 5-2 (data processing environment [safe-env-Y]), and a data processing environment 5-3 (data processing environment [safe-env-Z]) are connected to a communication network N1. Other configurations are similar to those in FIG. 3, and thus description thereof will be omitted.

Each of the plurality of data processing environments has a different PF manager, and the location of installation, security level in the environment, type of storage used, usage fee, and the like are different. The data provider and the data user may select a data processing environment to use from a plurality of data processing environments.

<Advance Preparation>

The PF manager prepares the data processing environment illustrated in FIG. 7 as a safe data processing environment. Further, information of the data processing environment [safe-env-X], the data processing environment [safe-env-Y], and the data processing environment [safe-env-Z] is registered in each GW, so that the network is capable of communicating therewith.

FIG. 62 is a diagram illustrating an example of a meta-information table. A meta-information table T10 is table information in an initial state. A proxy setting table is the same as the table illustrated in FIG. 11 described above. In this phase, setting for transferring a transaction request issued by each GW owner and block information distributed from the block generation server 4 to the smart contract is included. Other requests will be discarded, and thus it is not possible to access any data or services from each GW.

<Provided Data Registration Phase>

A sequence of a provided data registration phase is the same as the sequence illustrated in FIGS. 12 and 13 described above. The data provider issues a provided data registration transaction that includes "data ID", "signature of provider", "attribute", "URL for accessing provided data", "URL for accessing test data", "hash value of provided data", "publishing destination of provided data", and "processing environment to be used" to the own gateway (GW1).

Each GW verifies that the signature of the data provider is correct, and if there is no problem, it is written in the BC ledger. When the writing to the BC ledger is completed, the meta-information associated with the data ID is shared on the BC ledger, and a proxy setting for permitting data access from outside is dynamically generated.

FIG. 63 is a diagram illustrating an example of a meta-information table. A meta-information table T10a is table information after the provided data registration phase. The proxy setting table is the same as the table of FIG. 15 described above. In this phase, the test data is published to all users, and the provided data is inaccessible to anyone.

<Processing Service Registration Phase>

A sequence of a processing service registration phase is the same as the sequences illustrated in FIGS. 16 and 17 described above. The data user creates a processing service by using test data that has become accessible in the provided data registration phase.

In order to actually apply to use the created processing service with provided data, the data user issues a processing service registration transaction including "service ID", "signature of user", "attribute", "URL for accessing processing service", "hash value of processing service", "publishing destination of processing service", and "processing environment to be used" in the own gateway. Each GW verifies that the signature of the data user is correct, and when there is no problem, it is written in the ledger.

When the writing to the BC ledger is completed, meta-information associated with the service ID is shared on the BC ledger, and a proxy setting is dynamically generated.

FIG. 64 is a diagram illustrating an example of a meta-information table. A meta-information table T10b is table information after the processing service registration phase. The proxy setting table is the same as the table of FIG. 19 described above.

In this phase, the test data remains published to all and the provided data remains inaccessible to anyone, and only the data provider is able to make a POST request to the processing service.

<Meta-Information Update Phase>

A sequence of a meta-information update phase is the same as the sequence illustrated in FIGS. 20 and 21 described above. Upon receiving a notification of a data use request in the processing service registration phase, the data provider verifies the content of the registered processing service.

When it is determined that there is no problem with the content of the processing service, in order to approve use of the provided data, the data provider issues a meta-information update transaction to update the item "publishing destination of provided data" in the meta-information of the provided data registered to the own gateway.

The information included in this transaction is "data ID", "signature of provider", "attribute", "URL for accessing provided data", "URL for accessing test data", "hash value of provided data", "publishing destination of provided data", and "processing environment to be used" similarly to the provided data registration phase", and the service ID of the processing service is specified in the "publishing destination of provided data".

Each GW verifies that the signature is correct, and when there is no problem, it is written in the ledger. When the writing in the BC ledger is completed, the meta-information associated with the data ID is shared on the BC ledger, and a proxy setting is dynamically generated.

FIG. 65 is a diagram illustrating an example of a meta-information table, and FIG. 66 is a diagram illustrating an example of proxy setting tables. A meta-information table T10c describes meta-information after the meta-information update phase, and proxy setting tables T20c, T30c, T40c describe proxy setting information after the phase.

In this phase, it is a state that, only the GW1 may perform GET to the provided data and POST to the provider tenant. Further, similarly, it is a state that, only the GW2 may perform GET to the processing service and POST to the user tenant (in this phase, all setting for a POST-enabled data processing environment are registered in advance, and which data processing environment it is actually transmitted to will be determined in a next meta-information matching phase).

<Meta-Information Matching Phase>

A sequence of a meta-information matching phase is the same as the sequence illustrated in FIGS. 24 to 26 described above, and an operation sequence in the data processing environment is the same as the sequence of FIG. 27 described above.

Upon receiving a notification of meta-information update in the meta-information update phase, the data user confirms that the data provider has approved use of the data. Then, in order to actually start using the data, the data user issues a meta-information update confirmation transaction including "data ID to be used", "service ID to be used", and "signature of user" in the own gateway.

Each GW verifies that the signature is correct and that the meta-information matches. In the meta-information matching phase of the fourth embodiment, matching of the data processing environment is also performed. The matching of the data processing environment means finding a matching item between the "data processing environment" in the data of target A and "data processing environment" in the processing service of target B (a method for determining the data processing environment when there is a plurality of data processing environments with matching items will be described later).

For example, since the value of "safe-env-X" matches between dataId1 and serviceId1, it is determined to transfer a resource to the data processing environment of this value. When there is no problem in the verification, the provided data and the processing service are transferred to the data processing environment, and a routing table for data access is dynamically generated.

When the provided data is transferred to the data processing environment, the hash value registered in the meta-information and the hash-calculated value of the actually transferred data are compared to verify that they are the same value, and then registered in the storage. The hash value is verified similarly when the processing service is transferred.

FIG. 67 is a diagram illustrating an example of a meta-information table. A meta-information table T10d describes table information after the meta-information matching phase. The proxy setting table is the same as the table of FIG. 29 described above.

In this phase, "/processDataId1" is issued as a URL for receiving data of a processing result, which only the data user is able to access. Further, the setting to allow performing GET and POST for the provided data and the processing service that has been set in the meta-information update phase is deleted for safety.

Note that a configuration within the data processing environment after the meta-information matching phase is the same as the configuration illustrated in FIG. 30 described above. The provided data and the processing service are in a state of being arranged in the tenant of the owner.

<Processed Data Obtaining Phase>

A sequence of a processed data obtaining phase is the same as the sequence illustrated in FIGS. 31 to 33 described above, and an operation sequence in the data processing environment is the same as the sequence of FIG. 34 described above.

When the data user transmits a request to "/processDataId1", the request is first transferred to the data processing environment based on the routing table set in the GW. Thereafter, the data processing server 50 obtains provided data according to the content described in the BC ledger, returns only a result processed by the processing service to the data user as a response, and deletes the provided data and the processing service used for the processing.

Furthermore, in order to leave a correct delivery of processed data to the data user as an evidence trail, a transaction including the "processed data obtaining result" and the "signature of user" is issued at a timing when obtaining of the processed data is completed, and is recorded in the BC ledger at each GW, completing all the processes.

Here, a method of determining the data processing environment in the meta-information matching phase described above when there is a plurality of data processing environments with matching items will be described. When there is a plurality of data processing environments with matching items and it is not possible to uniquely determine the data processing environment to be used in matching of the data processing environments, it is determined based on a preset algorithm. For example, there are determining in an alphabetical order, determining in an ascending order of values of the IDs set in the data processing environment, and the like, and a setting is made in advance to determine based on the same rule in all GWs.

FIG. 68 is a diagram illustrating an example of a meta-information table. A meta-information table T100 is obtained by adding safe-env-Y to the data processing environment of serviceId1 with respect to the meta-information table T10c illustrated in FIG. 65.

When the data processing environment is matched in this situation, the common data processing environment for dataId1 and serviceId1 will be two places of safe-env-X and safe-env-Y. The provided data and the processed data are transferred to the same data processing environment, and thus the data processing environment is uniquely determined using a common algorithm in each GW. An example of an algorithm that determines the data processing environment is illustrated below.

Example 1: Case of Determining in Alphabetical Order

The data processing environment is managed by character strings such as ID and URL. Therefore, respective GWs share an algorithm such as "when character strings of the data processing environment are arranged in alphabetical order, it is determined to select the data processing environment that hits first in ascending order (or descending order)." Therefore, the same data processing environment may be determined for all GWs without communication between GWs.

For example, in a case of using the algorithm to determine in alphabetical order, in the meta-information table T100 of FIG. 68, there are two environments that may be selected, safe-env-X and safe-env-Y, and thus the safe-env-X that hits first in ascending order is selected in all GWs and the provided data and the processing service are transferred thereto. A meta-information table T101 after the data processing environment matching is as illustrated in FIG. 69.

Example 2: Case of Determining Using Random Number Program

The determination method as in Example 1 may generate a bias in the data processing environment to be determined. Therefore, a random number program is used as a method for smoothing the selected data processing environment.

Random number programs are called pseudo-random numbers, and at first glance they seem to return random values, like the rand function in the C language, but they have rules (not perfect random numbers). Further, when the same random number program and the same seed value that is an argument for generating a random number are used, the random number program always generates random numbers in the same order.

For example, if the seed value is set to 10 and a random number program is used, the value "25 46 71 43 93 65 23 . . . " is output. When this program is reset once and run again with a seed value of 10, outputs of "25 46 7143 93 65 23 . . . " which are the same as in the first time are obtained.

Here, by using this characteristic, all GWs share the same random number program and the same seed value that is an argument for random number generation, so that the same data processing environment is selected for all the GWs, although the selection itself is random.

In the meta-information table T100 of FIG. 68, there are two selectable environments, safe-env-X and safe-env-Y. In this example, a random number program rand( ) and a seed value 10 are shared in advance by all GWs. Since this random number program generates random numbers in the order of "25 46 71 43 93 65 23 . . . " when the seed value is 10, it is assumed to use an algorithm in common that obtains a remainder from dividing the obtained random number by the number of environments that may be selected (two this time), and determines to select the (remainder value+1)-th environment in the ascending alphabetical order.

The calculation using the random number program is rand(10) mod 2+1=25 mod 2+1=2, by which all GWs obtain a value of two. Thus, the second safe-env-Y in ascending alphabetical order is selected in all the GWs, and the provided data and the processing service are transferred thereto. A meta-information table T102 after the data processing environment matching is as illustrated in FIG. 70.

As described above, according to the present embodiments, the mechanism and meta-information of the smart contract are utilized to verify that the agreed data processing is correctly executed, including other BC participants. In the present embodiments, the user does not browse the primary data, and what is viewable by the user is only the processing result. The processing result is secondary data that is approved by the data provider, and the rights and responsibilities thereof belong to the data user.

Therefore, even when the data passed to the data user is leaked, the influence thereof does not spread to the data provider, and thus the data sending side may provide the data without anxiety. Further, similarly to the data, the content of the processing service is not published to the data provider, and thus the data user side may process and use the data without anxiety.

Therefore, it is possible to achieve a platform in which only processing results agreed by both the data provider and the data user are distributed without showing the primary data and the processing service between the user and the provider. As a result, since each of the primary data and the processing service is not distributed, unauthorized secondary use is prevented, and both the data provider and the data user may exchange data without anxiety.

Note that the processing functions described above may be implemented by a computer. In this case, a program describing the processing content is provided. By executing this program on a computer, the above processing functions may be implemented on the computer.

The program describing the processing content may be recorded on a computer-readable recording medium. The computer-readable recording medium includes a magnetic storage unit, an optical disk, a magneto-optical recording medium, a semiconductor memory, and the like. Examples of the magnetic storage unit include a hard disk drive (HDD), a flexible disk (FD), a magnetic tape, and the like. The optical disk includes a CD-ROM/RW or the like. The magneto-optical recording medium includes a magneto optical (MO) disk or the like.

In a case where the program is to be distributed, for example, portable recording media such as CD-ROMs, in which the program is recorded, are sold. Further, it is possible to store the program in a storage unit of a server computer and transfer the program from the server computer to another computer through a network.

The computer which executes the program stores, for example, the program recorded in the portable recording medium or the program transferred from the server computer in a storage unit of the computer itself. Then, the computer reads the program from the storage unit of the computer and executes processing according to the program. Note that the computer may also read the program directly from the portable recording medium and execute processing according to the program.

Further, every time the program is transferred from the server computer connected via the network, the computer may sequentially execute processing according to the received program. Furthermore, at least a part of the above processing functions may be implemented by an electronic circuit such as DSP, ASIC, PLD.

The embodiments have been illustrated as described above, but the configuration of each unit described in the embodiments may be replaced with another having a similar function. Furthermore, other arbitrary components and steps may be added. Moreover, any two or more configurations (features) of the above-described embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a communication program executed by a plurality of communication devices included in a network, the communication program causing:
    a first computer of a first communication device, on a side of providing data, to register first metadata including the data and attribute information of the data;
    a second computer of a second communication device, on a side of using the data, to register second metadata including a processing service for when processing and using the data and attribute information of the processing service;
    the first computer to determine whether or not to approve the processing service based on the first metadata and the second metadata;
    when a result of the determination of whether or not to approve is to approve, a third computer of a third communication device, on a side of processing the data, to execute data processing based on the processing service in a data processing environment that disapproves access from the first communication device and the second communication device to the data and the processing service;
    the third computer to calculate a first hash value of the data and compare the first hash value with a second hash value of the data included in the first transaction and, when the values are same, register the data in the data processing environment; and
    the third computer to calculate a third hash value of the processing service and compare the third hash value with a fourth hash value of the processing service included in the second transaction and, when the values are same, register the processing service in the data processing environment.

2. The non-transitory computer-readable recording medium having stored therein a communication program according to claim 1, the communication program further causing: the first computer to register simulated data obtained by simulating the data; the second computer to issue a first transaction including information based on the processing service created based on the simulated data, so as to request the first computer for access to the data; and the first computer to determine whether or not to approve the processing service based on the first transaction and, when a result of the determination of whether or not to approve is to approve, issue a second transaction including information of permitting the processing service using the data, so as to approve the second computer to access processed data obtained by processing the data by the processing service.

3. The non-transitory computer-readable recording medium having stored therein a communication program according to claim 1, the communication program further causing the third computer to: add first information that is temporary to the data registered in the data processing environment, and delete the first information when the data is deleted; add second information that is temporary to the processing service registered in the data processing environment, and delete the second information when the processing service is deleted; and enable the first computer and the second computer to verify presence or absence of the data and the processing service in the data processing environment based on the first information and the second information.

4. The non-transitory computer-readable recording medium having stored therein a communication program according to claim 1, the communication program further causing: when there is a data processing environment group that includes a plurality of data processing environments, the first computer and the second computer to select a common data processing environment identifier that is common between a plurality of first data processing environment group identifiers among the data processing environment group corresponding to an identifier of the data included in the first metadata and a plurality of second data processing environment group identifiers among the data processing environment group corresponding to an identifier of the processing service included in the second metadata, and select the data processing environment having the selected common data processing environment identifier from the data processing environment group.

5. The non-transitory computer-readable recording medium having stored therein a communication program according to claim 1, wherein the first communication device includes a first storage unit that has a storage area of a first distributed ledger, the second communication device includes a second storage unit that has a storage area of a second distributed ledger, the third communication device includes a third storage unit that has a storage area of a third distributed ledger, and the communication program further causes each of the first computer, the second computer, and the third computer to share information registered in the first distributed ledger, the second distributed ledger, and the third distributed ledger.

6. A communication method executed by a plurality of communication devices included in a network, the communication method comprising:
    by a first communication device on a side of providing data, registering first metadata including the data and attribute information of the data;
    by a second communication device on a side of using the data, registering second metadata including a processing service for when processing and using the data and attribute information of the processing service;
    by the first communication device, determining whether or not to approve the processing service based on the first metadata and the second metadata;
    by a third communication device on a side of processing the data, when a result of the determination of whether or not to approve is to approve, executing data processing based on the processing service in a data processing environment that disapproves access from the first communication device and the second communication device to the data and the processing service; and by the third computer, calculating a first hash value of the data and comparing the first hash value with a second hash value of the data included in the first transaction and, when the values are same, registering the data in the data processing environment; and by the third computer, calculating a third hash value of the processing service and comparing the third hash value with a fourth hash value of the processing service included in the second transaction and, when the values are same, registering the processing service in the data processing environment.

7. A communication device included in a network, comprising:

a processor coupled to another device via the network and configured to control communication; and a memory coupled to the processor and including a memory area for a distributed ledger, wherein the processor is configured to:

register, when functioning as a first communication device on a side of providing data, first metadata including the data and attribute information of the data, register, when functioning as a second communication device on a side of using the data, second metadata including a processing service for when processing and using the data and attribute information of the processing service, determine, when functioning as the first communication device, whether or not to approve the processing service based on the first metadata and the second metadata, execute, when a result of the determination of whether or not to approve is to approve when functioning as a third communication device on a side of processing the data, data processing based on the processing service in a data processing environment that disapproves access from the first communication device and the second communication device to the data and the processing service, calculate a first hash value of the data and compare the first hash value with a second hash value of the data included in the first transaction and, when the values are same, register the data in the data processing environment, and calculate a third hash value of the processing service and compare the third hash value with a fourth hash value of the processing service included in the second transaction and, when the values are same, register the processing service in the data processing environment.

\* \* \* \* \*